United States Patent

Tsukasa et al.

Patent Number: 5,359,154
Date of Patent: Oct. 25, 1994

[54] CONVEYOR APPARATUS HAVING PLURAL CONVEYORS WITH EQUALIZED CONVEYING SPEEDS CONTROLLED BY AN INVERTER MEANS

[75] Inventors: Fumihiro Tsukasa, Kanagawa; Hideya Fujimoto, Atsugi; Kazuhiko Horikoshi, Atsugi; Osamu Tanaka, Atsugi; Kunio Kikuchi, Minamiashigara, all of Japan

[73] Assignee: Anritsu Corporation, Tokyo, Japan

[21] Appl. No.: 2,119

[22] Filed: Jan. 7, 1993

Related U.S. Application Data

[63] Continuation of Ser. No. 684,952, filed as PCT/JP90/01640, Dec 15, 1990.

[30] Foreign Application Priority Data

| Dec. 15, 1989 | [JP] | Japan | 1-325565 |
| Dec. 22, 1989 | [JP] | Japan | 1-333655 |
| Jan. 26, 1990 | [JP] | Japan | 2-17455 |
| Jan. 26, 1990 | [JP] | Japan | 2-17456 |
| Feb. 13, 1990 | [JP] | Japan | 2-32119 |
| Mar. 31, 1990 | [JP] | Japan | 2-87275 |
| Sep. 21, 1990 | [JP] | Japan | 2-252730 |

[51] Int. Cl.$^5$ .............. G01G 19/00; G01G 13/02; H02P 1/40
[52] U.S. Cl. ............ 177/145; 177/121; 177/123; 318/68; 318/747; 318/749; 318/801; 318/41
[58] Field of Search ........ 177/121, 123, 145; 318/41, 66, 68, 747, 749, 801

[56] References Cited

U.S. PATENT DOCUMENTS

| 3,439,242 | 4/1969 | Gasser | 318/801 |
| 3,447,050 | 5/1969 | Geis | 318/801 |
| 3,648,138 | 3/1972 | Kalis | 318/231 |
| 3,781,615 | 12/1973 | Mokrytzki et al. | 318/227 |
| 3,781,616 | 12/1973 | Mokrytzki et al. | 318/230 |
| 3,838,321 | 9/1974 | Damm et al. | 318/66 |
| 3,912,993 | 10/1975 | Bereisa, Jr. | 318/230 |
| 3,917,989 | 11/1975 | Bereisa, Jr. | 318/231 |
| 3,967,170 | 6/1976 | MacDonald et al. | 318/85 |
| 3,977,483 | 8/1976 | Greanias | 177/1 |
| 4,344,493 | 8/1982 | Salmonsen et al. | 177/52 |
| 4,376,913 | 3/1983 | Higby | 318/85 |
| 4,405,884 | 9/1983 | Weber | 318/85 |
| 4,745,348 | 5/1988 | Young | 318/749 |
| 4,765,488 | 8/1988 | Moriarity | 209/551 |
| 5,088,569 | 2/1992 | Checcucci | 177/145 |

FOREIGN PATENT DOCUMENTS

| 56-49692 | 5/1981 | Japan |
| 57-6590 | 1/1982 | Japan |
| 57-36599 | 2/1982 | Japan |
| 58-127598 | 7/1983 | Japan |
| 60-91897 | 5/1985 | Japan |
| 60-213295 | 10/1985 | Japan |
| 62-215414 | 9/1987 | Japan |

Primary Examiner—Benjamin R. Fuller
Assistant Examiner—Randy W. Gibson
Attorney, Agent, or Firm—Frishauf, Holtz, Goodman & Woodward

[57] ABSTRACT

An inverter controlled conveying/measuring apparatus according to the invention includes a conveyor (3) for conveying an object (W) of measurement. The conveyor (3) is driven by an AC motor (M2). Inverter (20) controls and operates the conveyor (3) at a given speed by supplying the AC motor (M2) with frequency converting signals according to a specified frequency. A measuring section (4) is arranged on a conveying path of the conveyor (3) in order to measure an attribute of the object (W) being conveyed by the conveyor (3).

7 Claims, 54 Drawing Sheets

| ADDRESS A | PULSE WIDTH DATA W |
|---|---|
| $2^n - 1$ | $W_{2^n-1} = B \cdot \sin \frac{(2^n-1)\pi}{2^n}$ |
| $2^n - 2$ | $W_{2^n-2} = B \cdot \sin \frac{(2^n-2)\pi}{2^n}$ |
| ⋮ | ⋮ |
| 2 | $W_2 = B \cdot \sin \frac{2 \cdot \pi}{2^n}$ |
| 1 | $W_1 = B \cdot \sin \frac{1 \cdot \pi}{2^n}$ |
| 0 | $W_0 = B \cdot \sin \frac{0 \cdot \pi}{2^n}$ |

FIG.9

| ADDRESS A | PULSE WIDTH DATA W |
|---|---|
| $2^n - 1$ | $K_{2^n-1} = B \cdot \left|\cos \frac{(2^n-1)\pi}{2^n}\right|$ |
| $2^n - 2$ | $K_{2^n-2} = B \cdot \left|\cos \frac{(2^n-2)\pi}{2^n}\right|$ |
| ⋮ | ⋮ |
| 2 | $K_2 = B \cdot \left|\cos \frac{2 \cdot \pi}{2^n}\right|$ |
| 1 | $K_1 = B \cdot \left|\cos \frac{1 \cdot \pi}{2^n}\right|$ |
| 0 | $K_0 = B \cdot \left|\cos \frac{0 \cdot \pi}{2^n}\right|$ |

FIG.10

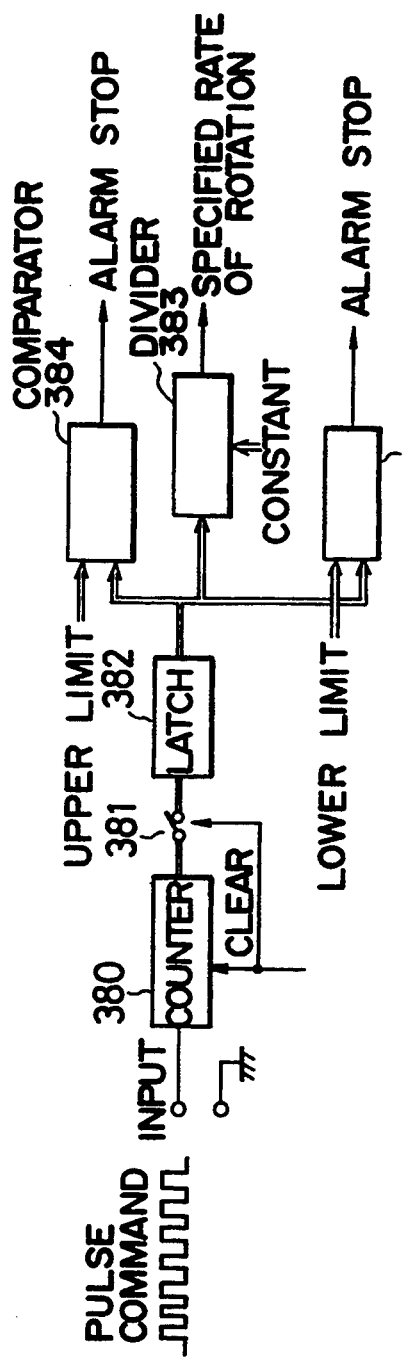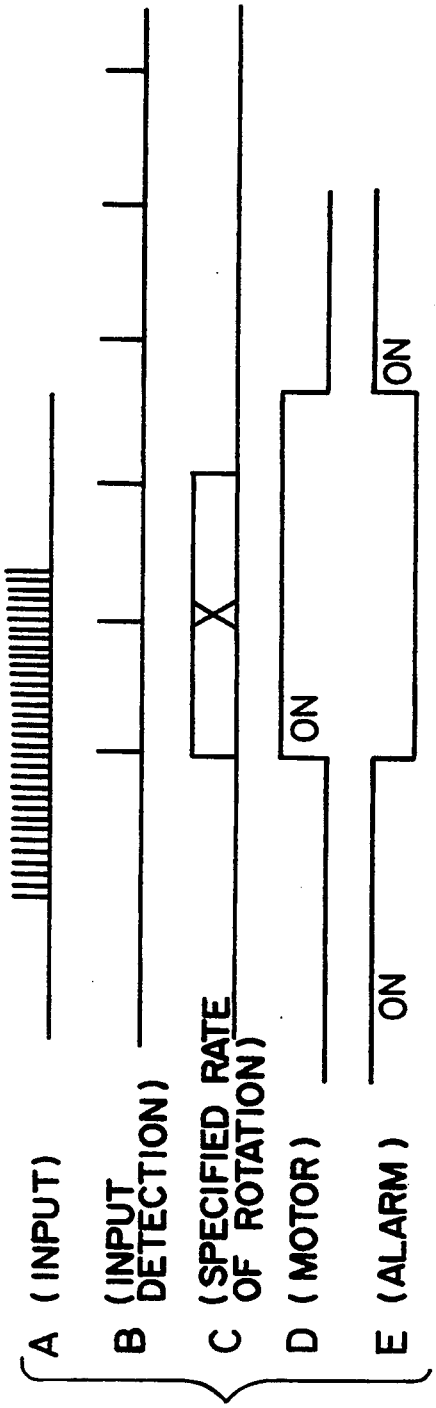
FIG. 27A
FIG. 27B

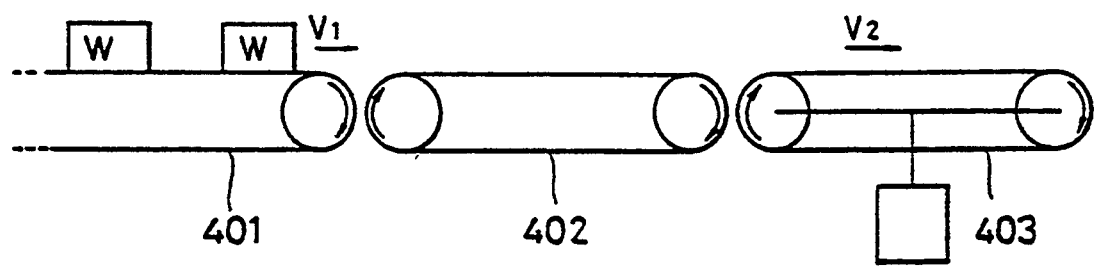
PRIOR ART   FIG.31
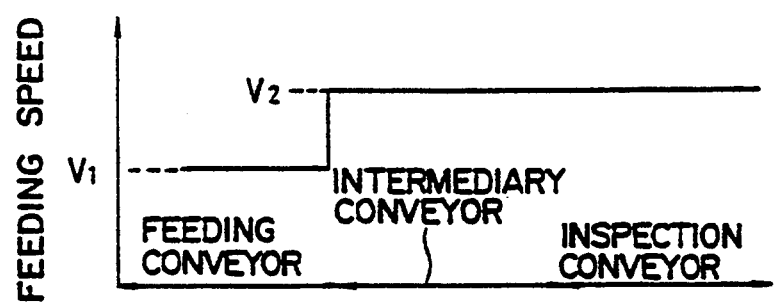
PRIOR ART   FIG.32

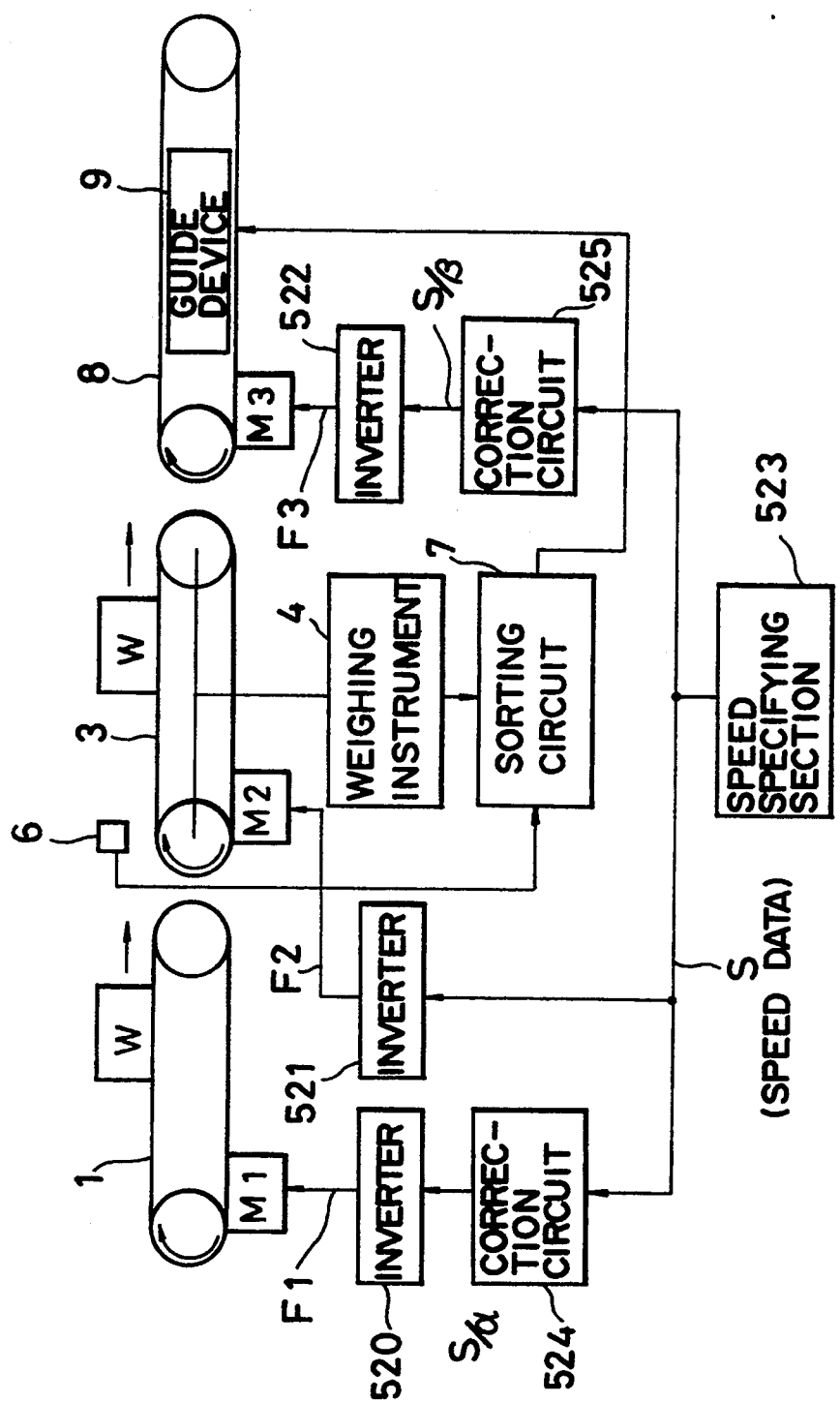
F I G. 33

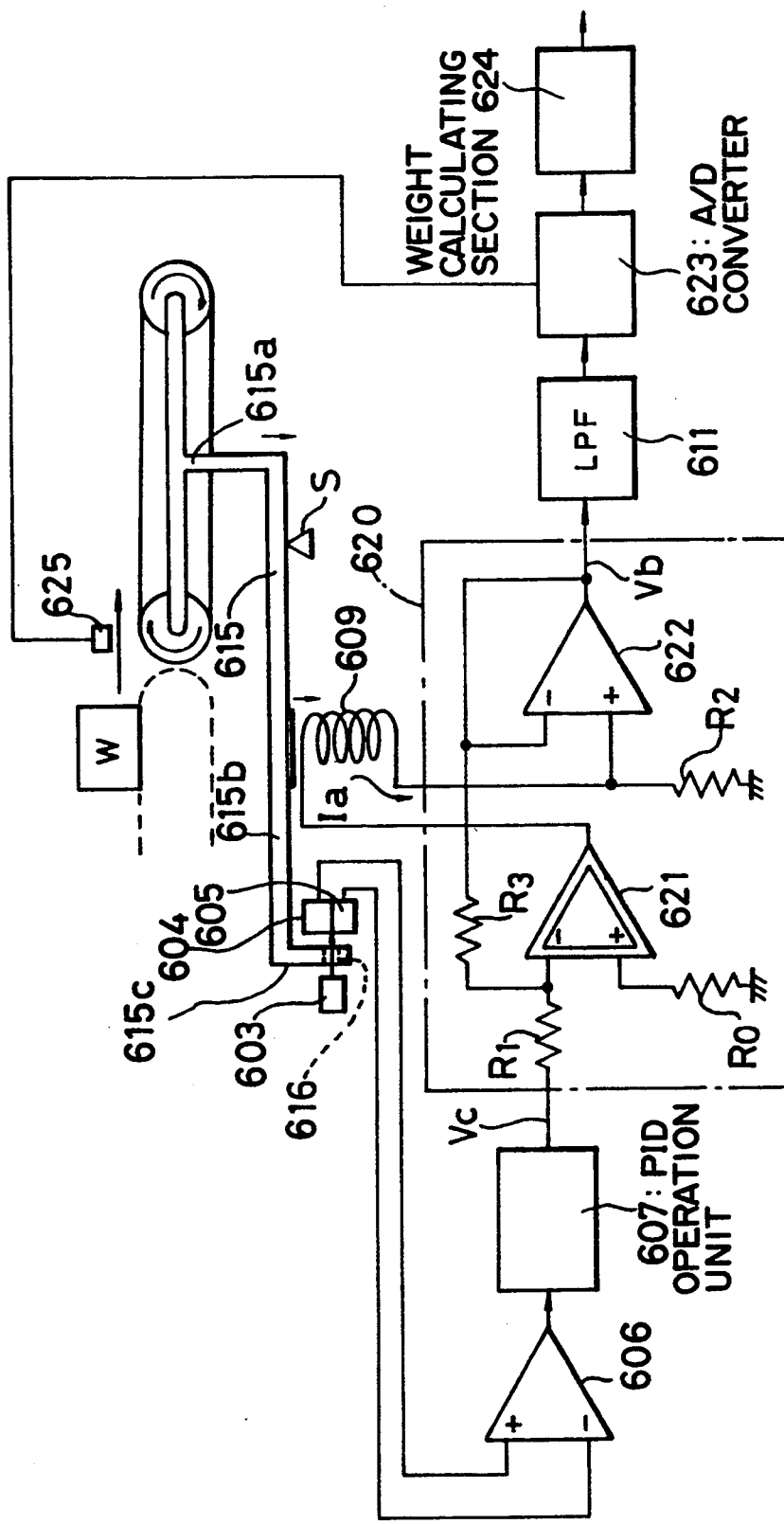
F I G. 37

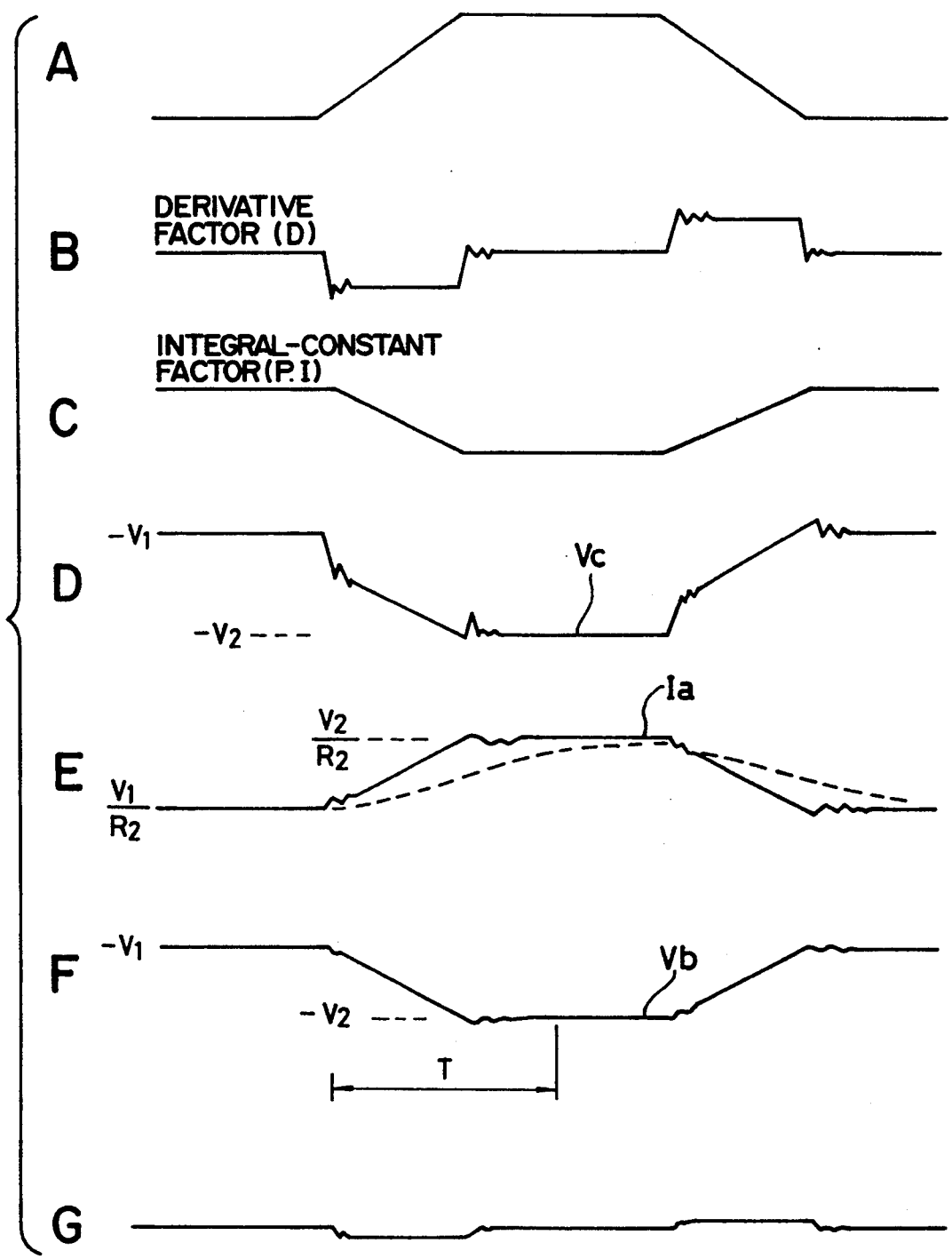
F I G. 38

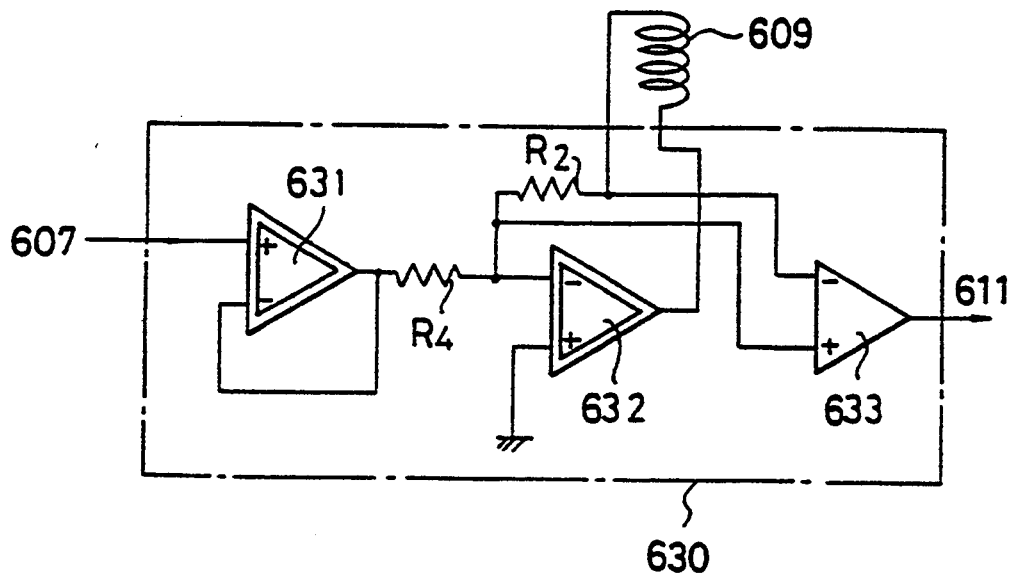
F I G. 39
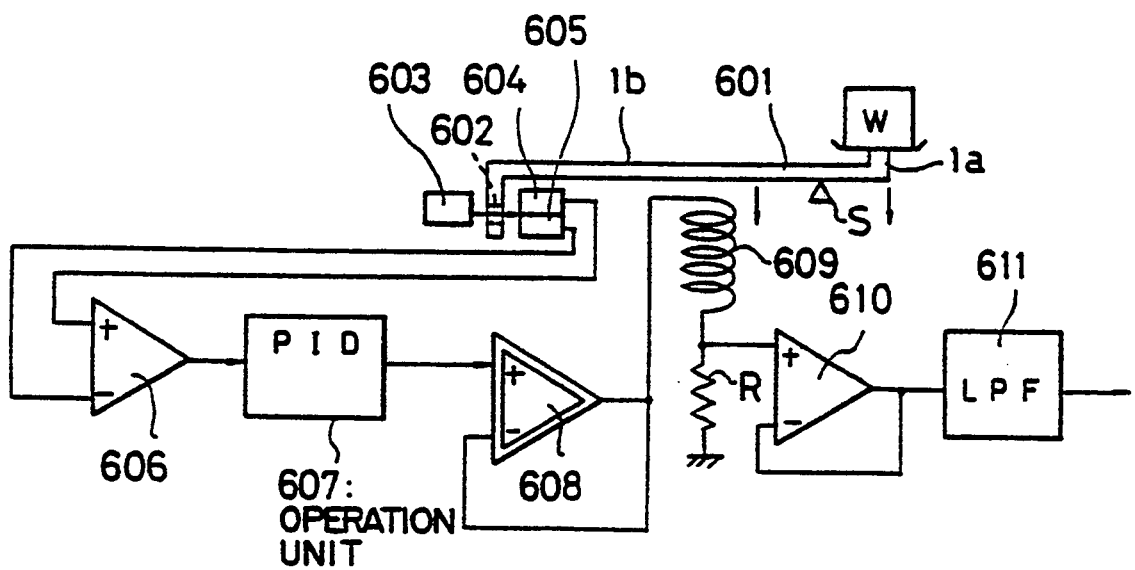
PRIOR ART  F I G. 40

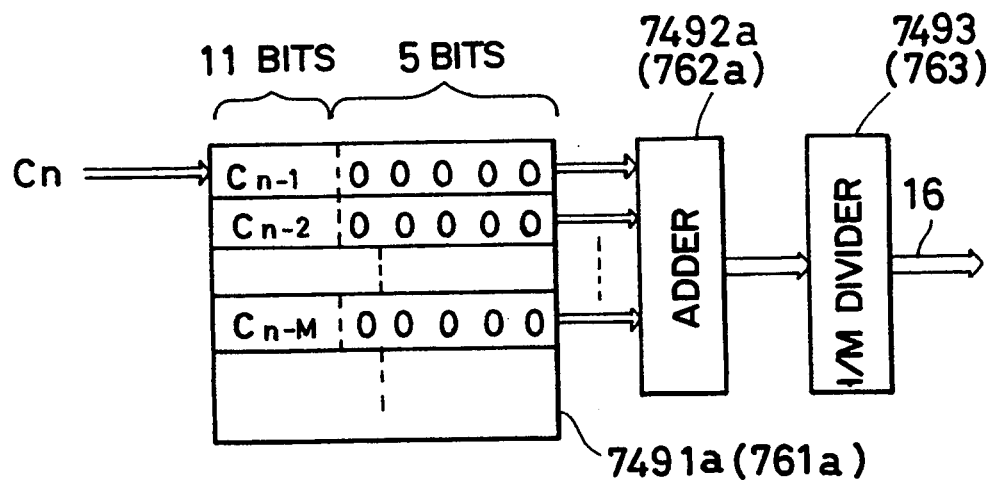
F I G. 43
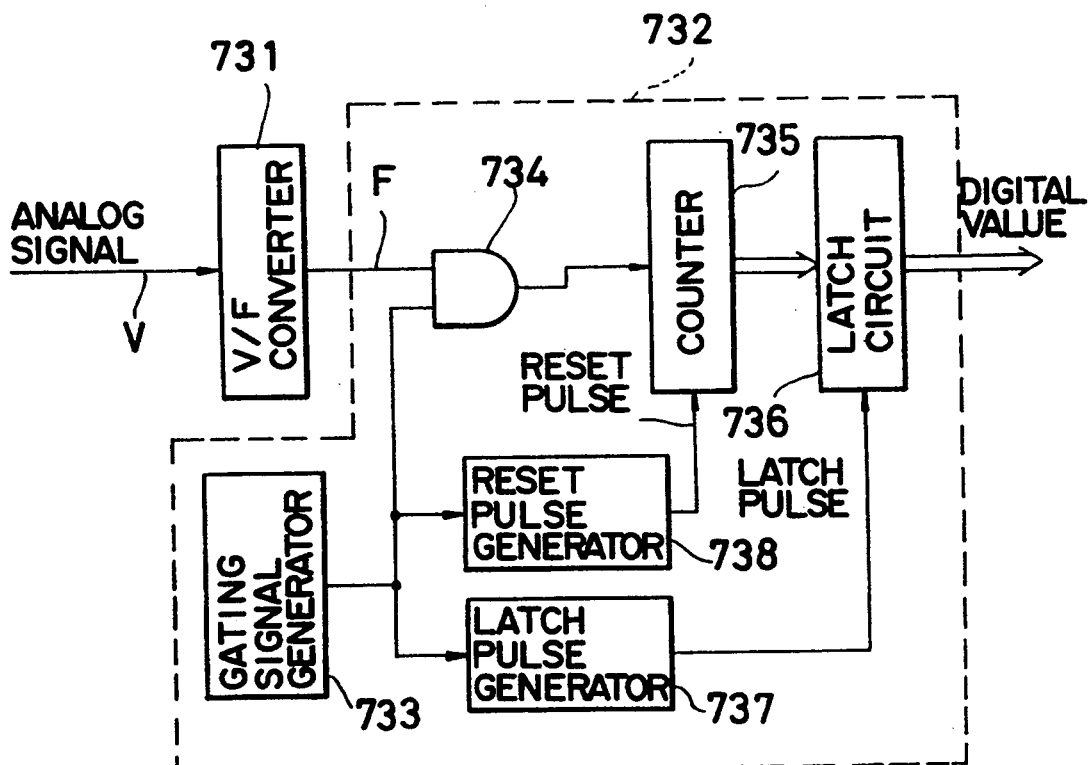
F I G. 44

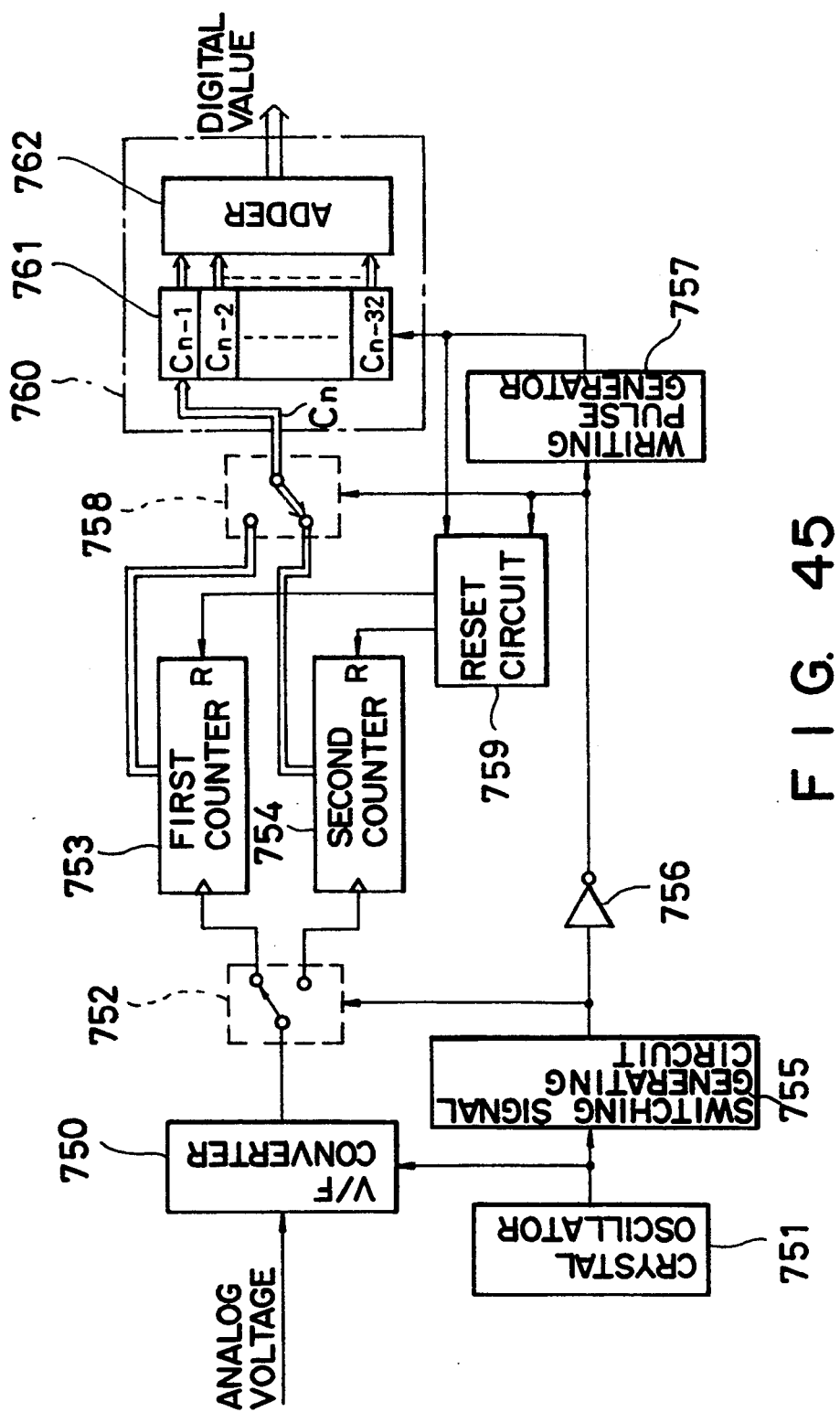
F I G. 45

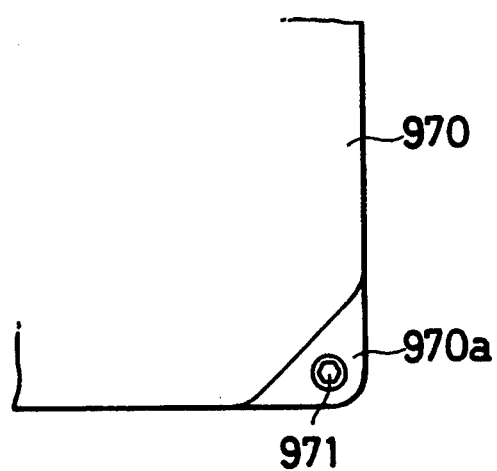
F I G. 53

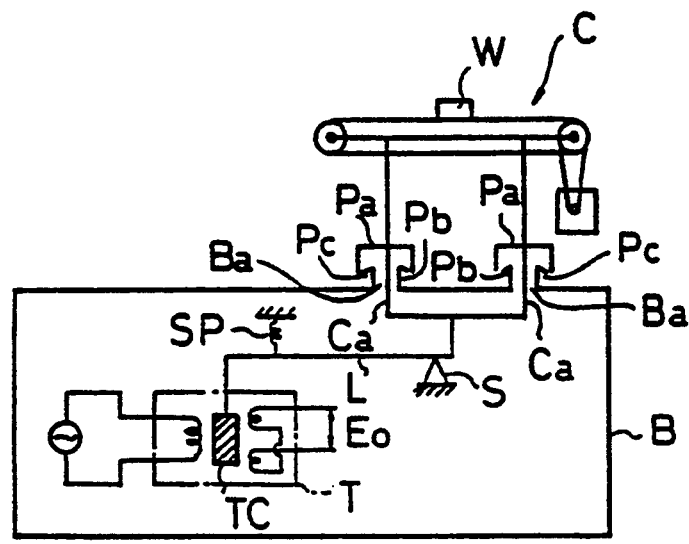
F I G. 59
PRIOR ART
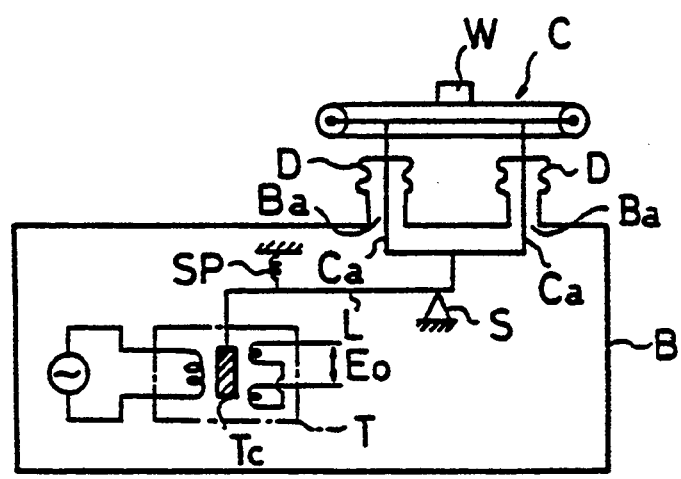
PRIOR ART    F I G. 60

5,359,154

CONVEYOR APPARATUS HAVING PLURAL CONVEYORS WITH EQUALIZED CONVEYING SPEEDS CONTROLLED BY AN INVERTER MEANS

This application is a continuation of application Ser. No. 07/684,952, filed as PCT/JP90/01640, Dec 15, 1990, now abandoned.

TECHNICAL FIELD

This invention relates to an inverter controlled conveying/measuring apparatus and, more particularly, it relates to an inverter controlled conveying/weighing apparatus of the type which is suitably applicable to a weighing/sorting machine capable of automatically weighing objects while conveying them and sorting them depending on the weight data obtained for the objects.

BACKGROUND ART

As well known, there are systems for used in various production lines incorporating weighing/sorting machines (so called auto-checker) for automatically weighing objects (works) while they are being conveyed and sorting them depending on the weight data obtained for the objects.

Some of the basic requirements for such systems include high speed, enhanced accuracy and improved reliability.

A weighing/sorting machine of the type as described above normally comprises as principal components a number of conveyors including a feeding conveyor, a weighing conveyor and a sorting conveyor. These conveyors are required to have a reduced size, durability, a high torque and stability particularly in terms of the conveyor drive/control system including the motor in order to meet the above requirements for the machine.

It is a recognized fact that any conveyors of conventional weighing/sorting machines do not satisfy the above requirements.

Some of the reasons for this are discussed below.

FIG. 36A of the accompanying drawings illustrates the configuration of a conventional weighing/sorting machine, where reference numeral 1 denotes a feeding conveyor driven by motor M1 at a given speed to move the objects placed on it at a required rate under the control of a control unit 2.

Reference numeral 3 denotes a weighing conveyor for weighing one by one the objects W fed in by the feeding conveyor 1 while they are moved further on, said conveyor being also driven by a given speed by motor M2 to move the objects on it at a required rate under the control of a control unit 5.

Reference numeral 6 denotes a sensor for detecting object W being transferred to the weighing conveyor 3 and reference numeral 7 denotes a sorter circuit for assigning the object W to a specific group of objects by transmitting a sorting signal after the elapse of a given period of time since the object is completely transferred to the weighing conveyor 3 or a period of time required to obtain a stabilized weight signal for the object.

Reference numeral 8 denotes a sorting conveyor for assigning the object W coming from the weighing conveyor a specific route corresponding to the sorting signal given to it and causing it to be moved away by a guide device 9 which is operated in accordance with the sorting signal. For instance, the weighed objects W may be divided into three different groups and collected at the ends of three different routes.

Like the two other conveyors, the sorting conveyor 8 is driven by motor M3 at a given speed to moving the objects on it at a required rate under the control of a control unit 10.

The three motors M1, M2 and M3 to be used for diving the respective conveyors are single-phase induction-type brushless motors that can be realized in small dimensions and withstand continuous operation for a prolonged period of time. The rotary speed of the motors M1, M2 and M3 can be modified by changing the level of the voltage of power applied to them by means of the respective control units 2, 5 and 10.

The three conveyors are normally operated at a same speed with a view to minimize the vibration that may be generated in the machine to adversely affect the operation of the weighing conveyor 3 as well as the time required for it to receive an object and weigh it.

Therefore, the object which is brought to the feeding conveyor 1 is moved at a predetermined constant speed to the weighing conveyor, weighed there and then sorted by weight while it is moved away from the location of weighing.

The object transferred from the weighing conveyor 3 to the sorting conveyor 8 is guided to its proper take-out position by the sorting signal generated for it and then further moved away to the next stage of the production line.

However, a weighing/sorting machine of the type as described above comprising a plurality of conveyors that need to be so controlled as to operate at a same speed is accompanied by a problem that all the conveyors have to be adjusted for speed whenever the machine has to deal with objects of a type which is different from the previously dealt ones.

As a solution to this problem, an identical control signal may be given to each of the control units 2, 5 and 10 in order to collectively control the moving speed of the conveyors by applying an identical voltage to all the motors M1, M2 and M3. But, such a solution is not at all effective when the motors have different operational features including the transmission gear ratios or when the loads applied to the entire machine by the conveyors are significantly different from one another.

A control unit of the type as described above for controlling the speed of operation of the conveyors by varying the voltages applied to the drive motors normally requires elaborate efforts to finely control the speed. Otherwise the motors would not be operated at an exactly same and identical speed.

The rate of sorting and hence the speed of the conveyors of a weighing/sorting machine of the type as described above have to be reduced if it has a long distance for the objects to be conveyed for sorting. However, a weighing/sorting machine whose speed of the conveyors is controlled by varying the voltage applied to them is accompanied by a problem of reduced torque of each of the motors M1, M2 and M3 when the voltage applied to it is reduced to lower the speed of the conveyor for which it is responsible, a problem that arises when sorting heavy articles.

Now, electric motors are used not only for conveyors of the type as described above but also for those installed in production lines for purposes other than weighing/sorting, for instance for quality examination.

Currently, single-phase induction motors dominate these applications because they do not involve brush friction and heat generation as DC motors do.

FIG. 36B of the accompanying drawings shows the configuration of a conventional control unit for controlling a single-phase induction motor.

This single-phase induction motor 11 (hereinafter referred to simply as motor) is so designed as to rotate rotor 12 by applying two AC voltages with a same level but phases differentiated by 90 degrees respectively to first and second coils L1 and L2 (C0 donating a capacitor for phase differentiation) so that generator 13 generates AC signals in synchronism with the rotation of the rotor Motor control unit 110 converts the AC signal from the generator 13 of the motor 11 into a DC voltage signal by means of a rectifier circuit 111 and compares the voltage with a control voltage transmitted from a variable resistor 112 for speed control by using a comparison/control circuit 113.

The signal representing the result of the comparison is sent to a thyristor 114 arranged between the commercial power source 115 and the motor 11 to adjust the voltage of the AC power source 115 so that the two voltages applied to the comparison/control circuit 113 become equal relative to each other.

Thus, the voltage of the commercial power source is increased by raising the level of the control voltage through the use of the variable resistor 112 for setting the motor speed to augment the rate of rotation of the motor 11. Conversely, the voltage of the commercial power source is decreased by reducing the level of the control voltage through the use of the variable resistor 112 to lower the rate of rotation of the motor 11. In this way, the motor speed can be appropriately controlled.

However, with such an arrangement of the control unit of the motor, since the voltage of the commercial power source has to be lowered to reduce the torque of the motor, is accordingly reduced whenever a low rate of rotation of the motor 11 is needed, the motor cannot exert a high torque at low speed and the conveyor driven by the motor inevitably falls short of the power it needs.

Besides, because of the fact that the motor speed is controlled by means of the AC voltage of the generator 13, whose output does not linearly change, the motor speed itself is subject to fluctuations. This brings forth a serious problem particularly when more than two motors are to be controlled to run at an identical speed.

It should be noted that this is a fatal and inescapable problem for a so-called speed-controlled (variable speed ) motor.

While the use of a three-phase motor may provide a solution for this problem, it is accompanied by a problem of bulkiness when compared with a single-phase 100 V motor as a three-phase motor is normally designed for use with a 200 V commercial power source.

Moreover, a DC motor does not meet the requirement of durability because a brush is always used there.

As discussed above, whenever an induction motor is controlled for its rotary speed by varying the voltage of the commercial power source used for it, the torque of the motor is always subject to change and, therefore, the rate of rotation of the motor cannot be varied to a considerable extent without causing the torque problem.

FIG. 36C shows how a technique of converting the electricity of the commercial power source 201 into AC having a desired frequency by means of an inverter 203 is used before the power is applied to a load circuit 202 including an induction motor in order to bypass this problem.

The inverter 203 comprises a rectifier circuit 204 for converting the AC voltage of the commercial power source into the DC voltage, a modulator circuit 205 for modulating the DC voltage by a given frequency (pulse width and pulse number modulation) and a frequency controller 206 for generating a frequency specifying signal so that the frequency of the power source may be modified within a given range (several Herz to several hundreds Herz) before the power from the power source is applied to the load circuit 202.

If, however, the frequency of the power source is carelessly reduced by means of an inverter before the power is applied to the inductive load circuit including an AC motor, the level of the electric current running through the load circuit is remarkably raised to give rise to an increased possibility of accidental fire due to a heated and scorched coil.

An inverter used to drive a motor is provided with a frequency controller for variably specifying a frequency for the power source to determine the rate of rotation of the motor.

FIG. 36D is a block diagram of a conventional variable frequency type inverter 301.

In the block diagram, reference numeral 302 denotes a frequency controller that converts the level of an output voltage of potentiometer 303 into a corresponding digital value by means of an AD converter 304.

Also, reference numeral 305 denotes an AC conversion circuit for converting the AC from the commercial power source into an AC having a frequency corresponding to the signal transmitted from the AD converter 304 so that the AC from the commercial power source is once converted into DC, which is then further converted into AC by means of a switching circuit 307 that continuously switches the polarity of the DC with the specified frequency in order to drive a load circuit 309 with AC power.

Reference numeral 308 denotes a switching control circuit for controlling the switching circuit 307 according to the digital value transmitted from the AD converter 304. For instance, it sends out to the switching circuit 307 a signal having a pulse width that varies to form a sinusoidal wave at a frequency corresponding to the digital value in order to continuously switch the polarity of the DC and to drive the load circuit 309 by AC.

With such an arrangement, the AC power applied to the load circuit 309 be made to vary according to the output voltage of the potentiometer 303 of the frequency controller 302, which is externally controllable.

However, an inverter as described above for controlling the frequency of the power applied to the load circuit by controlling the voltage does not operate satisfactorily with a desired level of accuracy because variations that appear in the voltage and the temperature are considerable.

Particularly when more than two load circuits are synchronously driven by more than two inverters, tremendous efforts are normally required for synchronization of the involved frequencies.

Additionally, as the AC motor to be driven by an inverter is a three-phase motor, the inverter should comprise as a matter of course a three-phase motor driving inverter control system. These and other problems have so far considerably hindered the use of three-phase motor driving control systems comprising inverters for weighing/sorting machines as described earlier practically unfeasible.

Modern production lines normally incorporate inspection systems for checking the weights of works and foreign objects mingled or mixed with the works somewhere on the conveyors they comprises.

FIG. 31 is a schematic illustration showing part of a production line incorporating such an inspection system.

In FIG. 31, reference numeral 401 denotes a feeding conveyor to be used for the inspection system.

Objects of inspection W being moved on the feeding conveyor 401 at a given constant speed with an identical spatial interval between any two successive objects are sequentially brought to an inspection conveyor 403 by way of an intermediate conveyor 402 and the objects that have been examined on the inspection conveyor are forwarded one by one to the next stage of the production line.

The inspection conveyor 403 has a length sufficient enough to carry out a weight check or a check for detecting foreign objects. If the feeding conveyor 401 bring in objects of inspection with an interval which is shorter than the length of the inspection conveyor 403, it means that two or more than two objects are found simultaneously on the feeding conveyor 401 and therefore the inspection can entail erroneous results.

Conventionally, this problem is avoided by driving both the intermediate conveyor 402 and the inspection conveyor 403 at a speed V2 faster than the speed V1 of the feeding conveyor 401 to provide a large interval between two successive objects of inspection on the inspection conveyor and by equalizing the speed of the intermediate conveyor 402 and the inspection conveyor 403 with a view to minimize the shock that might be given to the inspection conveyor 403 by the intermediate conveyor 402 when an object is transferred from the latter to the former.

With such an arrangement, however, the object being transferred from the feeding conveyor 401 moving at speed V1 to the intermediate conveyor 402 running at speed V2 is inevitably subjected to an abrupt and large acceleration, causing any unstable objects of inspection to fall and, in some cases, the contents of the objects to be undesirably biased.

Moreover, if the objects are realized in the form of a round rod and apt to roll on the conveyor, they cannot be put on the conveyors perpendicular to the direction of movement, making the interval between two successive objects inevitably large to reduce the efficiency of inspection.

In short, any conventional conveyors used for weighing/sorting machines fall short of satisfying the requirements of reduced dimensions, durability, high torque, elevated stability and so on called for conveyor drive control systems using AC motors as sources of motive power.

Consequently, a highly efficient, highly accurate and highly reliable weighing/sorting machine or system cannot be established by using such conventional conveyors.

DISCLOSURE OF INVENTION

In view of the above described circumstances, it is therefore the object of the present invention to provide an inverter controlled conveying/measuring apparatus that satisfies the requirements of reduced dimensions, durability high torque and elevated stability and consequently can play a vital role in realizing a highly efficient, highly accurate and highly reliable weighing/sorting machine or a system by using inverter control units for controlling the operation of AC motors.

According to a first aspect of the present invention, there is provided an inverter controlled conveying/measuring apparatus comprising conveyor means for conveying an object to be measured, an AC motor for driving the conveyor means, an inverter for controlling the speed of the conveyor means, to thereby provide a frequency conversion signal to the AC motor in response to a specified frequency and measuring means provided in a conveying path of the conveyor means, so as to measure a certain attribute of the object.

According to a second aspect of the invention, there is provided an inverter controlled conveying/measuring apparatus comprising a feeding conveyor for serially sending in an object by means of the rotary force of an AC motor, a weighing conveyor for moving the object by means of the rotary force of another AC motor and weighing the object during the movement thereof, and a sorting circuit for issuing a sorting signal according to the weight of the object, and a frequency converter for rectifying an AC power source having a predetermined frequency into a DC power source and supplying an AC power source having a desired frequency to the AC motors to thereby switching the DC power source, wherein a plurality of AC motors including the AC motors for driving the feeding conveyor and the weighing conveyor are driven by AC currents having an identical frequency each other, to thereby utilize one or more than that of the frequency converter.

According to a third aspect of the invention, there is provided an inverter controlled conveying/measuring apparatus comprising a plurality of conveyors driven by AC motors for conveying an object, means for measuring an attribute of the objects being conveyed, a plurality of inverters for respectively driving the AC motors with AC currents having frequencies according to applied signals, means for issuing speed specifying signals having the same rate of speed for the plurality of inverters; and means for modifying at least one of the speed specifying signals issued for the plurality of inverters so as to cause the speeds of the plurality of conveyors specified by the speed specifying signals to practically coincide one another.

BRIEF DESCRIPTION OF DRAWINGS

FIGS. 9 and 10 are charts showing the data stored in advance in the principal area of FIG. 8;

FIG. 27A is a block diagram of the speed control section of an inverter to be used for the embodiment of FIG. 1;

FIG. 27B is a collection of timing charts showing how the speed control section of FIG. 27A is operated;

FIG. 31 is a schematic illustration of a conventional production line;

FIG. 32 is a graphic illustration showing how the speed of operation of the production line of FIG. 31 is controlled;

FIG. 33 is a diagram showing the configuration of third embodiment of the invention;

FIG. 37 is a diagram showing the configuration of the electric system of a first electromagnetic balance-type weighing apparatus applicable to any of the embodiments of the invention;

FIG. 38 is a graphic illustration showing waveforms of a signal for operating the apparatus of FIG. 37;

FIG. 39 is a circuit diagram showing the configuration of a principal area of an apparatus obtained by modifying that of FIG. 37;

FIG. 40 is a diagram showing the configuration of a conventional electromagnetic balance-type weighing apparatus;

FIG. 43 is a block diagram of a part of A/D converter obtained by modifying the corresponding part of the A/D converter of FIG. 37;

FIG. 44 is a block diagram of another alternative A/D converter obtained by modifying that of FIG. 37;

FIG. 45 is a block diagram of a still another alternative A/D converter obtained by modifying that of FIG. 37;

FIG. 53 is a schematic plan view of the cover of the mechanical system of FIG. 47, showing how it is anchored;

FIGS. 59 and 60 are schematic views of two similar but different conventional electromagnetic balance-type weighing apparatus, illustrating their basic configurations.

BEST MODE OF CARRYING OUT THE INVENTION

Now, the present invention will be described in greater detail by referring to the accompanying drawings that illustrate preferred embodiments of the invention.

Figure 1:
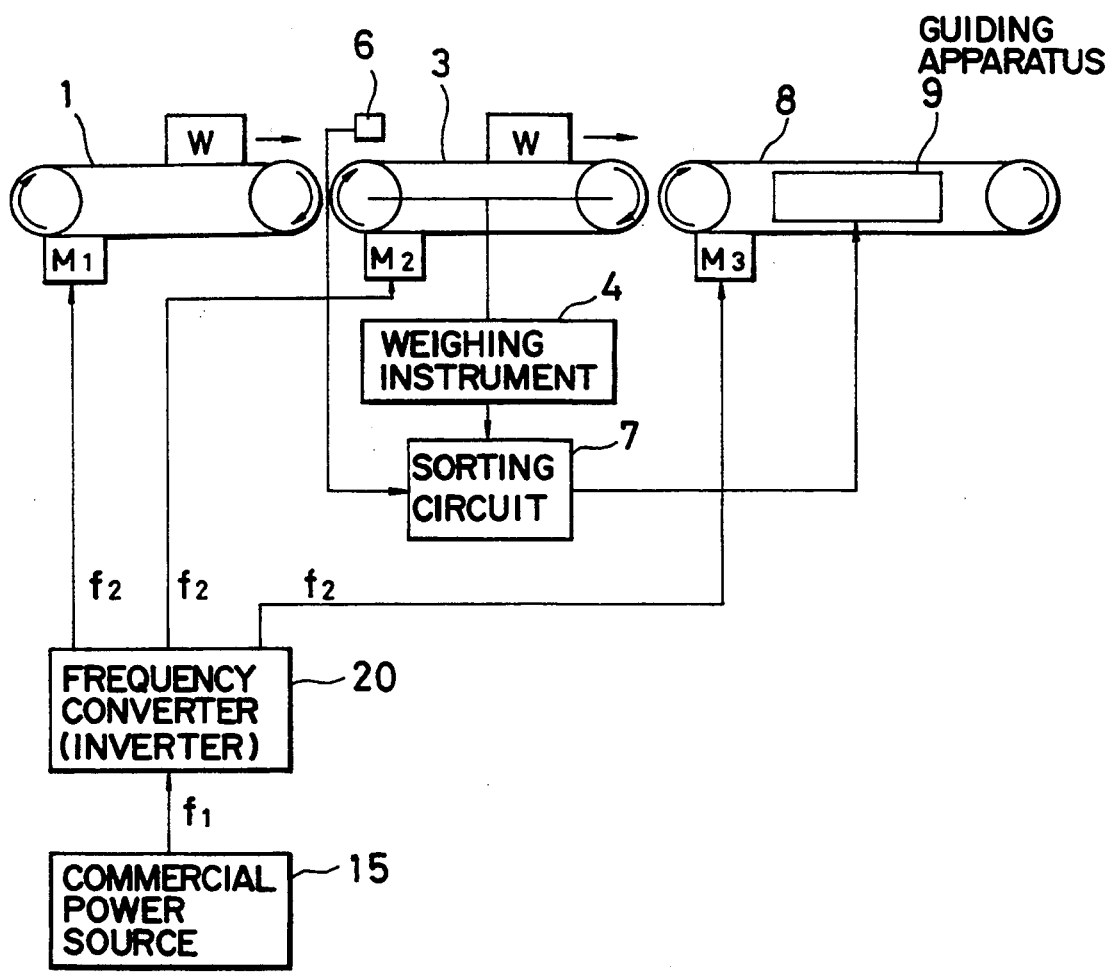
FIG. 1 is a diagram showing the configuration of a first embodiment of the invention.

FIG. 1 shows in diagram a first embodiment of the weighing/sorting machine according to the invention. The components which are similar to those of a conventional machine shown in FIG. 36A are indicated by identical reference numerals.

Figure 36:
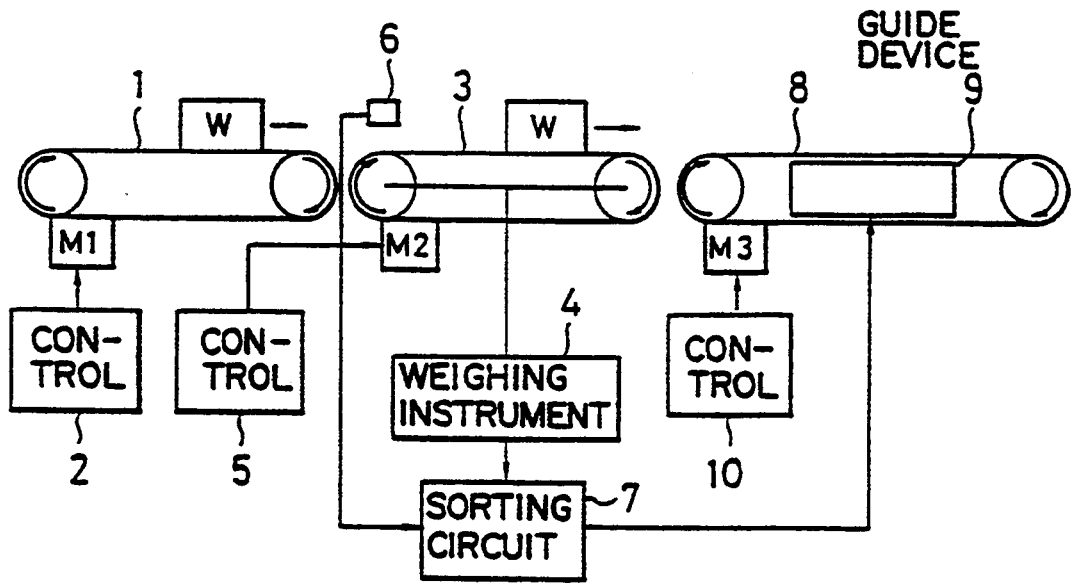
FIGS. 36A through 36D are diagrams showing the configuration of a conventional weighing/sorting machine and that of an inverter used for it.
Figure 36:
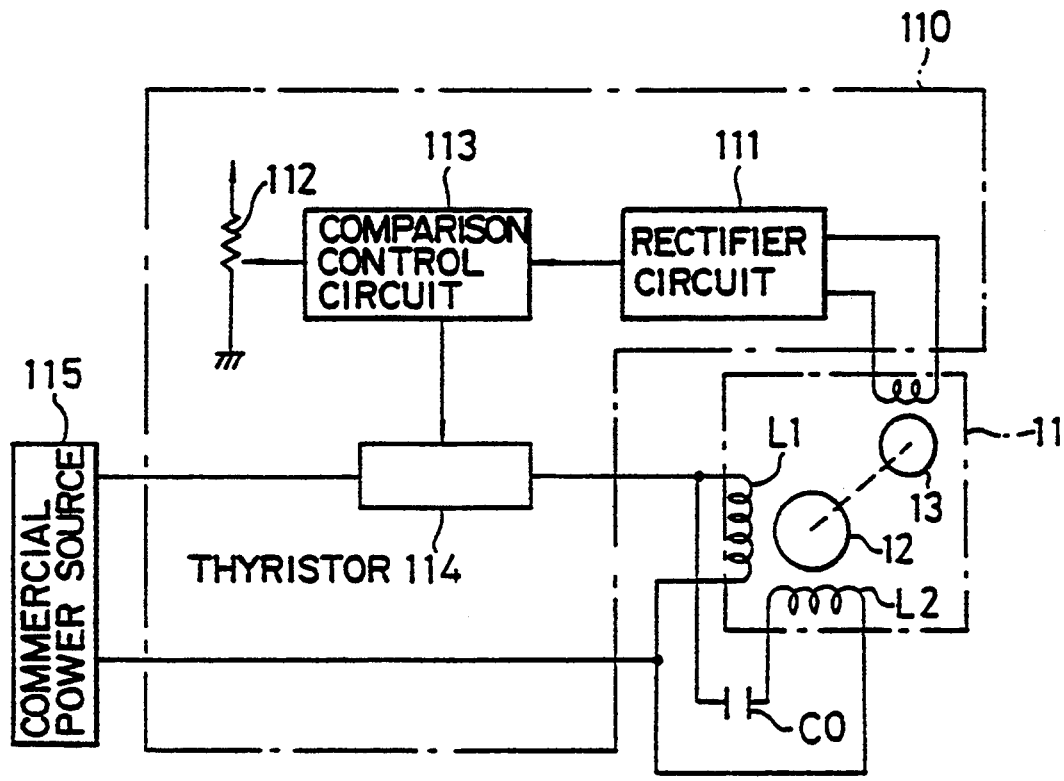
Figure 36:
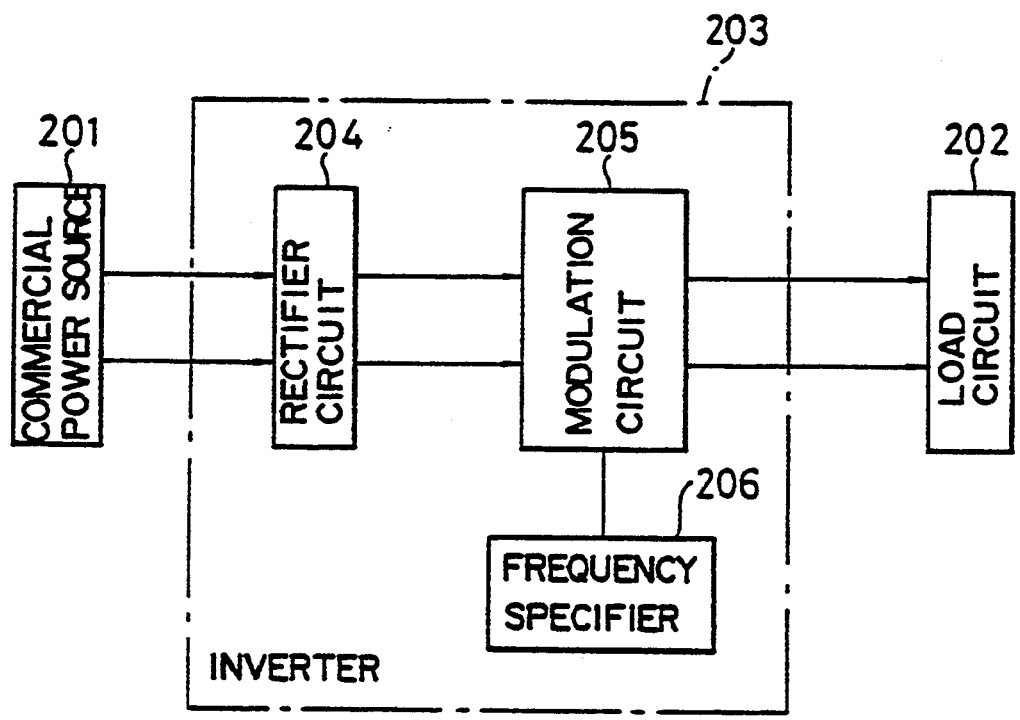
Figure 36:
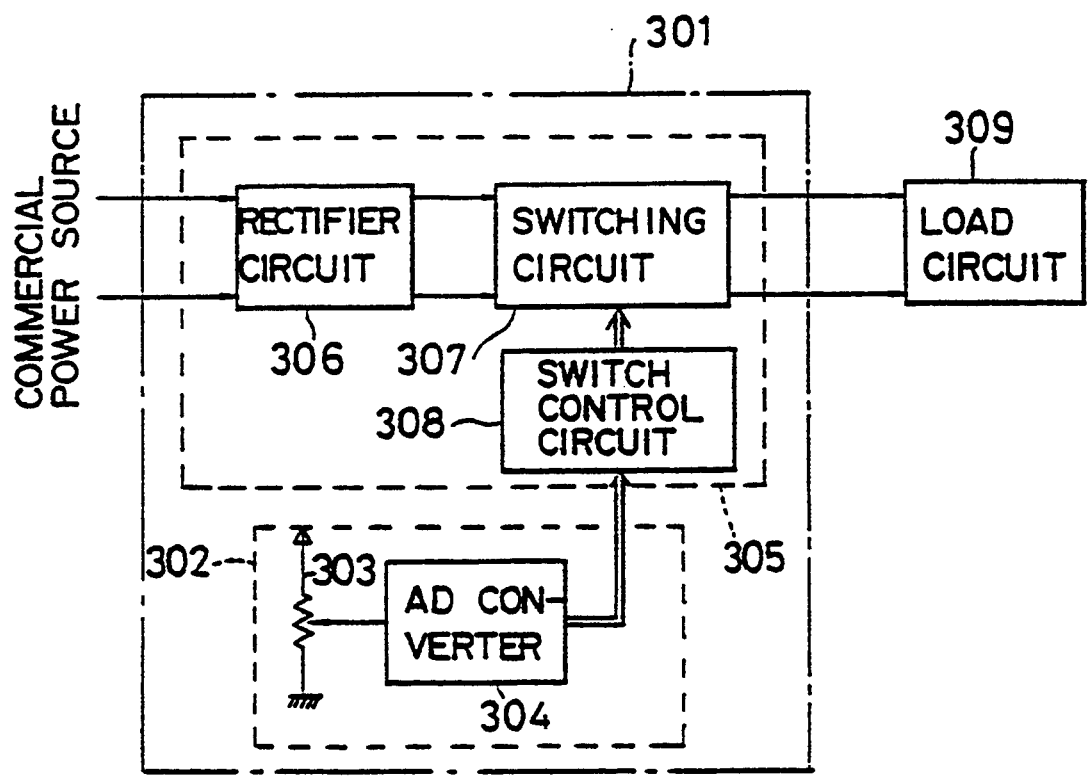

In FIG. 1, reference numeral 20 denotes a frequency converter (inverter) that converts the frequency of AC from a commercial power source 15 (e.g., 100 V, f1=50 Hz) into a desired frequency f2 and can replace the control units 2, 5 and 10 in FIG. 36A. The frequency converter 20 has a configuration as shown in FIG. 2.

Figure 2:
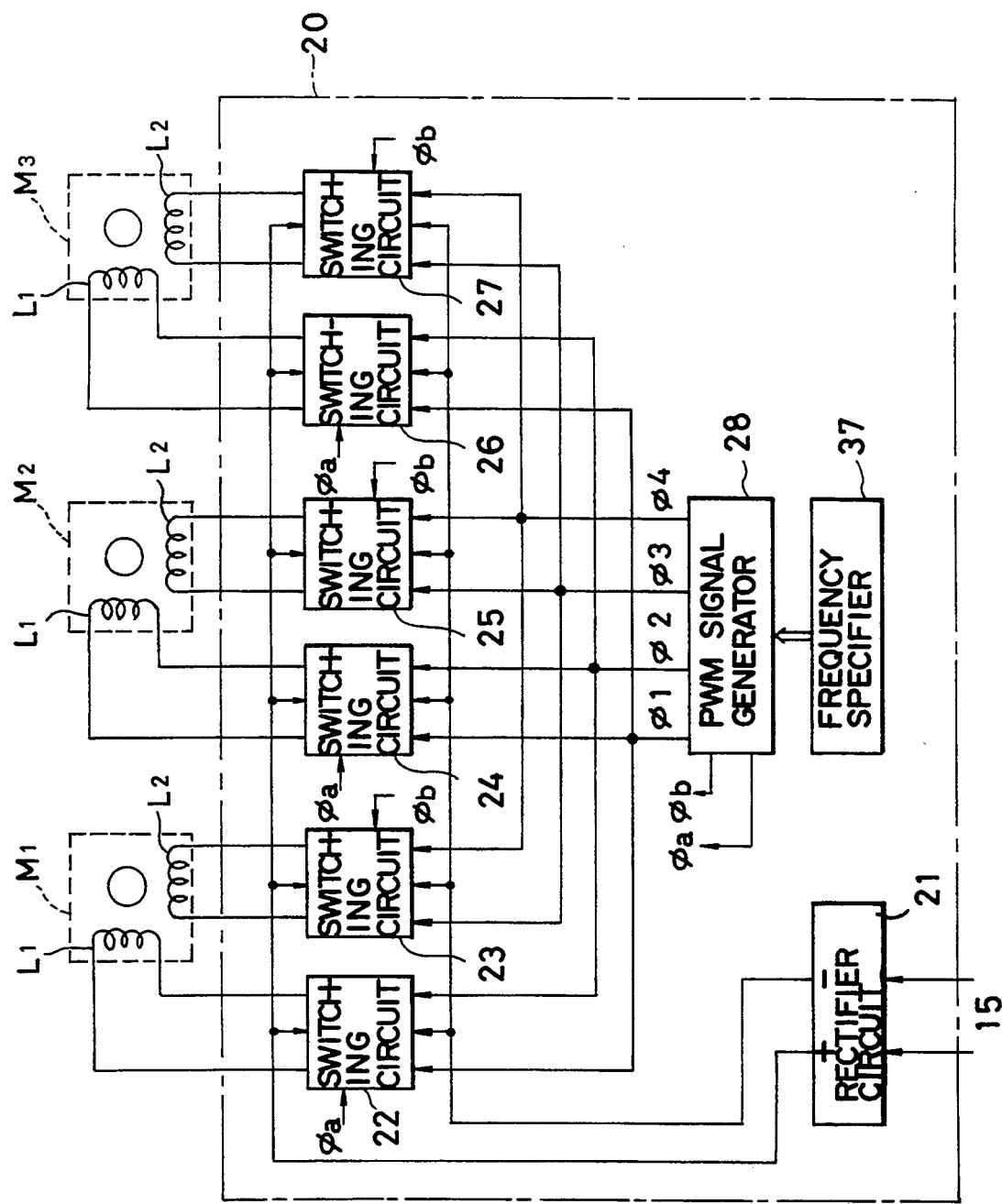
FIG. 2 is a block diagram showing some of the principal parts of the embodiment of FIG. 1.

In FIG. 2, reference 21 denotes a rectifier circuit for converting the AC voltage from a commercial power source into a DC voltage and 22 through 27 denote so many switching circuits having an identical configuration designed to be repeatedly turned on and off according to pulse-width modulated (PWM) signals $\phi 1$ through $\phi 4$ and switching signals $\phi a$ and $\phi b$ in order to supply coils L1s and L2s of AC motors, e.g., single-phase induction type brushless motors, M1 through M4 with AC having a given frequency and a variable pulse width, although whose voltage is equal to the original DC.

Figure 3:
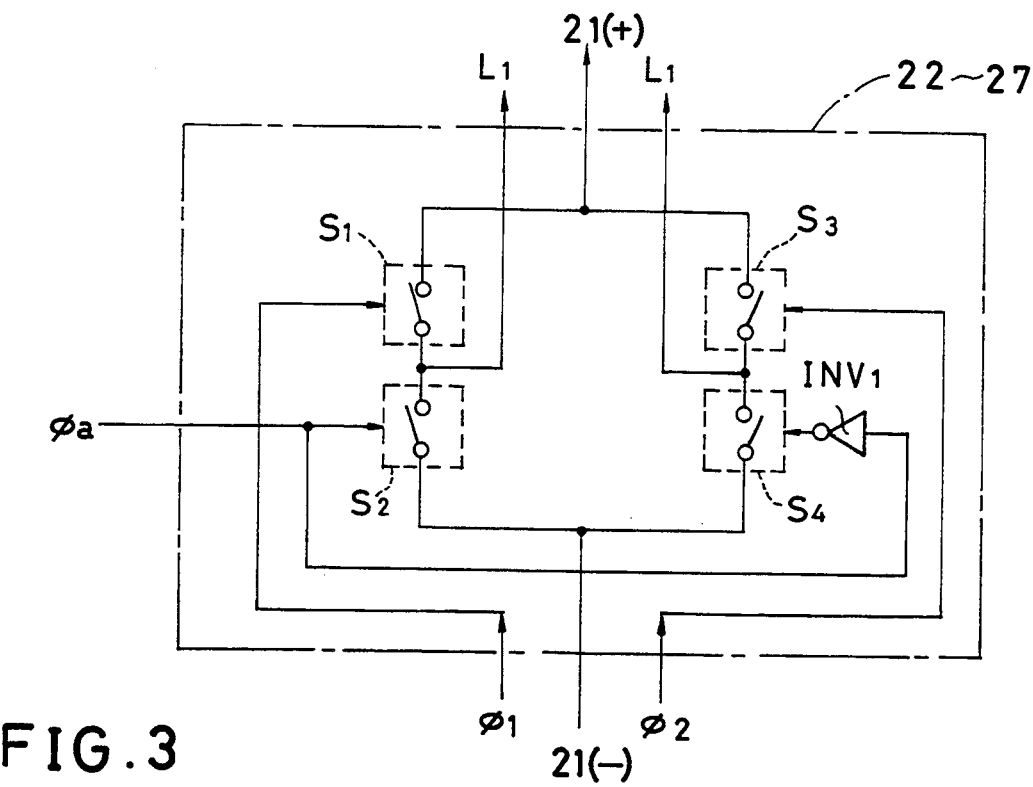
FIG. 3 is a circuit diagram of a part of FIG. 2.

FIG. 3 is a circuit diagram of the switching circuit 22, where the opposite ends of each of serially connected switch pairs S1, S2 and S3, S4 are respectively connected to the positive and negative DC output terminals (+), (−) of the rectifier circuit 21.

Each of the switches S1 through S4 is turned on by a "H" level signal and off by a "L" level signal. At a given instant, a PWM signal $\phi 1$ is sent to the switch S1, while another PWM signal $\phi 2$ is sent to the switch S3.

At the same instant, on the other hand, a switching signal $\phi a$ is given to the switch S2, while a signal obtained by inverting the switching signal $\phi a$ by means of an inverter INV1 is given to the switch S4.

The junction of the switches S1 and S2 and that of the switches S3 and S4 are connected to the opposite ends of the coil L1 of the motor M1.

Each of the remaining switching circuits 23 through 27 has a configuration exactly same as that of the switching circuit 22 as described above and is connected to the opposite ends of either the coil L1 or the coil L2 of one of the motors M1 through M3.

Figure 4:
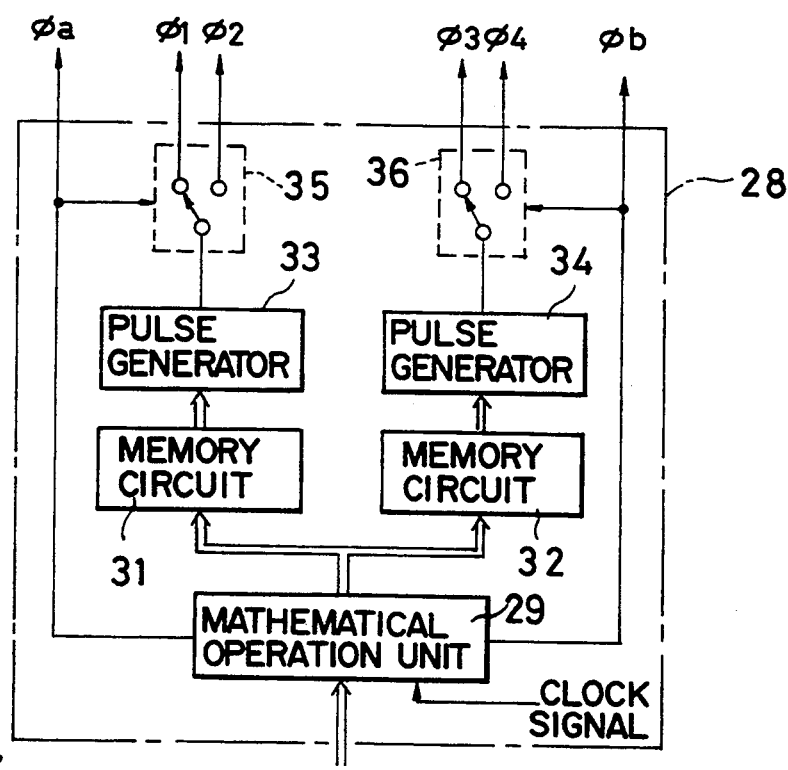
FIG. 4 is a block diagram of a part of FIG. 2.

PWM signal generator 28 has a configuration as shown in FIG. 4 and so that it transmits four-phase PWM signals $\phi 1$ through $\phi 4$, each having a pulse width that varies to trace a sinusoidal wave, and switching signals $\phi a$ and $\phi b$ with phases differentiated by 90° relative to each other in accordance with the output of the frequency specifier 37.

In FIG. 4, reference numeral 29 denotes a mathematical operation circuit that integrates the data accumulated on the rate of conveying objects specified by the frequency specifier 37 for each received clock signal and transmits the obtained values as an address values sequentially to memory circuits 31, 32, while transmitting switching signals $\phi a$, $\phi b$ having phases differentiated by 90° relative to each other.

Each of the memory circuits 31, 32 stores beforehand data on pulse width that varies as a sine function and those on pulse width that varies as a cosine function and generates pulse width data corresponding to the address value transmitted from the mathematical operation circuit 29.

Reference numerals 33 and 34 denote pulse generators for generating pulses with duty ratios reflecting the data on pulse widths transmitted from the respective memory circuits 31 and 32.

Reference numerals 35 and 36 denote switching circuits designed to selectively forward the signals coming from the pulse generators 33 and 34 according to the switching signals $\phi a$ and $\phi b$ having phases differentiated by 90° relative to each other which are transmitted from the mathematical operation circuit 29. They select signals $\phi 1$ and $\phi 3$ when the switching signal they receive has level "L" and signals $\phi 2$ and $\phi r$ when the switching signal they receive has level "H".

The mathematical operation circuit 29 so operates that, each time when address values given to the memory circuits 31, 32 have gone through the respective address regions, it generates switching signals $\phi a$ and $\phi b$ to switch the switching circuits 35, 36 in such a manner that an alternately selected set of PWM signals are forwarded by the switching circuit 35 and 36.

Figure 5:
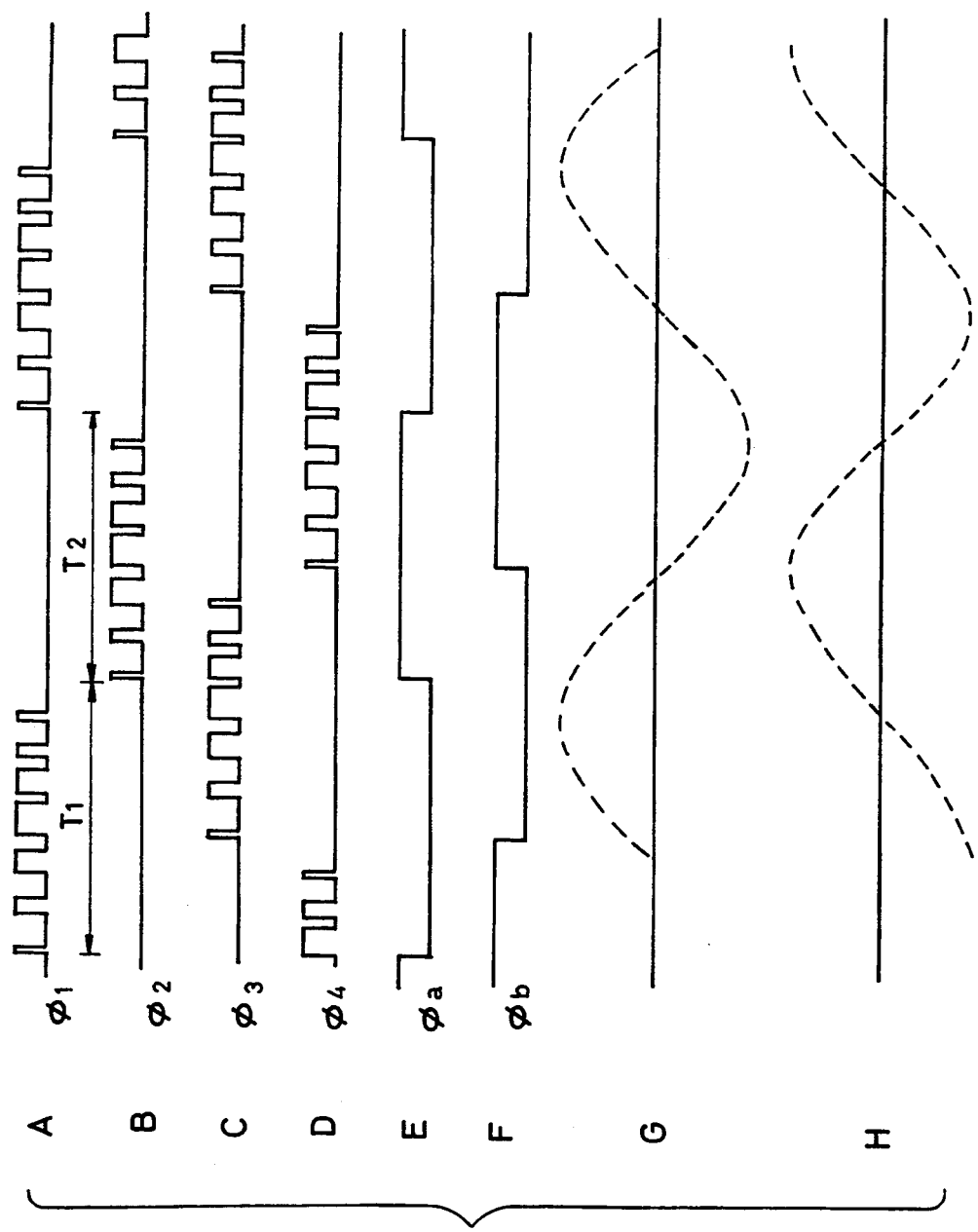
FIG. 5 is a graphic illustration showing waveforms of a signal to be used to operate the embodiment of FIG. 1.

Thus, the PWM signal generator 28 generates and transmits PWM signals $\phi 1$ through $\phi 4$ and switching signals $\phi a$ and $\phi b$ in a manner as illustrated by the respective timing charts A through D of FIG. 5. While, for instance, PWM signal $\phi 1$ is applied to the switching circuit 22 (for a period of time T1), the switch S4 is kept ON by a switching signal obtained by inverting the switching signal $\phi a$ so that the electric current running through the coil L1 of the motor M1 augments during the period T1 to draw a sine curve as shown by chart G in FIG. 5.

Then, while PWM signal $\phi 2$ is applied to the switching circuit 22 (for a period of time T2), the switch S2 is kept ON by a switching signal $\phi a$ so that the electric current running through the coil L1 augments in the other way.

It will be understood that, consequently, AC having a frequency f2=1/(T1+T2), which is determined by the data on the rate of conveying objects, runs through the coil L1 of the motor M1.

Since PWM signals $\phi 3$ and $\phi 4$ are generated with a delay equivalent to 90° relative to the corresponding respective signals $\phi 1$ and $\phi 2$, AC having an identical frequency f2 but a phase differentiated by 90° relative to that of the AC for the coil L1 as illustrated in chart H of FIG. 5 runs through the coil L2 of the motor M4 to drive it with a rate of rotation equal to the frequency.

The remaining motors M2 and M3 are also driven by ACs having a same frequency f2 so that, consequently, the feeding conveyor 1, the weighing conveyor 3 and the sorting conveyor 8 are driven at an identical speed determined by the data given to operate the apparatus.

Therefore, the objects brought to the feeding conveyor 1 are moved at a given rate and then transferred to the weighing conveyor 3 that runs at the same rate without giving it any significant shock.

Each of the object put on the weighing conveyor 3 is detected by a sensor 6 and, after the elapse of a period of time selected to allow the signal representing the weight of the object to stabilize, the object is classified by the sorting circuit 8 according to its weight. Then, a sorting signal corresponding to the weight is generated and transmitted to the next stage.

The object transferred from the weighing conveyor 3 to the sorting conveyor 8 is then guided to a proper take-out position by means of a guide device 9 to be further conveyed to a succeeding step of the production line (not shown).

If the objects should be moved at a considerably low rate for sorting for some reason, for instance because of an oblong shape of the objects, a low and identical speed of the conveyors can be achieved by specifying a low frequency by means of the frequency specifier 29 to realize short addressing intervals for the memory circuits 31, 32 and a large T1+T2 in order to reduce the frequency of the AC supplied to the coils L1 and L2 of the motors M1, M2 and M3. Since this control technique involves AC frequency control, the torque of each of the motors M1, M2 and M3 remains practically unaffected.

While a sorting conveyor 8 is arranged downstream to the weighing conveyor 3 in the above embodiment, it may be replaced by a shooter-type sorting device that receives the objects coming from the weighing conveyor 3 by a slope and then leads them to different courses according to the sorting signal transmitted for each of them.

The frequency converter 20 of the above embodiment for controlling the motors to operate at a same speed may be replaced by three frequency converters, each controlling a motor according to a same frequency specifying signal given to all the converters simultaneously so that all the motors may run at a same speed.

While the frequency converter 20 of the above embodiment is so designed as to perform pulse width modulation in order to supply AC current having a sinusoidal waveform to the coils, a frequency converter of the pulse frequency modulation type or the pulse amplitude modulation type may be alternatively used.

A weighing/sorting machine incorporating the first embodiment of the present invention uses a frequency converter (inverter) to generate AC with a desired frequency in order to feed a plurality of motors and therefore it can equalize the speed of the feeding conveyor and that of the weighing conveyor and alter the speed without requiring intricate control operations.

Moreover, since it is free from reduction torque at the time of low speed operation, heavy or long objects may be handled for conveying and sorting without difficulty.

Figure 6:
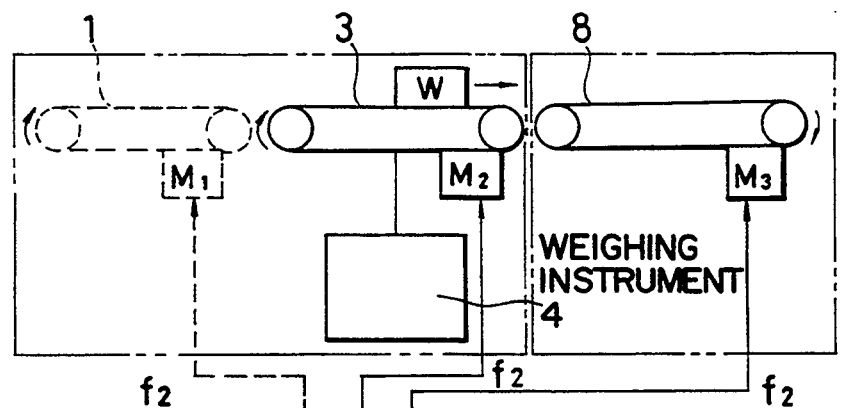
FIGS. 6A through 6C are diagrams showing alternative configurations obtained by modifying that of FIG. 1.
Figure 6:
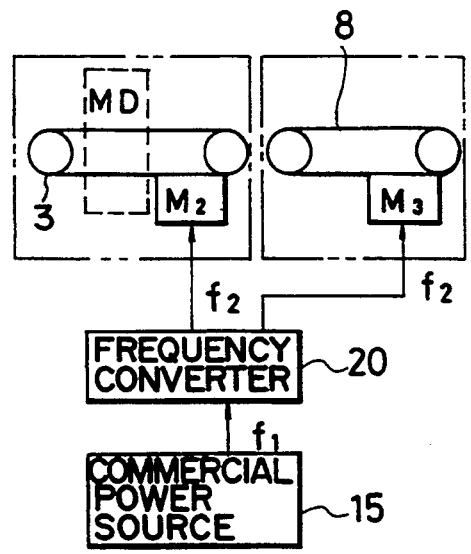
Figure 6:
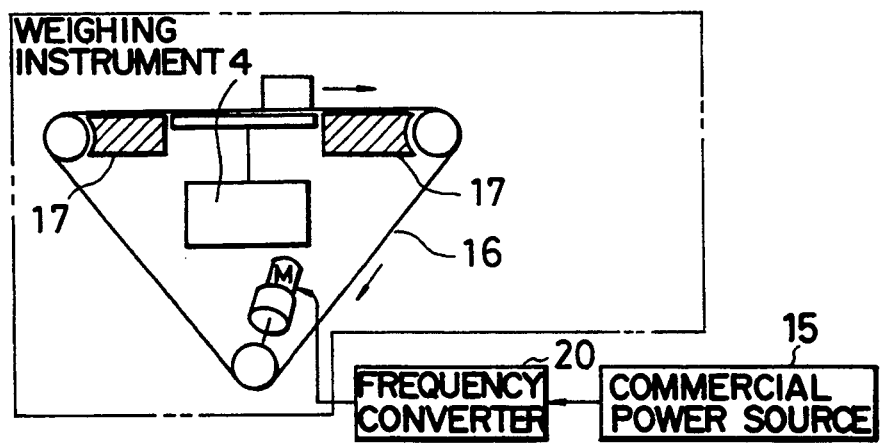

The first embodiment of the invention may be so modified as to eliminate the feeding conveyor 1 and to have a configuration as illustrated in FIG. 6A.

Again, the modified embodiment of FIG. 6A may be so modified as to eliminate the weighing instrument 4 or to replace the weighing instrument 4 with a metal detector MD (using, in this case, the weighing conveyor as a feeding conveyor).

The first embodiment may have an alternative configuration as illustrated in FIG. 6C, where a triangularly arranged endless chain or belt 16 is used to carry objects W, which are weighed by a weighing instrument 4 on the way of being conveyed. Reference numeral M in FIG. 4C denotes a motor, while reference numeral 17 denotes fixed members.

Now, the motor control system using a frequency converter (inverter) 20 for driving and controlling the first embodiment of the conveying/measuring apparatus of the invention comprising motors M1, M2 and M3 and conveyors 1, 3, 8 will be described.

Figure 7:
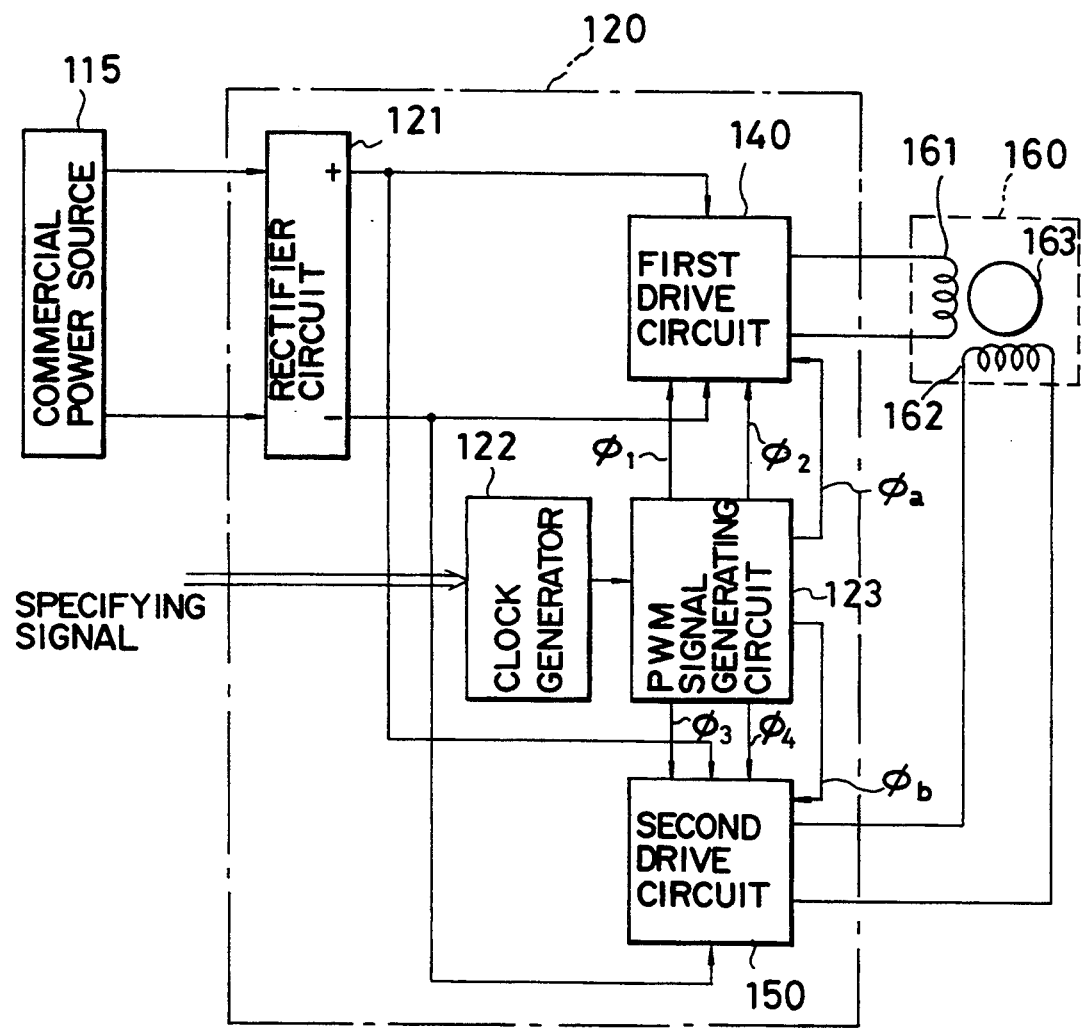
FIG. 7 is a block diagram showing the configuration of an inverter to be used for controlling the motors of the embodiment of FIG. 1.

In FIG. 7 showing the configuration of the motor control system which is generally indicated by reference numerals 120, 121 denotes a rectifier circuit for converting the AC from a commercial power source 115 (e.g., 50 Hz, 100 V) into DC, reference numeral 122 denotes a clock signal generator for generating clock signals in response to trigger signals applied thereto externally, 123 denotes a PWM signal generating circuit for generating four-phase PWM signals $\phi 1$, $\phi 2$, $\phi 3$ and $\phi 4$ with different timings in response to clock signals applied thereto and switching signals $\phi a$ and $\phi b$ with phases differentiated by 90° relative to each other.

Figure 8:
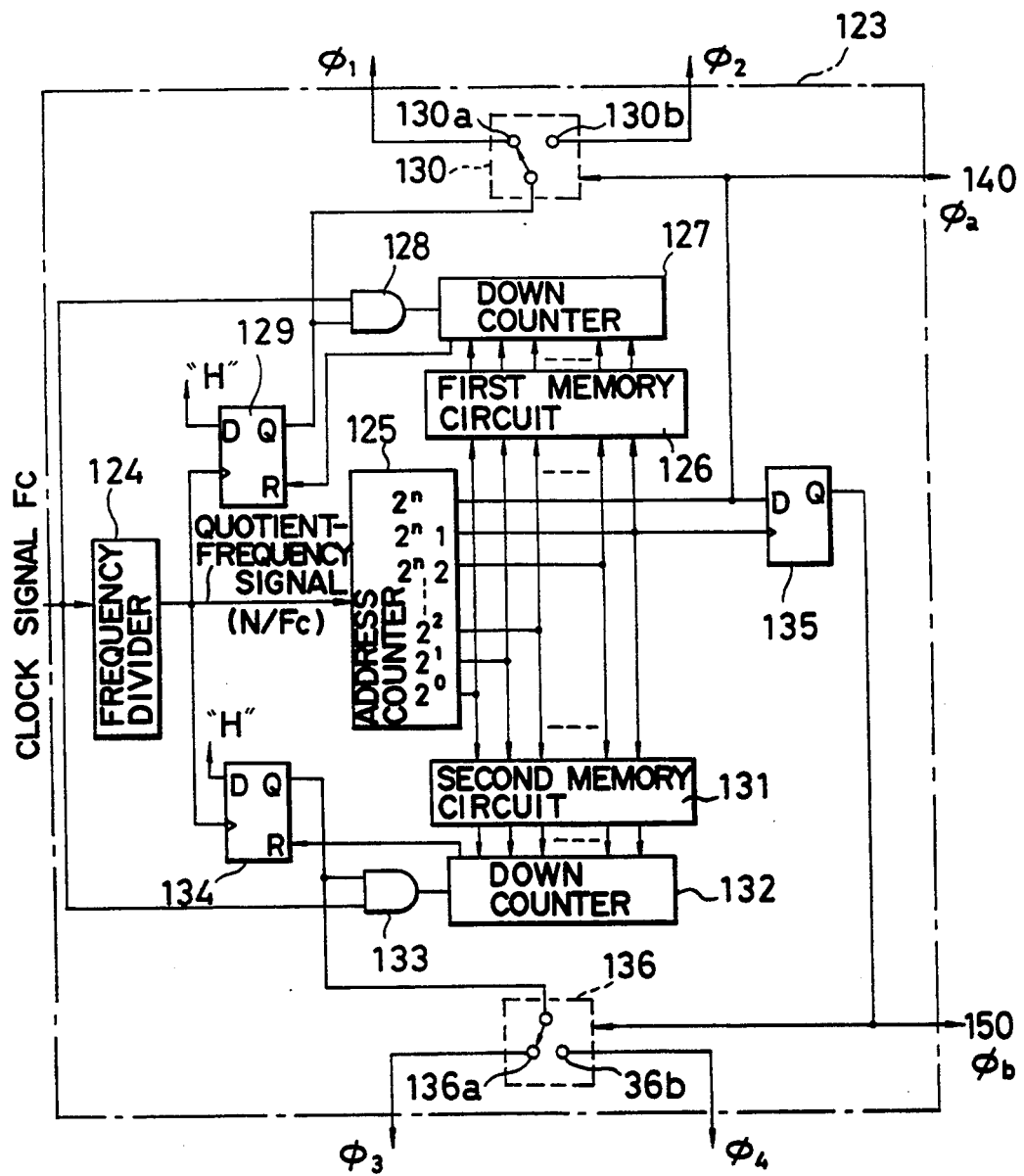
FIG. 8 is a circuit diagram of a principal area of the inverter of FIG. 7.

The PWM signal generating circuit 123 typically has a configuration as shown in FIG. 8.

In FIG. 8, reference numeral 124 denotes a frequency divider for dividing the frequency of the clock signal by N, reference numeral 125 denotes a n+1-bit address counter for counting the number of the quotient-frequency signals transmitted from the frequency divider 124.

Reference numeral 126 denotes a first memory circuit having an n-bit address space.

This first memory circuit 126 stores pulse width data W0 through W2n−1, each of which is expressed in terms of $B \cdot \sin(A \cdot \pi / 2^n)$, where A is an address value (A=0~$2^n$−1) and B is a constant.

Reference numeral 127 (FIG. 8) denotes a down-counter that decrements by "1" the initial value of the pulse width data W read out from the first memory circuit 126 each time it receives a clock signal by way of an AND-circuit 128 and transmits a reset signal to a flip-flop 129 whenever it reads count "0".

The flip-flop 129 sets its output Q to level "H" at the rising edge of a quotient-frequency signal to open the gate of the AND-circuit 128 and allow a clock signal to enter the down-counter 127.

Thus, whenever a quotient-frequency signal shows its rising edge, the address value for the first memory circuit 126 is incremented by "1" and a pulse width data corresponding to the address value A is set in the down-counter 127 to initiate an operation of counting down the clock signal by way of the AND-circuit 128 so that the flip flop 129 becomes reset when a number of clock signals is equal to the pulse-width data W have been received by it.

As a result, the flip-flop 129 sends out from its output terminal Q a PWM signal whose pulses are synchronized with the corresponding rising edges of the quotient-frequency signals and have widths defined by the corresponding pulse width data W.

Reference numeral 130 denotes a switching circuit that transmits the output of every (n+1)ah bit of the address counter 125 as a switching signal $\phi a$ so that a PWM signal is transmitted from terminal 130a whenever the level of the switching signal $\phi a$ is "L" and from terminal 130b whenever the level of the switching signal $\phi a$ is "H". The terminal disconnected from the output terminal of the flip-flop 129 is automatically turned to level "L".

Reference numeral 131 denotes a second memory circuit having an n-bit address space as the first memory circuit 126.

This second memory circuit 131 stores pulse width data K0 through K2n−1, each of which is expressed in terms of the absolute value of $B \cdot \cos(A \cdot \pi /^2 n)$ as illustrated in FIG. 10.

Reference numeral 132 (FIG. 8) denotes a down-counter that decrements by "1" the initial value of the pulse width data K read out from the second memory circuit 131 each time it receives a clock signal by way of an AND-circuit 133 and transmits a reset signal to a flip-flop 134 whenever it reads count "0".

The flip-flop 134 sets its output Q to level "H" at the rising edge of a quotient-frequency signal to open the gate of the AND-circuit 133 and allow a clock signal to enter the down-counter 132.

As a result, the flip-flop 134 sends out from its output terminal Q a PWM signal whose pulses are synchronized with the corresponding rising edges of the quotient-frequency signals and have widths defined by the corresponding pulse width data K stored in the second memory circuit 131.

Reference numeral 135 denotes a flip-flop that latches the level of the output $\phi a$ of the (n+1)th bit synchronously with the rising edge of the output of the nth bit of the address counter 125 and its output Q is sent out as a switching signal $\phi b$ having a phase delayed by 90° from that of the switching signal $\phi a$.

The switching circuit 136 lets a PWM signal goes through the output terminal 136a when the switching signal $\phi b$ from the flip-flop 135 shows level "L" and through the output terminal 136b when the switching signal $\phi b$ shows level "H".

The two sets of PWM signals ($\phi 1$, $\phi 2$) and ($\phi 3$, $\phi 4$) coming from the respective switching circuit 130 and 136 and the switching signals $\phi a$, $\phi b$ are sent to first and second drive circuit 140 and 150 respectively as illustrated in FIG. 7.

Figure 11:
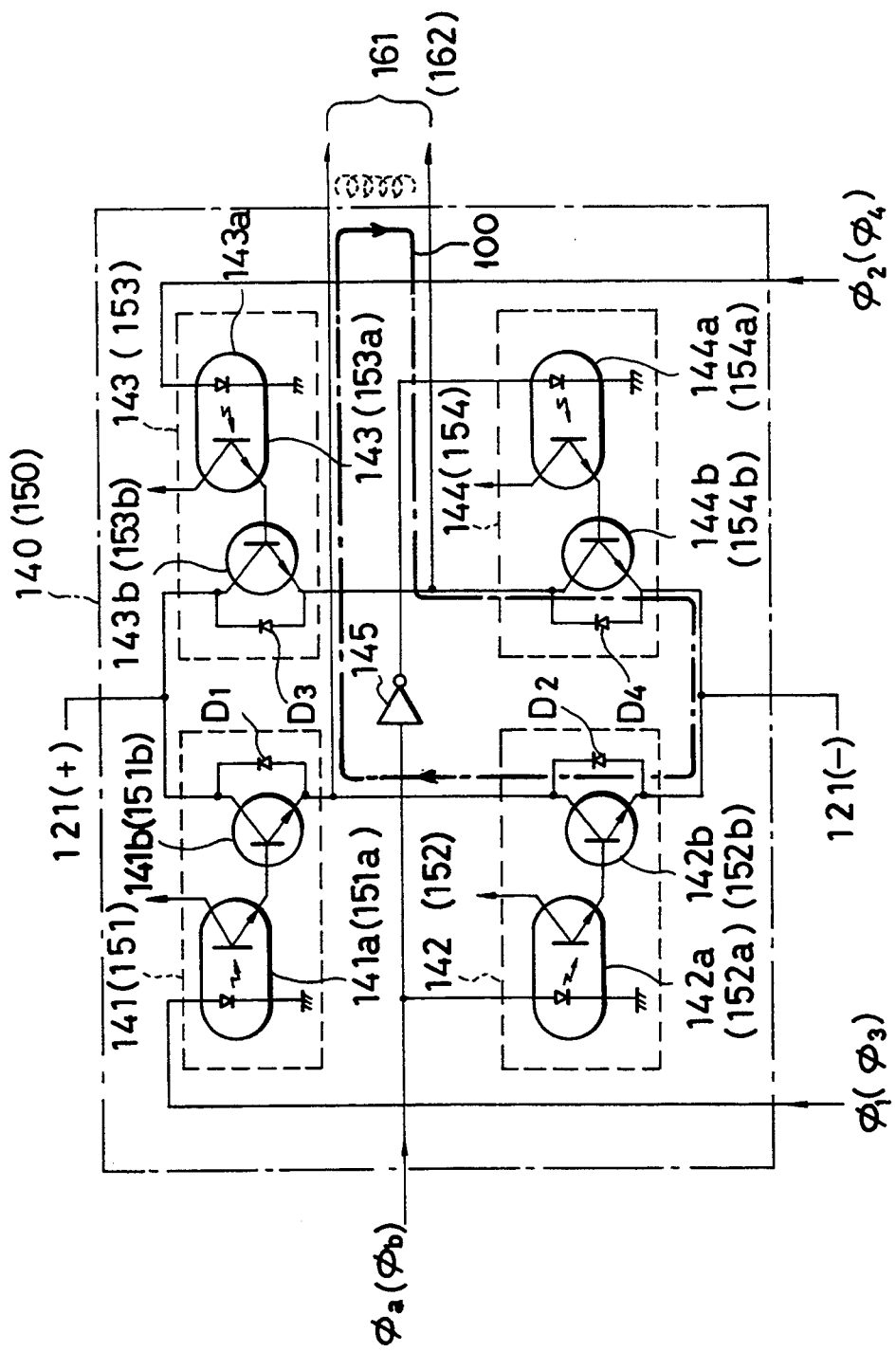
FIG. 11 is a circuit diagram of a principal area of the inverter of FIG. 7.

Both of the two drive circuits have a configuration as shown in FIG. 11.

Referring to FIG. 11, it shows that reference numerals 141 through 144 (151 through 154) denote so many switching circuit, comprising respectively photocouplers 141a through 144a (151a through 154a), driving transistors 141b through 144b (151b through 154b) and protector diodes D1 through D4 and that currently the switching circuit 141 (151) has received a PWM signal $\phi 1$ ($\phi 3$) and the switching circuit 142 (152) has received a switching signal $\phi a$ ($\phi b$).

It also shows that currently a PWM signal $\phi 2$ ($\phi 4$) has been sent to the switching circuit 143 (153) and a switching signal $\phi a$ ($\phi b$) has been inverted by the inverter 145 and sent to the switching circuit 144 (154).

The switching circuits 141, 142 (151, 152) are serially connected to a DC power source, or rectifier circuit 121, and a terminal of a first coil 161 (a second coil 162) of motor 160 is connected to the junction of the two switching circuits.

Similarly, the other terminal of the first coil 161 (the second coil 162) is connected to the junction of the two switching circuits 143, 144 (153, 154) which are also serially connected to the DC power source.

The motor control system 120 as illustrated in FIG. 7 operates in the following manner.

Figure 12:
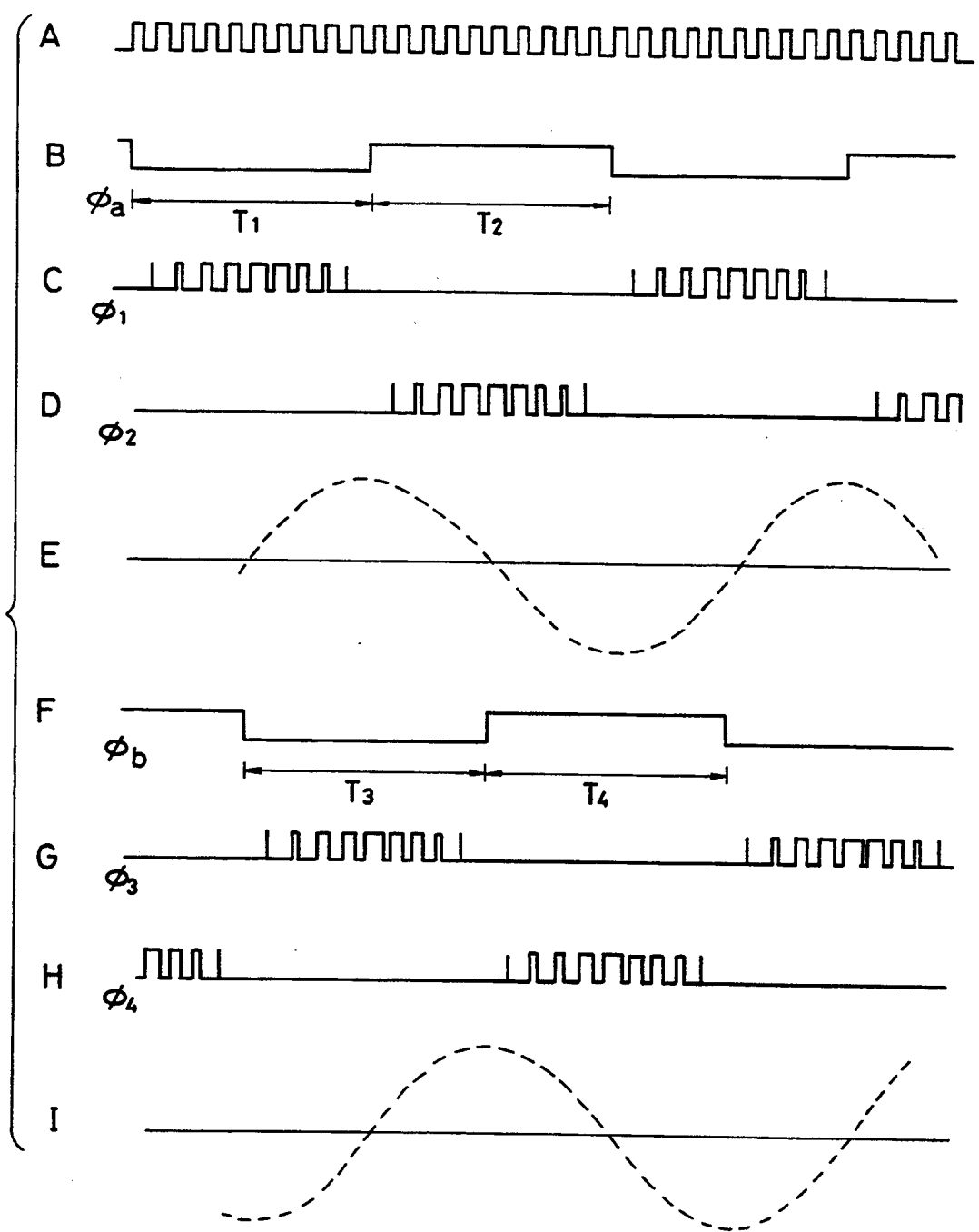
FIG. 12 is a graphic illustration showing waveforms of a signal to be used to operate the inverter of FIG. 7.

When the clock generator 122 generates and transmits a clock signal having a frequency Fc specified by an external frequency specifying signal to the PWM signal generating circuit 123, the frequency of the clock signal is divided by N by the frequency divider 124 and a quotient-frequency signal having a frequency of Fc/N as shown by chart A of FIG. 12 is transmitted to the address counter 125.

The address value A of the address counter 125 is incremented by "1" each time it receives a pulse of the quotient-frequency signal and causes the first memory circuit 126 to sequentially transmit pulse width data W0 through W2n−1 so that, during the period (T1) where the switching signal $\phi a$ (chart B of FIG. 12) for the (n+1)th bit of the address counter 125 remains at level "L", a PWM signal $\phi 1$ is transmitted as shown by chart C of FIG. 12, whereas, during the period (T2) where the switching signal $\phi a$ keeps level "H", another PWM signal $\phi 2$ is transmitted as shown by chart D of FIG. 12 (T1=T2=$2^2$·N/Fc).

Since the switching circuit 144 is kept ON by an inverted signal of the switching signal $\phi a$ during the period T1, the first coil 161 of the motor 160 receives a DC that increases to draw a sinusoidal curve as illustrated in chart E of FIG. 12.

During the period T2, on the other hand, the DC running through the first coil 161 decreases to further follow the sinusoidal curve as a PWM signal $\phi 2$ is sent to the switching circuit 143 of the first drive circuit 140 so that the switching circuit 142 is kept ON by a switching signal $\phi a$.

In this manner, an AC with a given frequency is caused to run through the first coil by the PWM signals $\phi 1$, $\phi 2$ and the switching signals $\phi a$, $\phi b$. It may be need-less to say that the electric current running through the first coil 161 draws a sinusoidal curve having a period of T1+T2 (=$2^{n+1}$·N/Fc).

Similarly, the second memory circuit 131 also sequentially transmits pulse width data K0 through K2n−1 in response to the address value A of the address counter. However, it should be noted that, since the switching signal $\phi b$ has a phase delayed by 90° relative to the switching signal $\phi a$ as shown by chart F of FIG. 12, a PWM signal with pulse widths that correspond to the upper half of the pulse width data K stored in the second memory circuit 131 is transmitted during period T3 that overlaps the rear half of the period T1 and the front half of the period T2 and thereafter a PWM signal having pulse widths that correspond to the lower half of the pulse width data K is transmitted during period T4 that occupies the rear half of the period T2 and the front half of the period T1.

Thus, the PWM signal $\phi 3$ produces a waveform which is identical with that of the PWM $\phi 1$ but delayed by $\frac{1}{4}$ of a period as illustrated in chart G of FIG. 12. Similarly, the PWM signal $\phi 4$ shows a waveform identical with that of the PWM $\phi 2$ which is delayed by $\frac{1}{4}$ of a period as illustrated in chart H of FIG. 12.

Consequently, the electric current supplied to the second coil 162 of the motor 160 has a waveform as illustrated in chart I of FIG. 12, which is a sinusoidal curve having a phase delayed by 90° relative to that of the current running through the first coil 161.

As two electric currents whose phases are differentiated by 90° respectively run through the first and second coils 161, 162, the rotor 163 of the motor 160 is driven to rotate at a rate equivalent to the frequency of Fc/($2^{n+1}$·N).

It may be clear that the rotary speed of the motor 160 is linearly proportional to the clock frequency and therefore a desired rate of rotation of the motor may be realized by modifying the clock frequency Fc.

Figure 13:
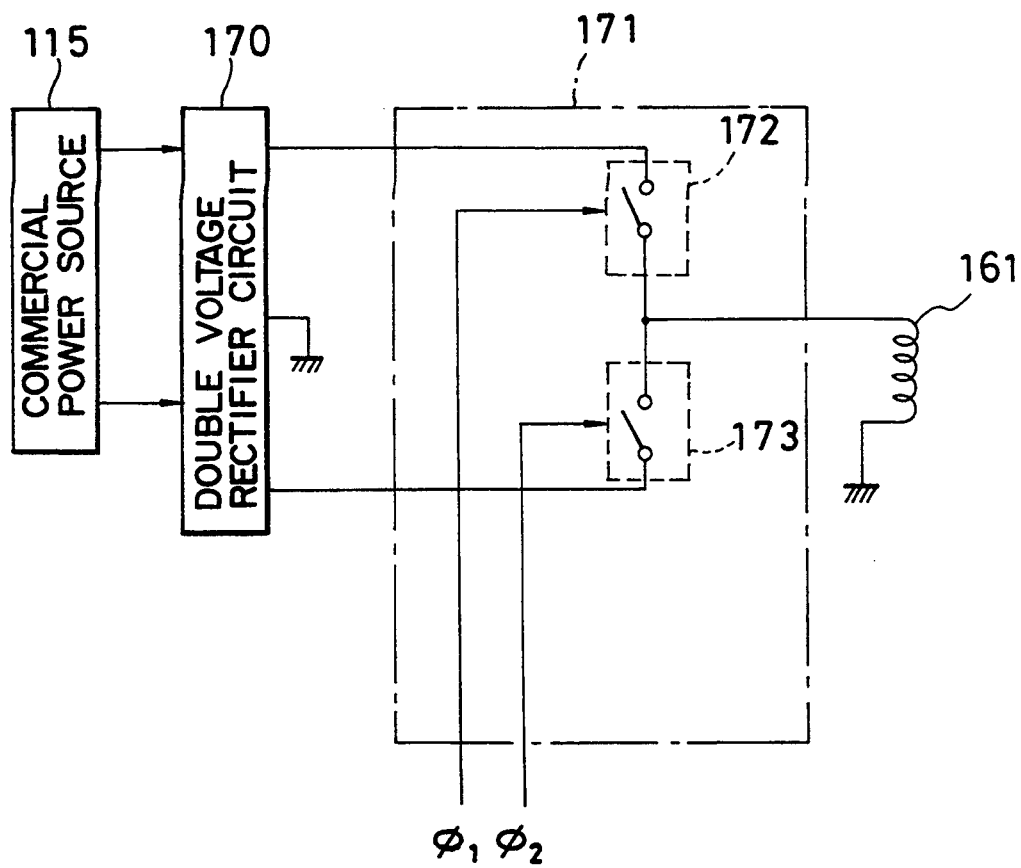
FIGS. 13 and 14 are diagrams showing principal areas of alternative configurations obtained by modifying that of FIG. 7.

While the motor control circuit of FIG. 7 is so designed that the first and second coils 161, 162 of the motor 160 is supplied with power while the power source having a voltage which is positive relative to the reference voltage (the earth potential) is kept OFF by a PWM signal, it may be alternatively such as illustrated in FIG. 13, where the source current from the commercial power source 115 is rectified by a voltage doubler/rectifier circuit 170 to generate both positive and negative power sources for the drive circuit 171 and PWM signals $\phi 1$ and $\phi 2$ are alternately transmitted for a given period of time to switches 172, 173 which are o serially connected to the positive and negative power sources so that the first coil 161 of the motor 160 may receive AC as in the case of its counterpart in FIG. 7.

While each of the switching circuits 141 through 144 (151 through 154) of FIG. 7 are constituted by a photocoupler and a driving transistor, the circuit configuration is not limited thereto and may alternatively be so designed as to comprise switch devices (transistors, FETs, etc.) that can be directly turned on and off by PWM signals.

While the first and second memory circuits 126, 131 of the PWM generating circuit 123 of FIG. 7 stores pulse width data for a width that varies between 0 and π, the storage capacity of each of the circuit may be economized by storing data only for a width between 0 and π/2 and utilizing them for the latter half of the variable range.

Figure 14:
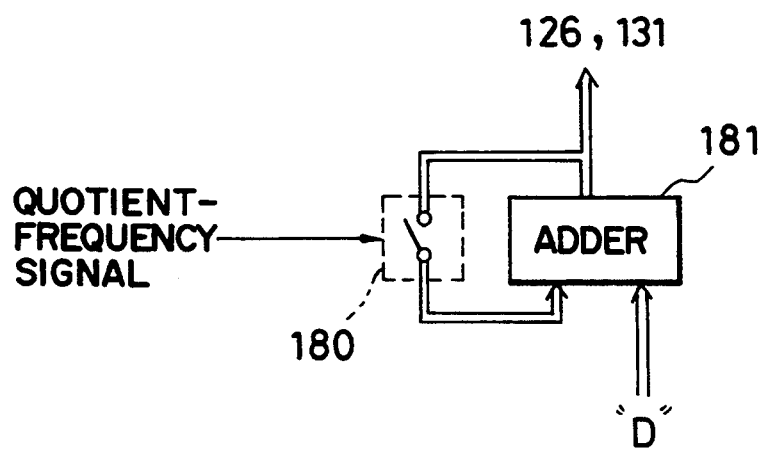

Moreover, the PWM signal generating circuit 123 of FIG. 8 may be so modified as to obtain an alternative circuit as illustrated in FIG. 14, where the address counter 125 of FIG. 8 is replaced by a switch 180 which is turned on for a given period of time by the rising edge of a quotient-frequency signal and an adder 181 for receiving data for given addressing intervals D. Then, the output value of the adder 181 will be incremented at intervals equivalent to the addressing intervals, or intervals at which quotient-frequency signals are entered, so that the first and second memory circuits 126 and 131 may be addressed with desired intervals and therefore the frequency of the AC running through each of the coils of the motor may be varied without changing the frequency of the clock signal.

While the motor control circuit of FIG. 7 operates to supply the motor coils with an electric current that varies to trace a sinusoidal wave according to a modulated pulse signal whose pulse width is modulated to draw a sinusoidal wave, pulse modulation may be done to supply the motor coils with AC with a desired frequency not by way of pulse width but by using a pulse signal that has an invariable and constant pulse width but whose frequency can be so modulated as to draw a sinusoidal wave (frequency modulation) or a pulse signal that also has an invariable and constant pulse width but those amplitude can be so modulated as to trace a sinusoidal wave (amplitude modulation).

With any of the above described motor control systems, the first and second coils are supplied with ACs having phases differentiated by 90° relative to each other and amplitudes that vary to draw a sinusoidal wave and obtained by incessantly interrupting a DC by means of a modulated pulse signal so that the rate of rotation of the motor can be controlled by modulating the frequency of the pulse signal and consequently a large and even torque of the motor is guaranteed over a wide range of rotary speed.

Since the rotary speed of the motor is controlled by means of the frequency of the modulated pulse signal, a plurality of motors may be driven at a same rate by giving them same frequency data.

With a motor control system as described above, a PWM signal is given to one of a pair of the two serially connected push-pull type switch pairs of a switching circuit, which are alternately closed to establish a current path for a motor coil, and a switching signal is given to the other of the pair of the switches to keep them ON all the way during the period where the PWM signal is applied to the former switch so that the switches are kept closed, while the other pair of switches, or the switches that are open, form a closed loop with the motor coil, owing to the diodes D1 through D4 additionally arranged within the switching circuit. Therefore, whenever the level of the PWM signal falls to "L" to generate a counter electromotive force within the motor coil, it is guided to the closed loop, which is formed by the switches kept ON all the way during the period where the PWM signal is applied and the juxtaposed diodes (loop 100 indicated by a thick chain line in FIG. 11), and returned to the motor coil.

It may be easily understood that, without such an arrangement, the power supply route to the motor coil will be interrupted, if momentarily, by the counter electromotive force generated each time when the level of the PWM signal falls to "L" to decelerate the motor and give rise to undesired wows to the rotation of the rotor, reducing consequently the torque of the motor.

An inverter controlled conveying/measuring apparatus according to the invention and using a motor control system to drive a single-phase induction-type brushless motor by means of PWM signals and an inverter as described above is, however, totally free from wows in the rotation of the rotor and maintains a high torque because any counter (residual) electromotive force of the motor coil is absorbed by a closed loop established within the switching circuit to provide a so-called flywheel effect.

FIG. 15A shows the configuration of an alternative motor control system involving two power sources with positive and negative potentials to drive the motor in place of a single power source of the type as illustrated in FIG. 7. It is seen that this configuration involves only six field effect transistors FET1 through FET6 as so many switches and four diodes D1 through D4 (while the configuration of FIG. 7 needs to use eight switches and eight diodes).

Figure 15C:
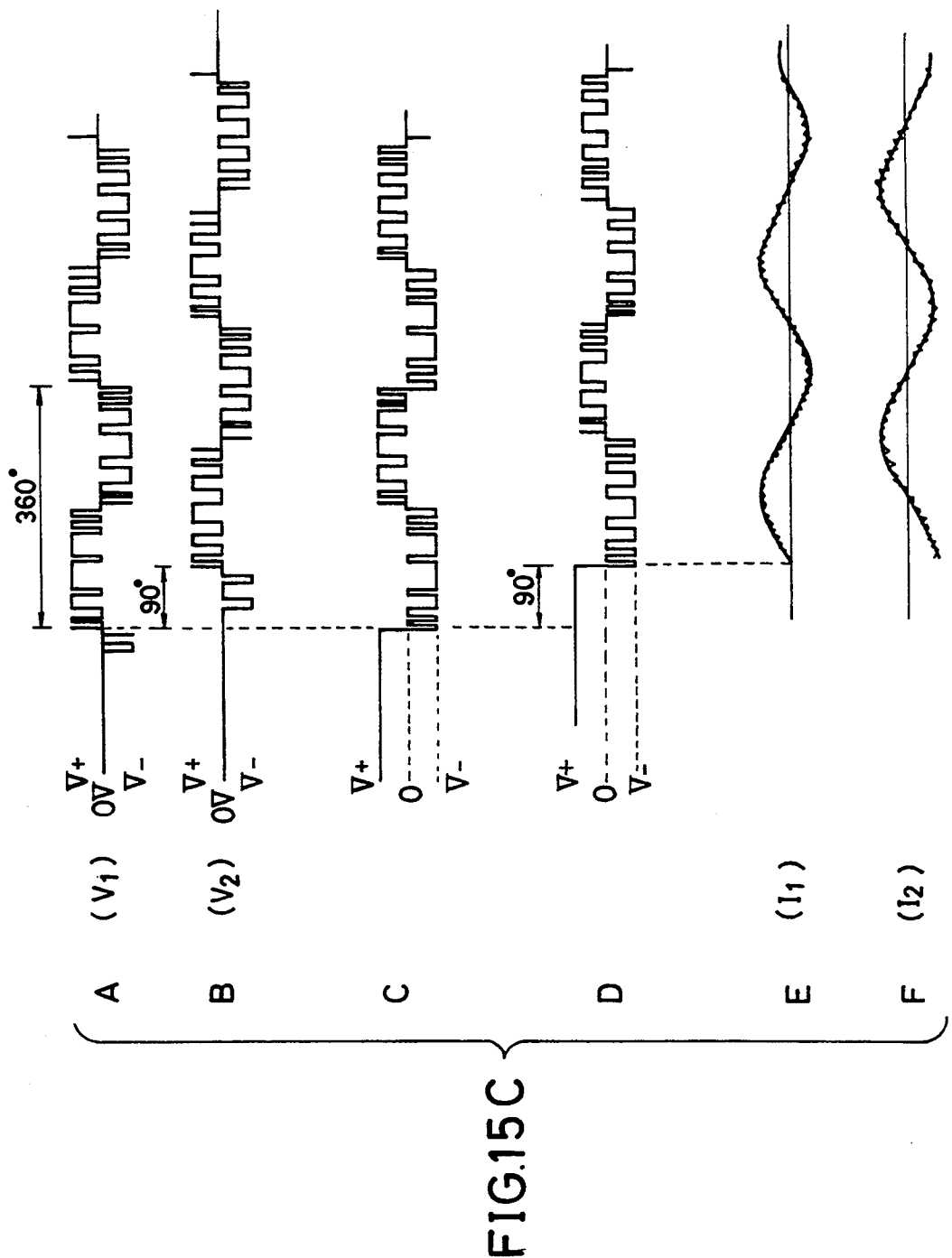
FIGS. 15C and 15D are graphics showing waveforms of two different signals to be used to operate the inverter of FIG. 15A.
Figure 15:
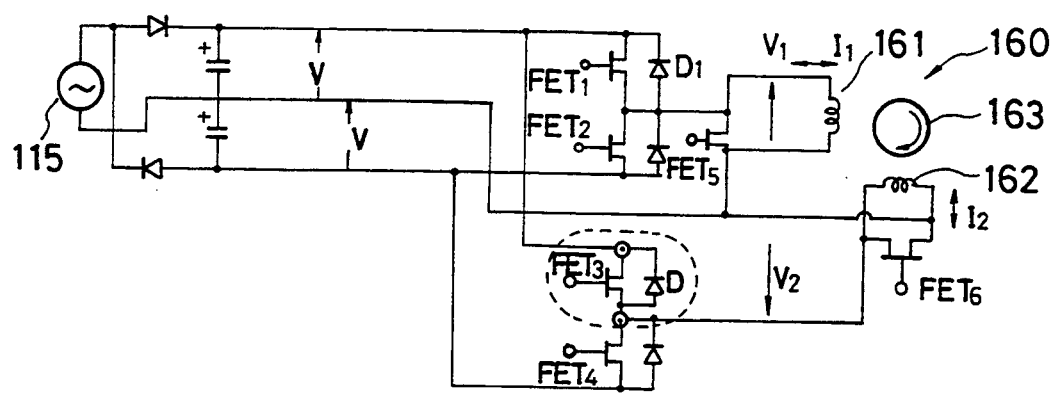
FIG. 15A is a diagram showing an alternative configuration obtained by modifying that of FIG. 7.
FIG. 15B is a block diagram of a part of the inverter of FIG. 15A.
Figure 15:
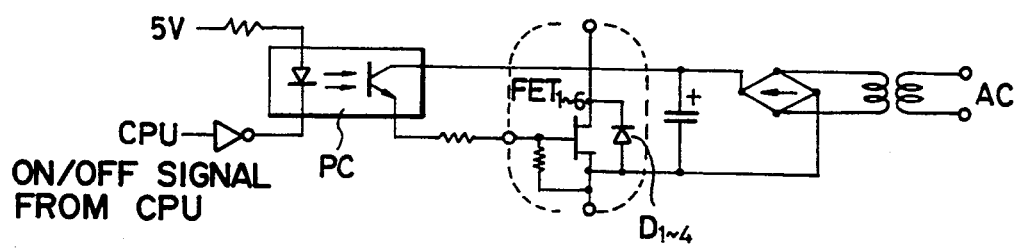

FIG. 15B shows a typical circuit to be used to drive the switches of the motor control system. This drive circuit supplies the switches FET1 through FET4 alternately with PWM signals having phases differentiated by 90° relative to each other as by A and B in FIG. 15C and the switches FET5 and FET6 with switching signals C and D respectively having inverted phases relative to A and B and therefore differentiated by 90° relative to each other. The FET1 through FET6 and the diodes D1 through D4, which are respectively connected to FET1 through FET4, are arranged between a photocoupler PC driven by ON/OFF signals corresponding to specified frequencies transmitted from a CPU and a bias power source circuit BC.

A motor control circuit having a configuration as described above supplies the first and second motor coils 161 and 162 of the motor 160 with electric currents I1 and I2 having sinusoidal waveforms which are identical but whose phases are differentiated by 90° relative to each other as illustrated in charts E and F of FIG. 15C. Therefore, this motor control circuit obviously plays a role identical with that of the circuit of FIG. 7.

Figure 15D:
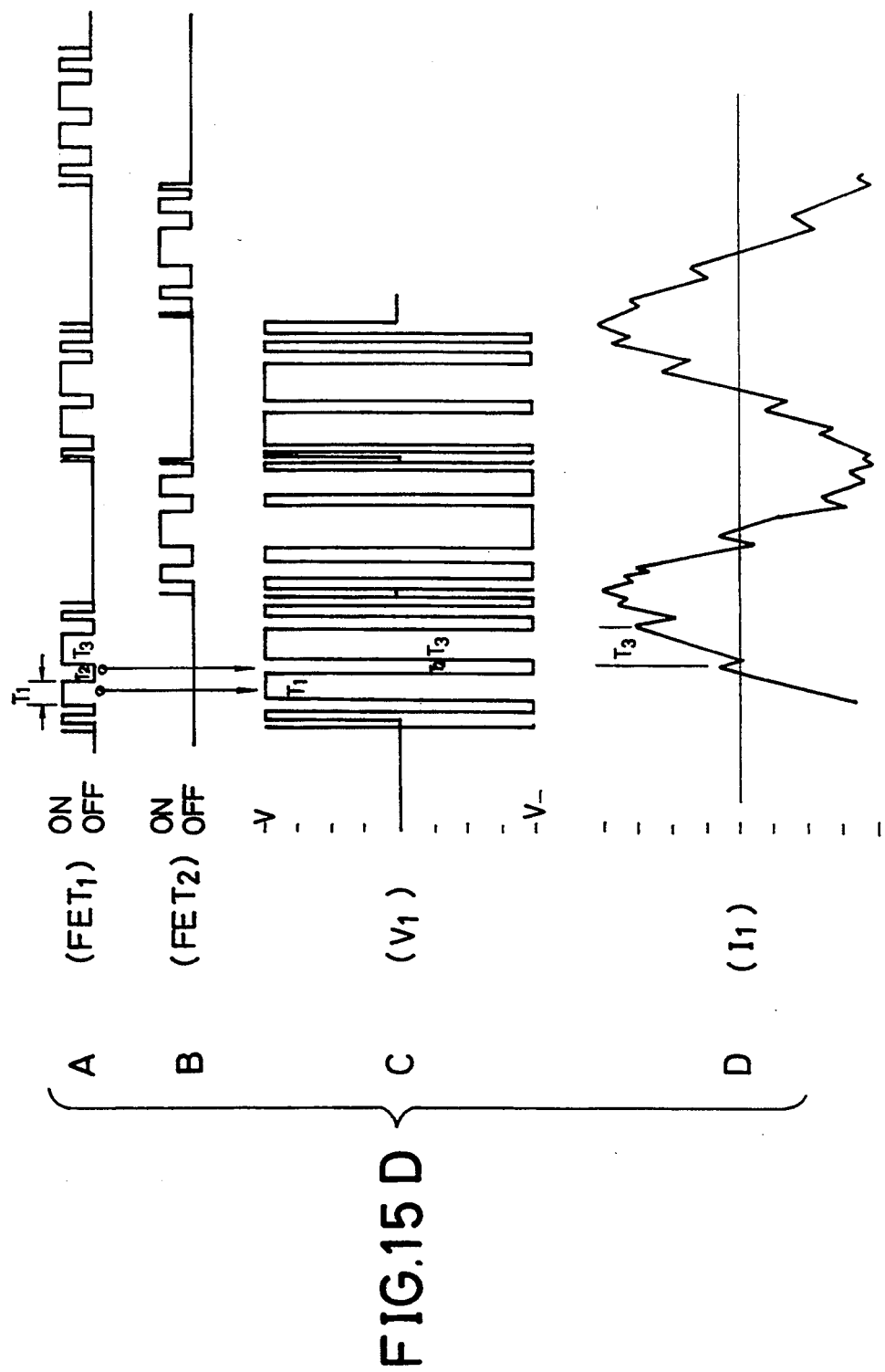

FIG. 15D shows some of the charts of FIG. 15C in enlarged dimensions with a view to explain the flywheel effect as referred to earlier. When the switches FET1 and FET2 respectively receive PWM signals as illustrated in charts A and B of FIG. 15D, a voltage having a PWM waveform as shown in chart C of FIG. 15D is applied to the first coil 161. However, thanks to the flywheel effect, the electric current I running through the coil 161 will have a waveform which is essentially a sinusoidal waveform accompanied by minute recesses that correspond to the falls in the PWM waveform as shown in chart D of FIG. 15D, although the level of the current never falls to nil. It should be noted that the rising edge and the falling edge of each of the recesses in the waveform of the current I are symmetrical in terms of inclination and mutually displaced by a time span which is a function of the PWM waveform.

Figure 16A:
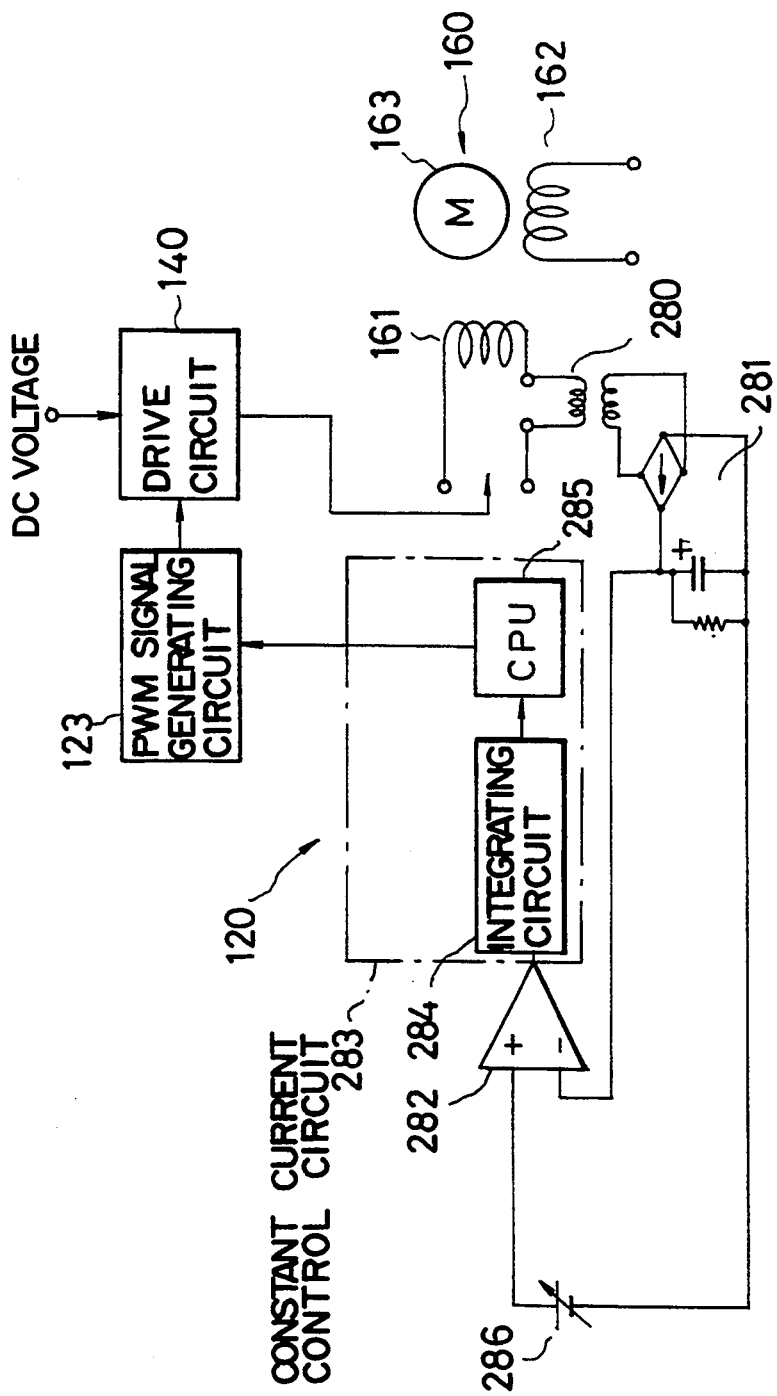
FIGS. 16A and 16B are diagrams of alternative configurations of a motor control system obtained by modifying that of the embodiment of FIG. 1.

FIG. 16A shows the arrangement to protect the motor against any excessive flow of electric current by using an inverter 120.

In principle, the driving force (F) of the motor is linearly proportional to the electric current (I) running through the coil (F=K·I, where K is a constant). This may not need any further explanation as the magnetic force generated within the coil is linearly proportional to the intensity of the electric current running through it.

On the other hand, since the motor itself is designed to allow certain fluctuations in the level of the power supplied to it, the only care required for the motor may be to keep it away from excessive electric current the motor may be exposed to particularly when the load to the motor is high and the motor is abruptly stopped in order to eliminate any possible damage to the motor due to burning.

With these considerations, the inverter 120 in FIG. 16A is devised to ensure that the motor is always driven by a constant current.

Taking now the first coil 161, a negative feedback circuit comprising a transformer 280, a rectifier circuit 281, an operational amplifier 282 and a constant-current control circuit 283 is provided in order to detect the electric current in the coil and feed it back to the inverter 120. The constant-current control circuit 283 here comprises an integrating circuit 284 for integrating data on the detected coil current and a CPU 285 for generating ON/OFF signals in response to the frequency specified on the basis of the output from said integrating circuit 284. The ON/OFF signal from the CPU 285 is used to provide the first coil 161 of the motor 160 with AC having a sinusoidal waveform by way of the PWM signal generating circuit 123 and the driving circuit 140 of the inverter 120 as described earlier.

A current-level presetting device 268 is provided on the path of the detected coil current.

An arrangement as described above guarantees that a constant-current is always supplied to the motor 160 and therefore any potential damage to the motor due to excessive current can be effectively avoided.

Figure 16B:
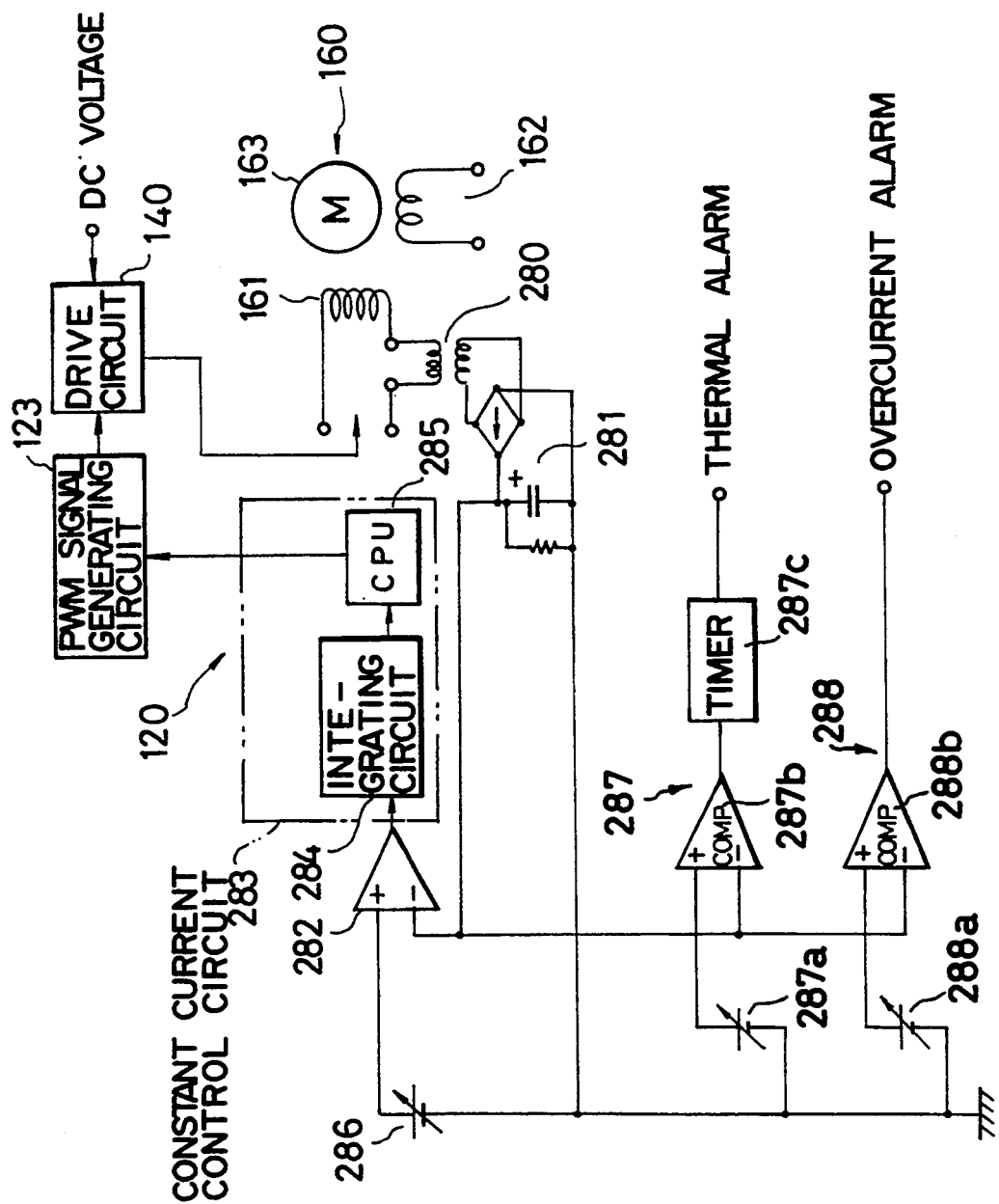

FIG. 16B shows another alternative configuration of the motor control system that additionally comprises a thermal alarm circuit 287 for issuing a warning signal when the coil current remains at a limit level over a given period of time (e.g., 1 minute) and an excess current alarm circuit 288 for issuing a warning signal when the coil current exceeds the rated value. The thermal alarm circuit 287 comprises a limit value specifier 287a, an operational amplifier 287b and a timer 287c, whereas the excess current alarm circuit 288 comprises a excess current level (relative to the rated current level) specifier 288a and an operational amplifier 288b.

Figure 17:
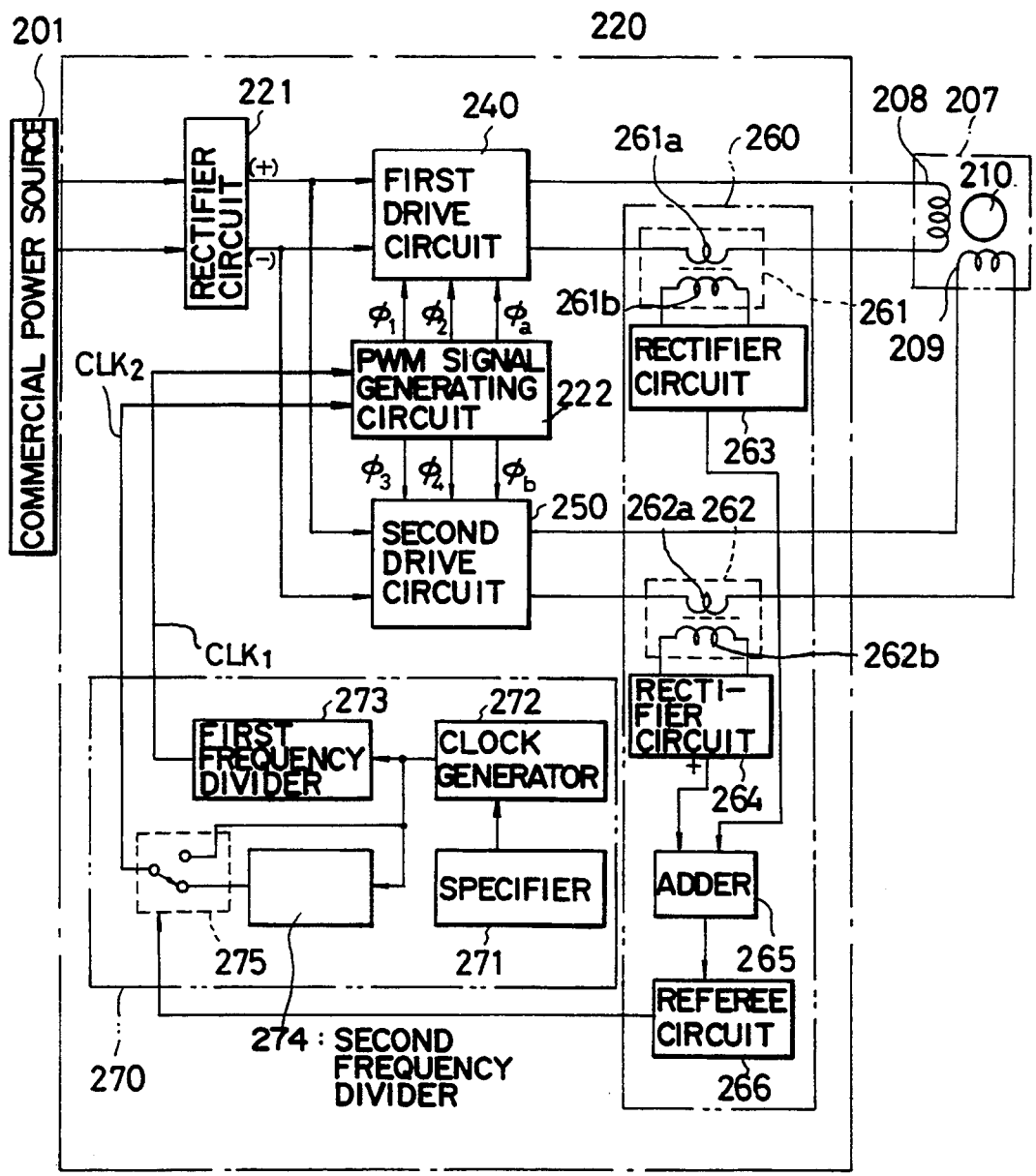
FIG. 17 is a block diagram of an inverter of a motor control system that can be used for the embodiment of FIG. 1.

FIG. 17 shows a block diagram of an inverter of a motor control system that can be used for the embodiment of FIG. 1.

The inverter 220 of FIG. 17 converts the AC supplied by a commercial power source 201 into two ACs that have a desired identical frequency but whose phases are differentiated by 90°, which are then supplied to respective coils 208 and 209 of a single-phase induction-type brushless motor 207 so that the rotor 210 of the motor 207 may be rotated at a desired rate. In FIG. 17, 221 denote a rectifier circuit for converting the AC (e.g., 50 Hz, 100 V) coming from the commercial power source into DC, 222 denotes a PWM signal generating circuit for generating with time lags pulse width modulation signals (PWM signals) $\phi1$, $\phi2$, $\phi3$ and $\phi4$ having phases differentiated from one another and polarity changeover signals $\phi a$ and $\phi b$ having phases differentiated by 90° relative to each other on the basis of first and second clock signals applied thereto.

Figure 18:
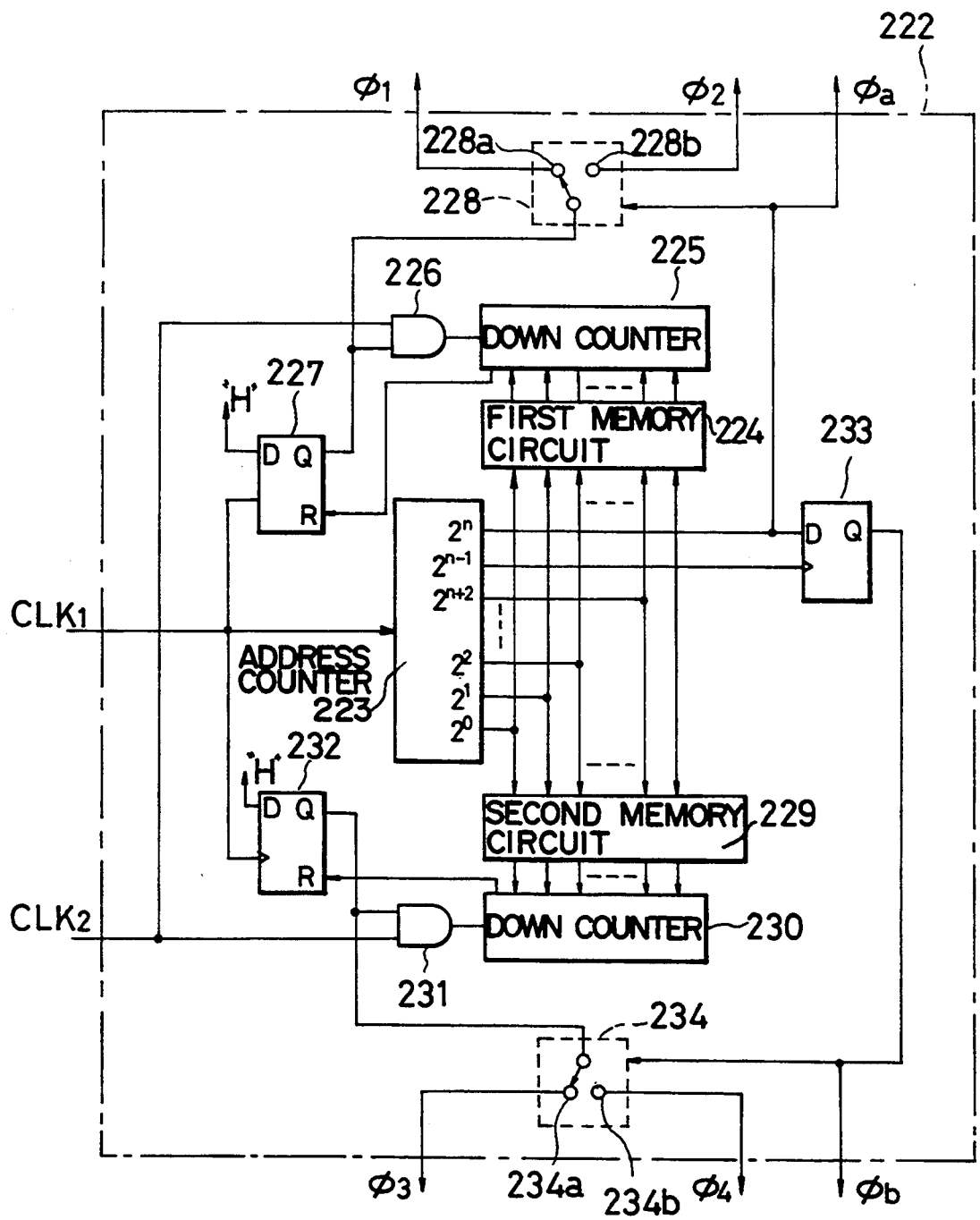
FIGS. 18 and 19 are circuit diagrams of two principal areas of the motor control system of FIG. 17.

The PWM signal generating circuit 222 typically has a configuration as illustrated in FIG. 18.

In FIG. 18, reference numeral 223 denotes an (n+1)-bit address counter for counting the number of first clock signals CLK1s.

Reference 224 denotes a first memory circuit having an n-bit address space that stores in advance pulse width data W0 through W2n−1 that correspond to respective address values A (A=0∼$2n-1$) and are expressed in terms of B·sin(A·$\pi/2^n$), where B is a coefficient.

Reference numeral 225 denotes a down counter that decrements the initial value, or the pulse width data W read out from the first memory circuit 224, by "1" each time it receives a second clock signal CLK2 from an AND-circuit 226 and transmits a reset signal to flip-flop 227 when the reading of the counter gets to "0". (Note that the frequency of the first clock signal CLK1 has a frequency lower than that of the second clock signal CLK2.)

The flip-flop 227 sets the level of the output Q to "H" at the rising edge of a first clock signal CLK2 and opens the gate of the AND-circuit 226 to send a second clock signal CLK2 to the down counter 225.

As a first clock signal CLK2 comes to show its rising edge, the address value for the first memory circuit 224 is incremented by "1" and a pulse width data W that corresponds to the address value A is given to the down counter 225 to eventually initiate the operation of counting down the number of second clock signals CLK2 by way of the AND-circuit 226. Once the number of clock signals becomes equal to the pulse width data W, the flip-flop 227 is reset.

Thus, a PWM signal having a pulse width that corresponds to the pulse width data is issued from the output terminal Q of the flip-flop in synchronism with a first clock signal CLK1.

Reference numeral 228 denotes a switching circuit that transmits the output of the (n+1)th-bit as a polarity changeover signal $\phi a$ by way of terminal 228a when the level of the polarity changeover signal $\phi a$ is "L" and terminal 228b when the level of the polarity changeover signal $\phi a$ is "H". The terminal disconnected from the output terminal of the flip-flop goes to level "L".

Reference numeral 229 denotes a second memory circuit that has, as the first memory circuit 224, an n-bit memory space.

The second memory circuit 229 stores in advance pulse width data K0 through K2n−1 that correspond to respective address values and are expressed in terms of the absolute value of B·sin(A·$\pi/2^n$).

Reference numeral 230 denotes a down counter that decrements the initial value, or the pulse width data W read out from the second memory circuit 229, by "1" each time it receives a second clock signal CLK2 from an AND-circuit 231 and transmits a reset signal to flip-flop 227 when the reading of the counter gets to "0".

The flip-flop 232 sets the level of the output Q to "H" at the rising edge of a first clock signal CLK1 and opens the gate of the AND-circuit 231 to send a second clock signal CLK2 to the down counter 230.

Thus, as a first clock signal CLK2 comes to show its rising edge, the address value for the first memory circuit 224 is incremented by "1" and a pulse width data W that corresponds to the address value A is given to the down counter 225 to eventually initiate the operation of counting down the number of second clock signals CLK2 by way of the AND-circuit 226. Once the number of clock signals becomes equal to the pulse width data W, the flip-flop 227 is reset.

Thus, a PWM signal having a pulse width that corresponds to the pulse width data K stored in the second memory circuit 229 is issued from the output terminal Q of the flip-flop 232.

Reference numeral 233 denotes a flip-flop that latches the level of the output ($\phi$a) of the (n+1)th-bit synchronously with the rising edge of the output of the nth bit and its output Q is transmitted to a switching circuit 234 as a polarity changeover signal $\phi$b having a phase delayed by 90° relative to that of the polarity changeover signal $\phi$a.

The switching circuit 234 transmits a PWM signal by way of terminal 234a when the level of the polarity changeover signal $\phi$b is "L" and terminal 234b when the level of the polarity changeover signal $\phi$b is "H".

The two sets of PWM signals ($\phi$1, $\phi$2) and ($\phi$3, $\phi$4) coming from the respective switching circuits 228 and 234 and the polarity changeover signals $\phi$a, $\phi$b are sent to first and second drive circuits 240 and 250 respectively as illustrated in FIG. 17.

Figure 19:
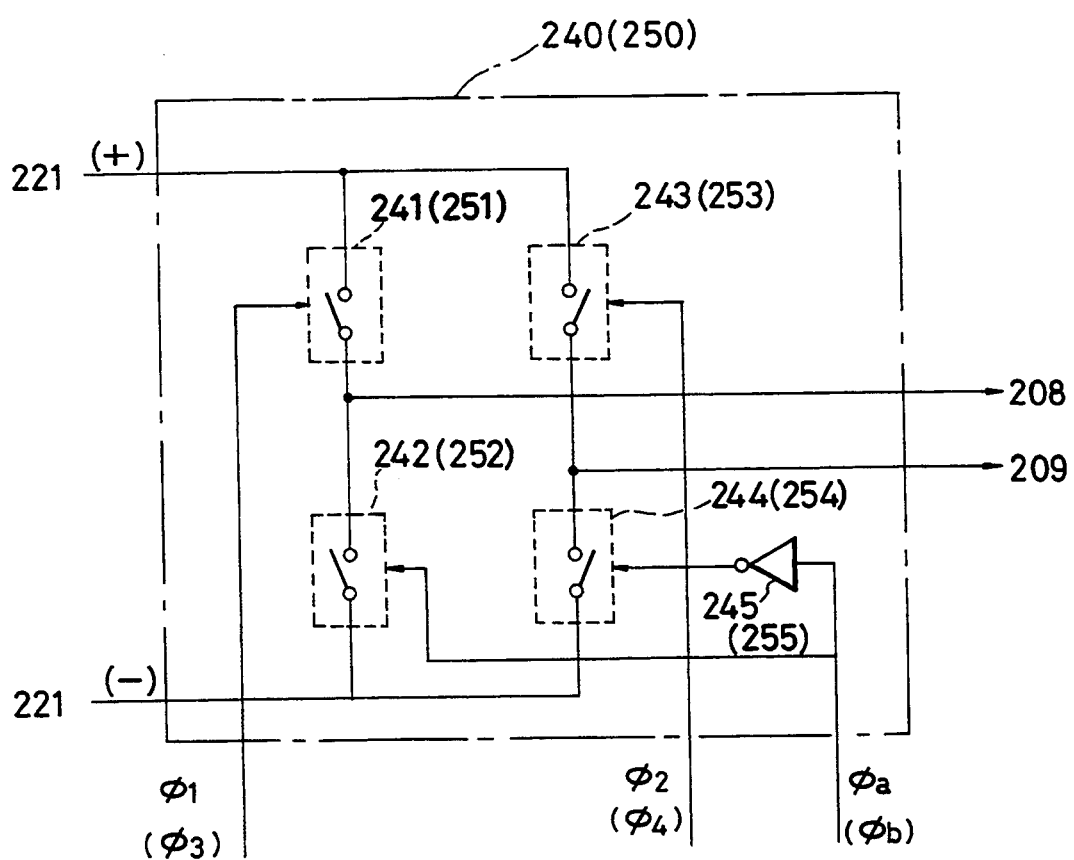

Both of the two drive circuits 240, 250 have a configuration as shown in FIG. 19.

Referring to FIG. 19, it shows that reference numerals 241 through 244 (251 through 254) denote so many switching circuit which are turned on and off according to PWM signals $\phi$1 and $\phi$2 and the levels of polarity changeover signals $\phi$a and $\phi$b and that currently the switching circuit 241 (251) has received a PWM signal $\phi$1 ($\phi$3) and the switching circuit 242 (252) has received a polarity changeover signal $\phi$a ($\phi$b). It also shows that currently a PWM signal $\phi$2 ($\phi$4) has been sent to the switching circuit 243 (253) and a polarity changeover signal $\phi$a ($\phi$b) has been inverted by the inverter 245 and sent to the switching circuit 244 (254).

The switching circuits 241, 242 (251, 252) are serially connected to a DC power source, or rectifier circuit 221, and a terminal of coils 261 and its counterpart of coil 262 of an induction motor 260 are connected to the junction of the two switching circuits.

Similarly, the other terminals of the coils 261 and 262 are connected to the junction of the two switching circuits 243, 244 (253, 254) which are also serially connected to the DC power source.

Reference numeral 260 denotes a current sensing circuit for sensing the current that runs through the two coils 208 and 209 of the induction motor 207 (FIG. 17).

Reference numerals 261 and 262 denote sensing transformers whose primary windings 261a and 262a are respectively and serially connected to the coils 208 and 209 and wound around highly permeable cores. Reference numerals 263 and 264 denote rectifier circuits for rectifying the ACs produced at the second windings 261b and 262b of the sensing transformers 261 and 262, while reference numeral 265 denotes an adder for adding the DC voltages coming from the rectifier circuits 263, 264.

Reference numeral 266 denotes a referee circuit for issuing a current limiting signal whenever the added voltage of the adder 265 exceeds a predetermined value.

The current limiting signal is sent to a speed specifier circuit 270.

The speed specifier circuit 270 is so designed that it can appropriately modify the frequencies of first and second clock signals to be applied to the PWM signal generating circuit 222.

Reference numeral 271 denotes a frequency specifier to be used to preset the frequency of the clock signals generated by clock signal generator 272. Reference numeral 273 denotes a first frequency divider for dividing by N the frequency of the signals generated by the clock signal generator 272 and transmitting quotient-frequency signals as clock signals CLK1, whereas 274 denotes a second frequency divider for dividing by M (M<N) the frequency of the signals generated by the flock signal generator 272 and transmitting the quotient-frequency signals as clock signals.

Reference numeral 275 denotes a switch to be turned over by a current limiting signal from the referee circuit 266. It simply forwards the clock signals coming from the clock signal generator 272 as so many second clock signals CLK2 while it is receiving a current limiting signal, whereas it transmits the quotient-frequency signals coming from the second frequency divider 274 as second clock signals CLK2 when it is not receiving any current limiting signal.

The inverter 220 as described above operates in the following manner.

Figure 20:
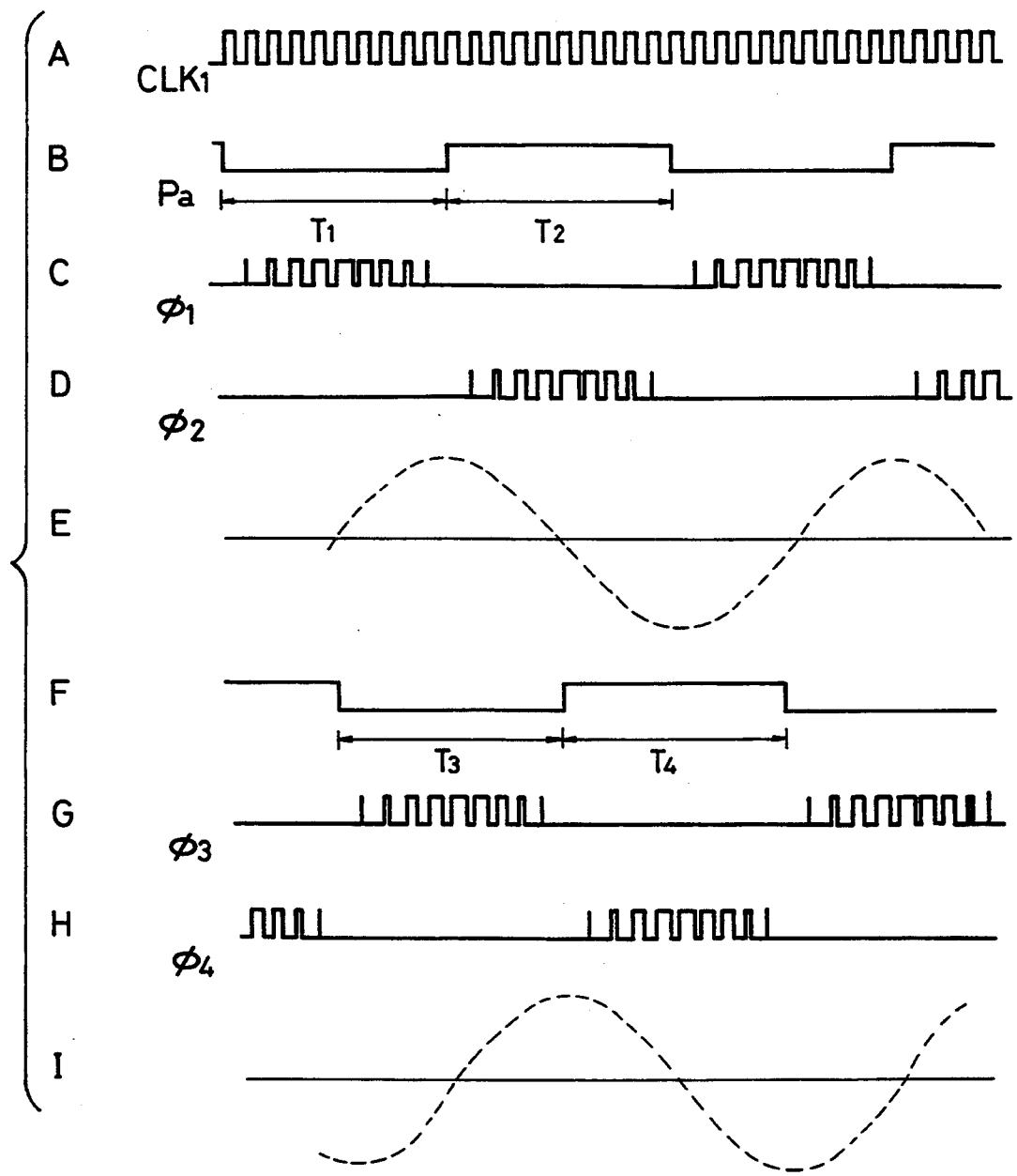
FIGS. 20 and 21 are graphics showing waveforms of two different signals to be used to operate the motor control system of FIG. 17.

When given frequency data Fc is preset in the frequency specifier 271 of the speed specifier circuit 270, a first clock signal CLK1 having a frequency equal to Fc/N and a second clock signal CLK2 having a frequency equal to Fc/M as illustrated in chart A of FIG. 20 are transmitted to the PWM signal generating circuit 223.

The address value A of the address counter 223 is incremented by "1" each time it receives a first clock signal CLK2 and causes the first memory circuit 224 to sequentially transmit pulse width data W0 through W2n−1 so that, during the period (T1) where the polarity changeover signal $\phi$a (chart B of FIG. 20) remains at level "L", a PWM signal $\phi$1 is transmitted as shown by chart C of FIG. 20, whereas, during the period (T2) where the switching signal $\phi$a keeps level "H", another PWM signal $\phi$2 is transmitted as shown by chart D of FIG. 20 (T1=T2=$2^2 \cdot$N/Fc).

Since the switching circuit 144 is kept ON by an inverted signal of the polarity changeover signal $\phi$a during the period T11 the coil 208 of the induction motor 207 receives an electric current that increases to draw a sinusoidal curve as illustrated in chart E of FIG. 20.

During the period T2, on the other hand, the electric current running through the coil 208 decreases to further follow the sinusoidal curve as a PWM signal $\phi$2 is sent to the switching circuit 243 of the first drive circuit 240 so that the switching circuit 242 is kept ON by a polarity changeover signal $\phi$a.

In this manner, an electric current with a given frequency is caused to run through the coil by the PWM signals $\phi$1, $\phi$2 and the polarity changeover signals $\phi$a, $\phi$b. It may be needless to say that the electric current running through the coil 208 draws a sinusoidal curve having a period of T1+T2 (=$2^{n+1} \cdot$N/Fc).

Similarly, the second memory circuit 229 also sequentially transmits pulse width data K0 through K2n−1 in response to the address value A of the address counter. However, it should be noted that, since the polarity changeover signal φb has a phase delayed by 90° relative to the switching signal φa as shown by chart F of FIG. 20, a PWM signal with pulse widths that correspond to the upper half of the pulse width data K stored in the second memory circuit 229 is transmitted during period T3 that overlaps the rear half of the period T1 and the front half of the period T2 and thereafter a PWM signal having pulse widths that correspond to the lower half of the pulse width data K is transmitted during period T4 that occupies the rear half of the period T2 and the front half of the period T1.

Thus, the PWM signal φ3 produces a waveform which is identical with that of the PWM φ1 but delayed by ¼ of a period as illustrated in chart G of FIG. 20. Similarly, the PWM signal φ4 shows a waveform identical with that of the PWM φ2 which is delayed by ¼ of a period as illustrated in chart H of FIG. 20.

Consequently, the electric current supplied to the coil 209 of the induction motor 207 has a waveform as illustrated in chart I of FIG. 20, which is a sinusoidal curve having a phase delayed by 90° relative to that of the current running through the coil 208.

As two electric currents whose phases are differentiated by 90° respectively runs through the first and second coil 208, 209, the rotor 210 of the induction motor 207 is driven to rotate at a rate equivalent to the frequency of $Fc/(2^{n+1} \cdot N)$.

It may be clear that the rotary speed of the induction motor 207 is linearly proportional to the clock frequency Fc and therefore a desired rate of rotation of the motor may be realized by externally modifying the clock frequency Fc.

If the clock frequency Fc is preset to a very low value, the electric currents running through the coils 208 and 209 of the induction coil 207 can rapidly increase.

The increase in the level of the electric currents are sensed by the current sensing circuit 260 and, when the level exceeds a predetermined value, a current limiting signal is sent to the speed specifier circuit 270 to switch the frequency of the second clock signal CLK2 from Fc/M to Fc.

Figure 21:
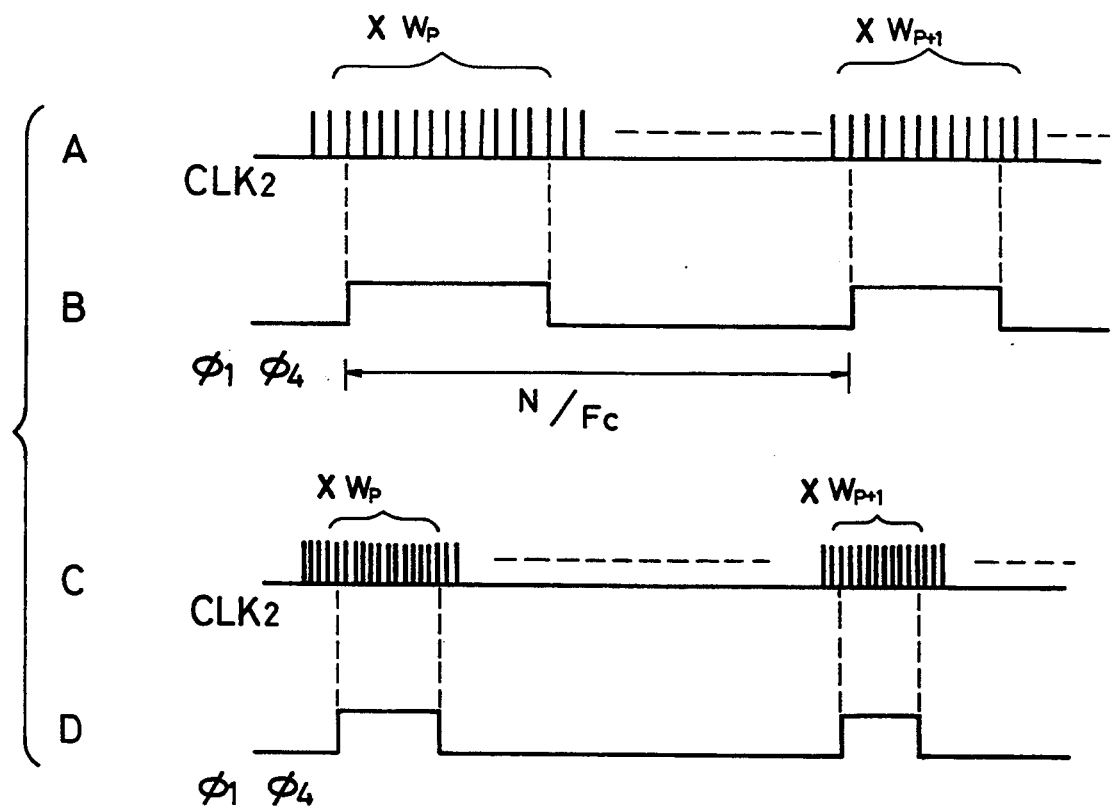

As a result, the PWM signals φ1 through φ4, which are, under normal conditions, transmitted with a pulse width as shown in chart B of FIG. 21 which is equivalent to Wp pulse width data of the second clock signal CLK2 as shown by chart A of FIG. 21, are so modified to have a pulse width equivalent of Wp pulse width data of the second clock signal CLK2 having a high frequency (chart C of FIG. 21) as illustrated by chart D of FIG. 21.

The modified pulse width of the PWM signals φ1 through φ4, which is equal to 1/M of that of the signals under normal conditions, reduces the intensity of the electric currents running through the coils 208, 209 of the induction motor 207 to eliminate any potential danger to the motor due to excessive electric current such as burning of coils. (Note that the frequency of the electric current with which the motor is driven is not changed.)

The sinusoidal waveform of the electric current may be canceled by turning off the power source, by modifying the preset value of the frequency specifier 271 or by utilizing a specifically provided resetting means (not shown).

While the inverter of FIG. 17 controls the electric current running through the load circuit by a current limiting signal generated by the current sensing circuit 260, the control operation may be so designed as to completely cut off the electric current or to use a current limiting resistor or to limit the presetting capability under certain circumstances, if the current is to be limited.

While the inverter of FIG. 17 controls the AC supplied to the load circuit by means of the pulse width that varies to draw a sinusoidal waveform, an inverter that controls the AC by means of pulse interval modulation or pulse width modulation may be alternatively used.

While the inverter of FIG. 17 immediately limits the electric current running through the induction motor 207 whenever it exceeds a predetermined value, it may be so designed as to limits the current according to the value obtained by accumulating the differentials of the current for a given period of time or, alternatively, so designed as to use a referee circuit 266′ comprising a comparator 267 which compares the output of the adder 265 with a given value and a flip-flop 269 which is set to operate by the output of timer circuit 268 which is activated by the rising edge of an output of the comparator so that the AC supplied to the induction motor is limited by the output of the flip-flop 269 when it continually exceeds a given value for a predetermined period of time.

Figure 22:
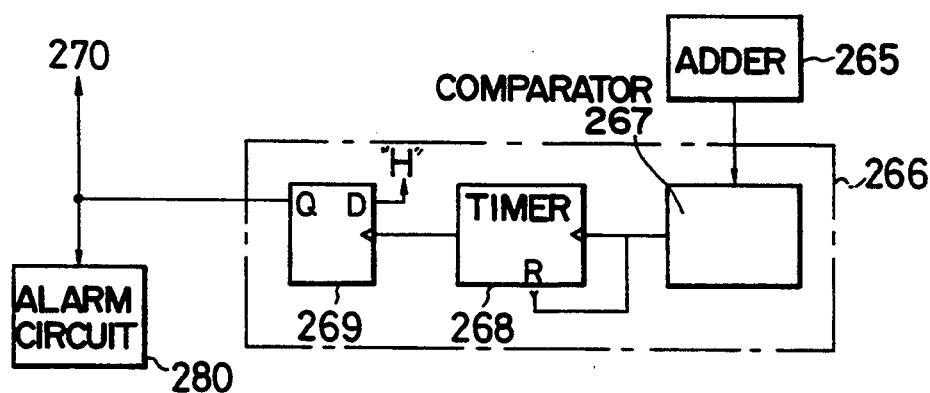
FIG. 22 is a block diagram of a principal area of a motor control system having a configuration similar to but different from that of the control system of FIG. 17.

The referee circuit 266′ of FIG. 22 may be combined with an alarm circuit 280 that issues a warning signal when the AC to the load circuit is limited. Alternatively, the referee circuit may be so designed as to turn off the commercial power source by the output of the flip-flop for limiting the AC.

Since the inverter senses the current supplied to the load circuit and limits the current whenever it exceeds a given level, it can effectively prevent any excessive AC from running to the induction motor even when the frequency of the AC is significantly reduced to eliminate any potential danger such as burning of coils.

Figure 23:
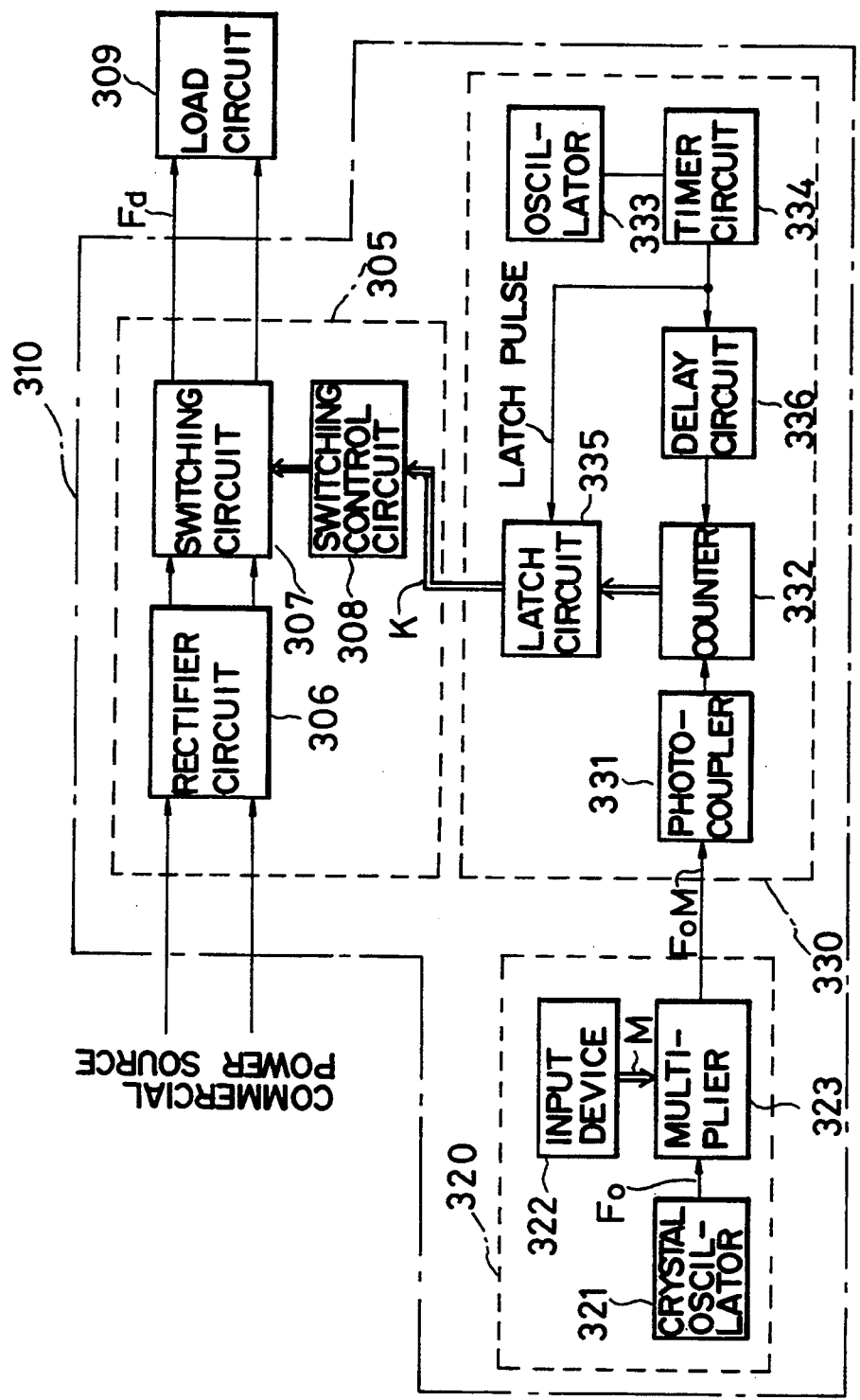
FIG. 23 is a block diagram showing the configuration of an inverter to be used for the embodiment of FIG. 1.

FIG. 23 shows in block diagram the configuration of still another alternative inverter that can be used with the first embodiment of the invention, where the components which are similar to those of the FIG. 36D are indicated by identical reference numerals and will not be described any further.

In FIG. 23, reference numeral 320 denotes a frequency specifier that transmits from its multiplier 323 a pulse signal having a frequency equal to the frequency F0 of the reference signal from the crystal oscillator 321 multiplied by M.

The pulse signal is sent to photo-coupler 331 of frequency determining circuit 330.

The frequency determining circuit 330 counts the number of the pulse signals the photo-coupler 331 has received by means of a counter 332 and has its latch circuit 335 to latch the count value each time it receives a latch pulse transmitted from timer circuit 334 operated in synchronism with the output of oscillator 333. It then has its delay circuit 336 to slightly delay the latch pulse, which is used to reset the counter 332.

Therefore, the output of the latch circuit 335 represents the number of pulse signals entered to the counter 332 during the period of the latch pulse T or the number of pulses of a pulse signal during the period T.

The output of the latch circuit 335 is sent to a switch control circuit 308 of the AC converter circuit 305 and the switch control circuit 308 converts the incoming DC into an AC having a frequency that corresponds to the output of the latch circuit 335.

The output K of the latch circuit applied to the switch control circuit 308 is so controlled that it agrees with the frequency Fd of the current supplied to the load circuit 309. Therefore, if it is so assumed that the period of the latch pulse is 100 milliseconds and the frequency of the output of the crystal oscillator 321 of the frequency specifier 320 is 10 Hz, a pulse signal having a frequency of 1 kHz will be given to the counter 332 by specifying "100" for the multiple M.

Thus, "100" is latched to the latch circuit 335 for each latching and then given to the switch control circuit 308 to generate an AC having a frequency of 100 Hz to be supplied to the load circuit 309.

Similarly, an AC with frequency of 200 Hz will be generated by specifying "200" for M and the frequency Fd of the AC supplied to the load circuit will be 50 Hz if "50" is specified for M.

While the stability of the frequency Fd of the AC depends on the stability of the frequency of the pulse signal transmitted from the frequency specifier 320, the latter is maintained to a very stable state because it is obtained by multiplying the signal from the crystal oscillator 321 which is very stable.

Figure 24:
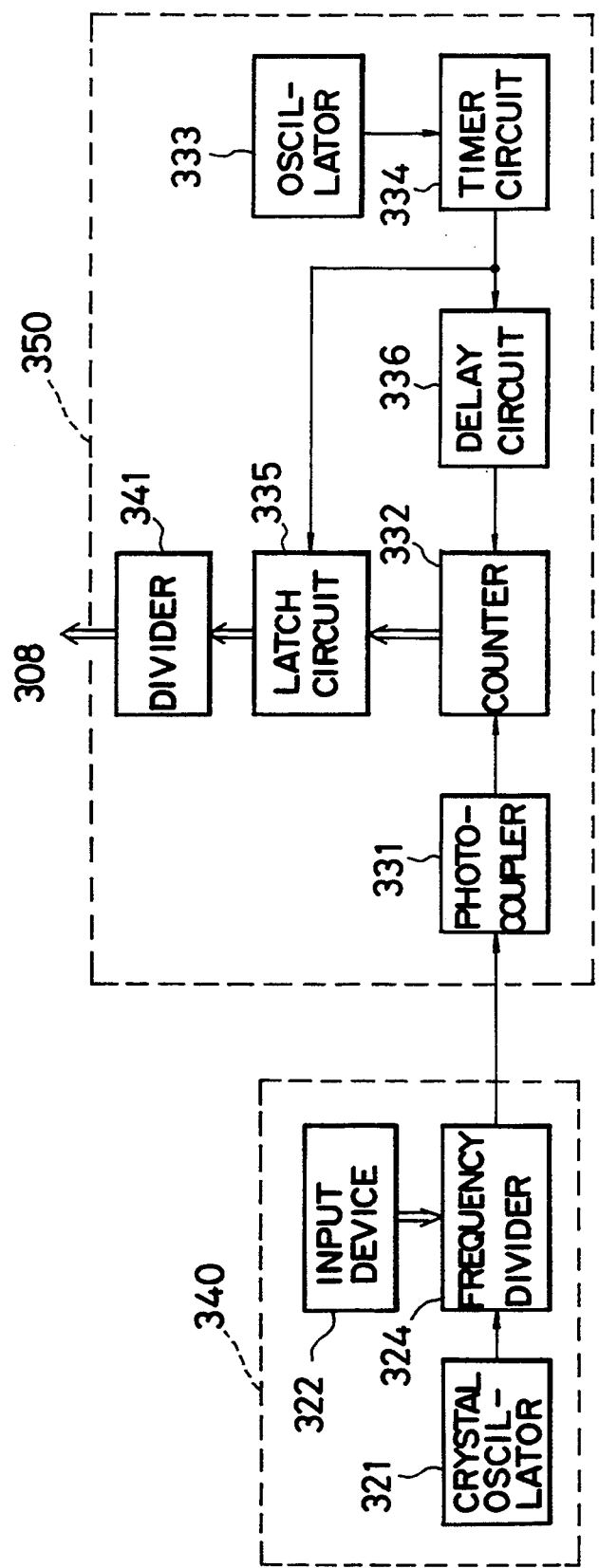
FIGS. 24 through 26 are block diagrams of alternative configurations of an inverter obtained by modifying that of FIG. 23.

While a multiplier 323 is used for the frequency specifier 320 of the inverter of FIG. 23, it may be replaced by a frequency divider 324 as a component of the frequency specifier 340 that has a configuration as illustrated in FIG. 24. Here, a divider 341 is provided in the frequency determining circuit 350 to divide a given value by the output of the latch circuit 335 and the output of the divider 341, or the quotient, is sent to the switch control circuit 308 so that the frequency Fd of the alternating current supplied to the load circuit is linearly proportional to the value M.

Figure 25:
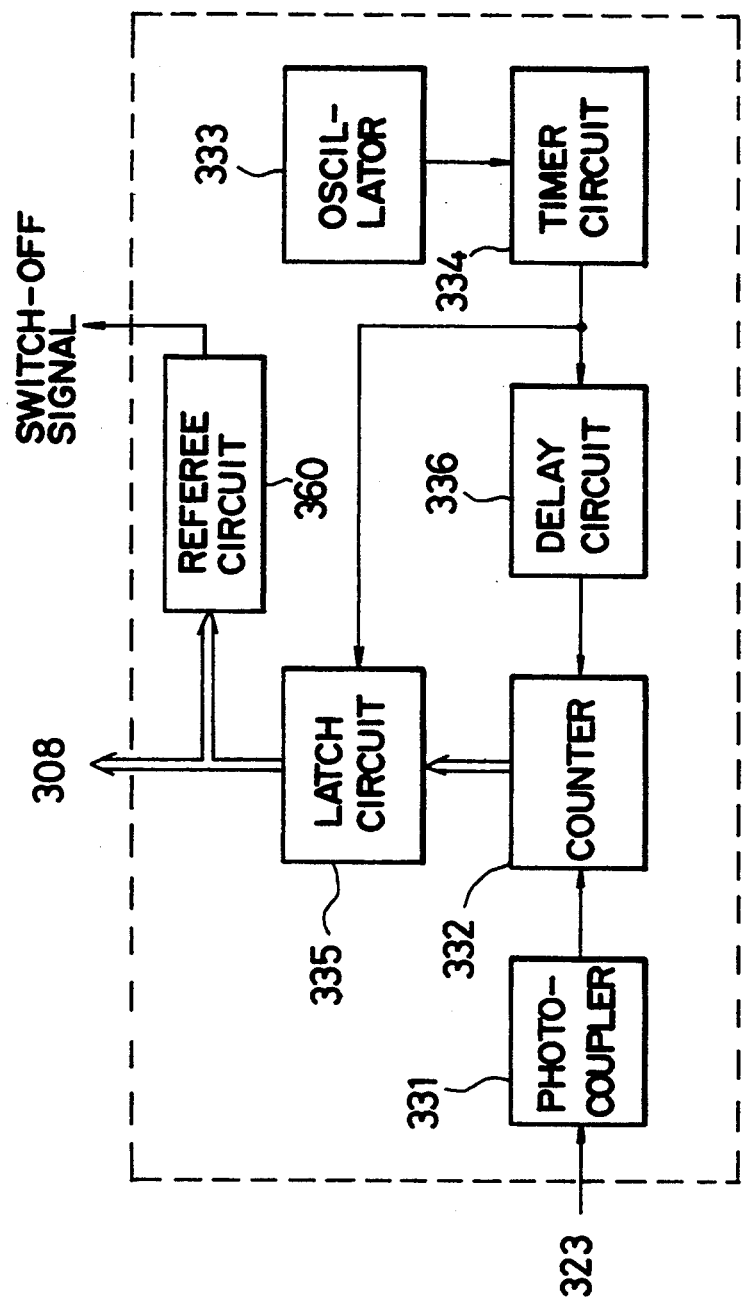
Figure 26:
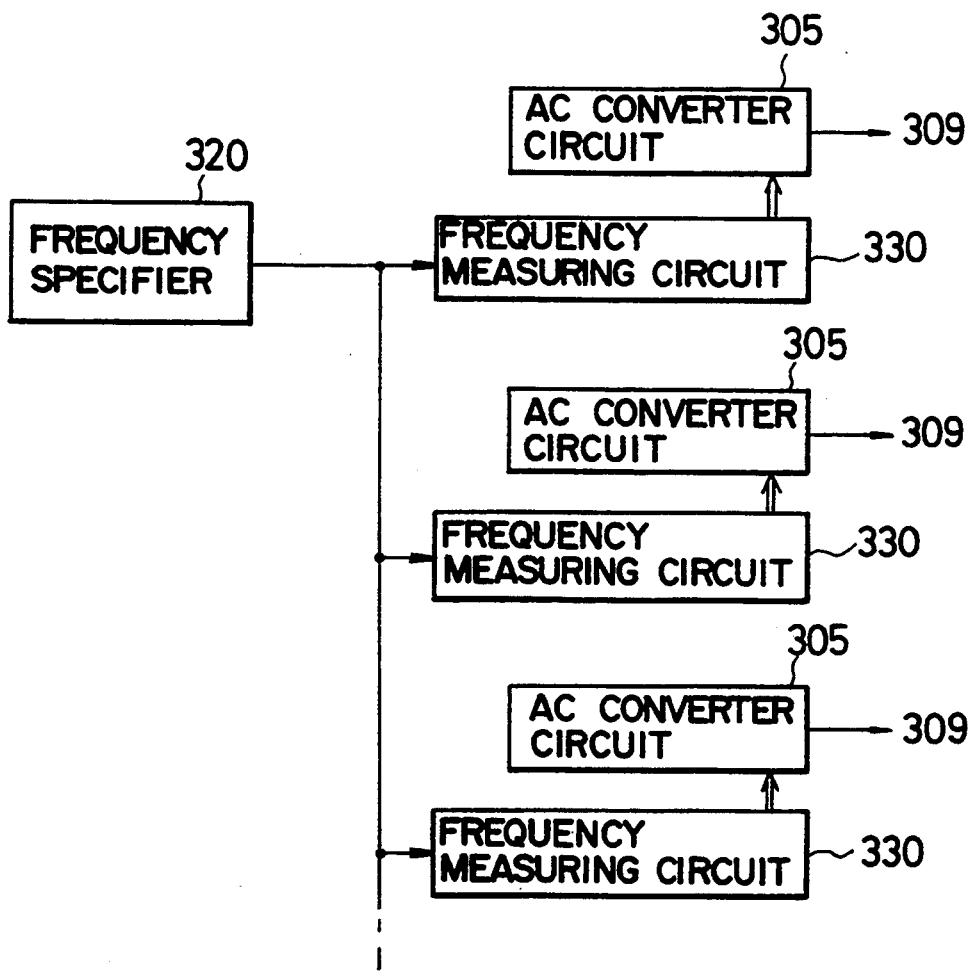

While the relationship between the latched output value K and the frequency Fd of the driving AC was defined in terms of agreement of the two values earlier, it may be alternatively defined by equation $Fd = \alpha \cdot K$ ($\alpha$ is an arbitrary number), where $\alpha$ can be varied by means of the switch control circuit 305. Still alternatively, the frequency determining circuit 370 may be so configured that it determines the output of the latch circuit by means of a referee circuit 360 and, if the output of the latch circuit 335 exceeds a limit value, it causes the switch control circuit 308 or the switching circuit 307 to issue a signal that stops the supply of power as illustrated in FIG. 25.

While the inverter of FIG. 23 uses only one frequency specifier 320 to specify the frequency of the AC supplied to the load circuit 309, it may be alternatively so configured to comprise a plurality of frequency determining circuits 330 to forward the pulse signal from a single frequency specifier 320 to a plurality of conversion circuits 305 so that a plurality of load circuits 309 (e.g., a plurality of AC motors) may be synchronously driven by using a single frequency specifier 320 to achieve a high level of operational precision. When a plurality of conversion circuits are used, different motors may be driven at a same speed by modifying the constant a differently for each motor depending on the characteristics of the motor.

Since each of the inverters described above by referring to FIGS. 23 through 26 is so designed that it generates a pulse signal having a frequency that corresponds to the desired frequency of drive current specified by the frequency specifier and the pulse signal is, after having been checked for its frequency, is utilized to generate an AC having a corresponding frequency, the frequency of the drive current can be remarkably accurately controlled and a plurality of load circuits may be synchronously operated.

Now, a motor control system comprising an inverter of the type as described above should be discussed for its fail safe capability in terms of how an abnormal condition can be detected on the side of issuing signals specifying the speed of the motor at the stage of passing commands for specifying the speed of the motor and how the detected abnormal condition is used to secure the safety of the motor (by reducing the voltage of the drive current to 0 V in order to stop the motor). The level of accuracy with which commands are passed can be enhanced by digitally controlling the signal system. The digital control technique is particularly important when a plurality of inverters are involved within a system as in the case of the third embodiment, which will be described later.

FIG. 27A shows the configuration of a speed control section of a motor control system designed with the above considerations in mind. It is designed to operate as linear function of the input pulse frequency and stop the motor whenever one of the limits provided for variables is exceeded.

This speed control section clears the counter 380 that counts the number of entered pulse command signals having a frequency approximately one hundred times as large as the rate of rotation of the motor (chart A, FIG. 27B) on the basis of the input signals which are periodically sampled (e.g., for every 1 second) as shown by chart B of FIG. 27B and, at the same time, closes the switch 381 to latch them to the latch circuit 382. Each of the signals latched to the latch circuit 382 represents the specified rate of rotation as shown by chart C of FIG. 27B and the output of the latch circuit 382 is given to a divider 383 and first and second comparators 384, 385. Said divider 383 divides the output of the latch circuit 382 by a given number (e.g., ratio of two speeds specified by two different inverters) to give the specified rate of rotation as shown by chart C of FIG. 27B to a PWM signal generating circuit (not shown) contained within the inverter circuit. Besides, the output of the latch circuit 382 is compared with the upper and lower limit values respectively by the first and second comparator 384, 385 and, whenever the output returns to the upper and lower limit, a signal that stops the warning that has been issued will be generated and transmitted. In other words, as long as the specified rate of rotation exceeds the upper and lower limits as shown by charts E and D of FIG. 27D, warning signal is kept on being issued and consequently the motor is allowed to be driven only at the specified rate of rotation.

Figure 27C:
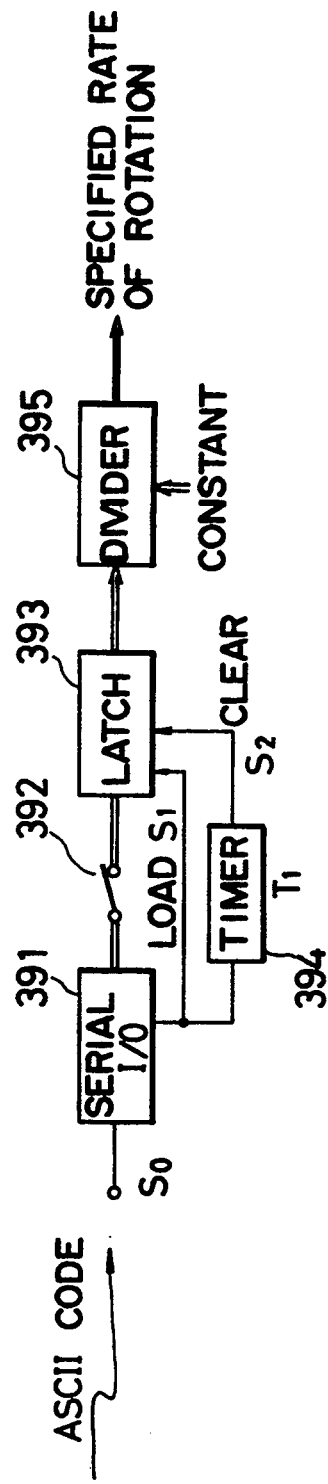
FIG. 27C is a block diagram of an alternative speed control section of the inverter of FIG. 27A.
Figure 27D:
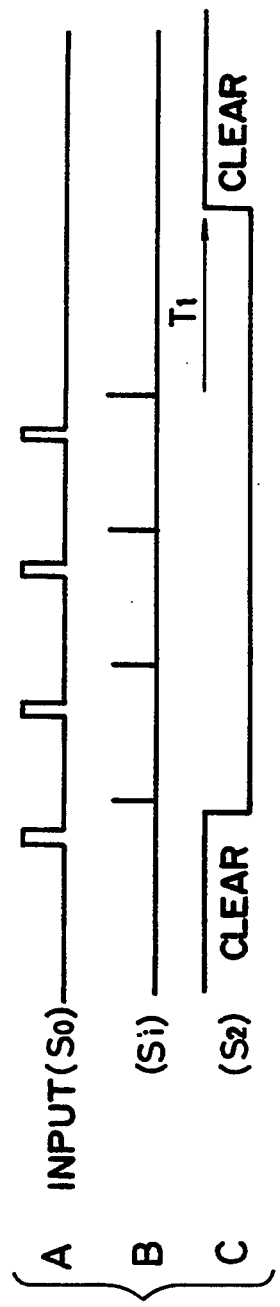
FIG. 27D is a collection of timing charts showing how the speed control section of FIG. 27C is operated.

FIG. 27C shows the configuration of a speed control section designed to periodically issue a multiplier for the reference rate of rotation of the motor.

The speed control section comprises a serial I/O unit 391 for receiving ASCII codes (S0s). Upon receiving a load signal S1 as shown in chart B of FIG. 27D from the serial I/O unit 391, the input (SO) is latched to a latch circuit 393 by war of a switch 392, and at the same time, the data stored in said latch circuit 393 is cleared by a signal (S2) as shown by chart C of FIG. 27D transmitted from the serial I/O unit 391 by way of T1 timer 394.

The specified rate of rotation is obtained by dividing the output of the latch circuit 393 by a given constant (e.g., the ratio of the speeds of two inverters) in the divider 395 and then transmitted to the PWM signal generating circuits contained in the respective inverters.

The second embodiment of the invention as described above operates in the following manner.

Figure 28:
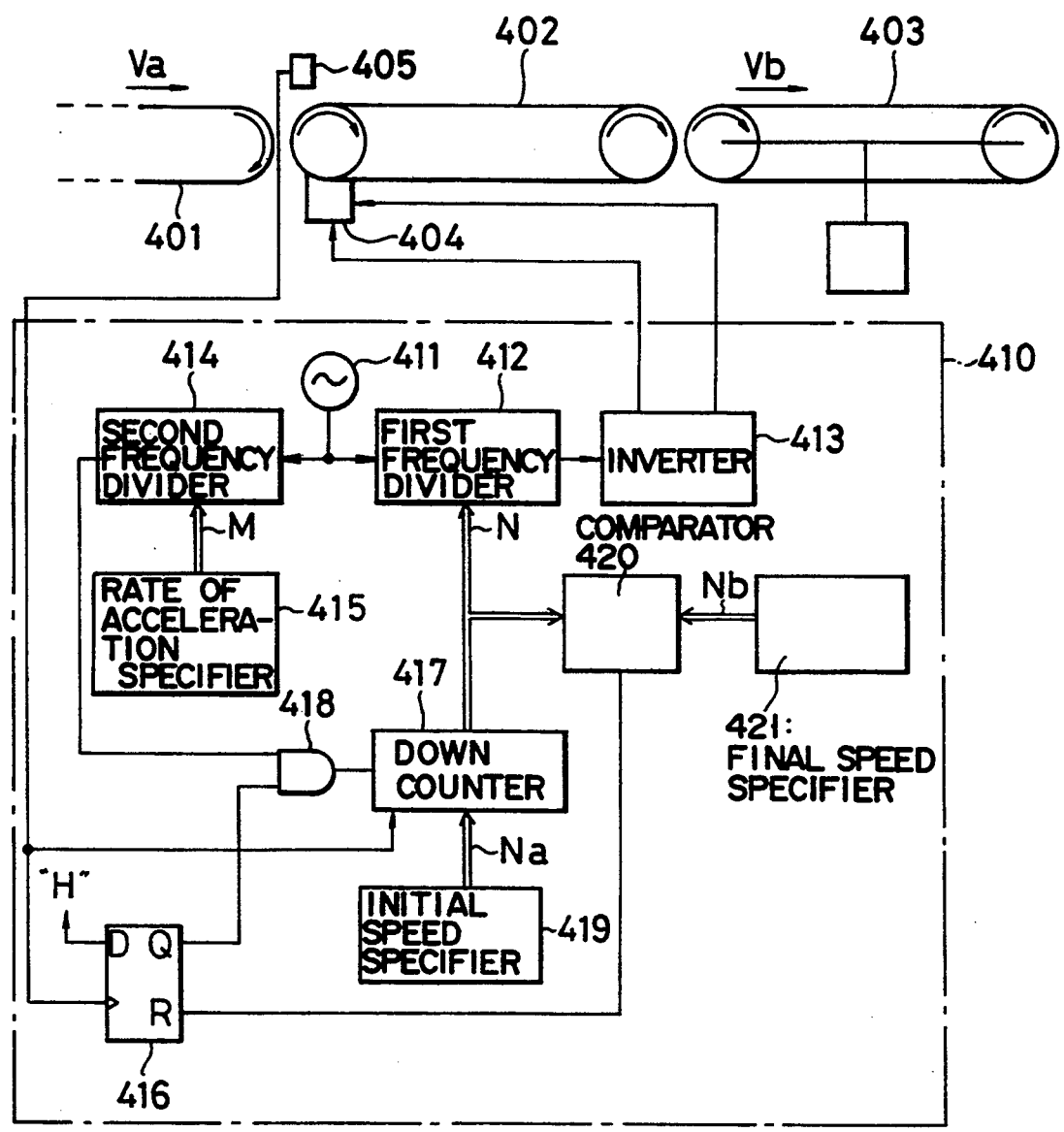
FIG. 28 is a diagram showing the configuration of a second embodiment of the invention.

FIG. 28 shows an arrangement where the embodiment is applied to an intermediary conveyor 402.

In FIG. 28, reference numeral 404 denotes a motor, e.g. single-phase induction-type brushless motor, that rotates at a rate synchronized with the two-phase AC having phases differentiated by 90° from each other and supplied to the motor.

Reference numeral 405 denotes an optical sensor comprising a light emitter and a light receiver for detecting an object fed in by the intermediary conveyor 402.

Reference numeral 410 denotes a variable speed control for controlling the rotary speed of the motor 404.

Reference numeral 411 denotes an oscillator for generating signals with a given frequency and 412 denotes a first frequency divider for dividing the frequency of each of the signals transmitted from the oscillator 411 by a divisor N.

Reference numeral 413 denotes an inverter designed to supply the motor 404 with two-phase AC having phases differentiated by 90° from each other according to signals synchronized with the quotient-frequency signals from the first frequency divider 412 and a frequency which is linearly proportional to that of the quotient-frequency signals.

Reference numeral 414 denotes a second frequency divider for dividing the frequency of each of the signals transmitted from the oscillator 411 by a divisor M which is specified by accelerator 415.

Reference numeral 416 denotes a flip-flop that raises the level of output Q to "H" at the rising edge of a detection signal from the sensor 405 and maintains the level for a while. (The level is "L" while the signal is being transmitted.)

Reference numeral 417 denotes a preset-type down counter that decrements the number of pulses entered from an AND-circuit 418 from an initial value preset by the rising edge of a detection signal from the sensor 405.

Reference numeral 419 denotes an initial speed specifier for setting an initial value to the down counter 417.

The outputs transmitted from the down counter 417 during its counting operation are used to determine the divisor for the first frequency divider 412 and at the same time entered to a comparator 420.

The comparator 420 is so designed as to transmits a reset signal to the flip-flop 416 when the reading of the down counter 417 and the value specified by a final speed specifier 421 agree with each other.

A variable speed control 410 having a configuration as described above operates in the following manner.

A divisor Na is stored in the initial speed specifier 419 to be given to the first frequency divider 412, Na being a number necessary to equalize the speed of the intermediary conveyor 402 and the speed Va of the feeding conveyor 401, whereas a divisor Nb (Na>Nb) is stored in the final speed specifier 421 for the second frequency divider 414, Nb being a number necessary to equalize the speed of the inspection conveyor 403 and the speed Vb (Va<Vb) of the inspection conveyor 403.

Figure 29:
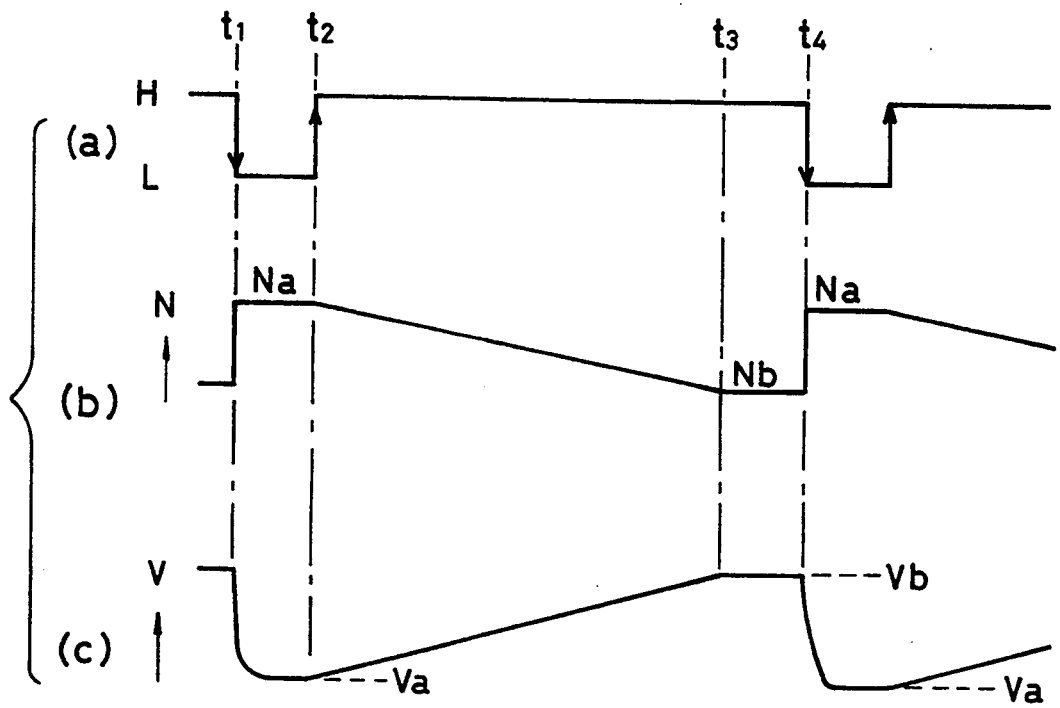
FIG. 29 is a collection of timing charts showing how the second embodiment of FIG. 28 is operated.

The initial speed specifier 415 also stores an arbitrary number M to be used to allow more than (Na-Nb) quotient-frequency pulses transmitted from the second frequency divider 414 to enter it during a period of time (average transfer time) obtained by dividing the effective length of the intermediary conveyor 402 by the average of the speeds Va and Vb.

when the front edge of an object W brought in by the feeding conveyor 401 at a speed Va crosses the sensor 405 at time t1, the signal representing the detection rises as illustrated by chart A in FIG. 29 and a corresponding value Na is set in the down counter 417.

Then, the divisor of the first frequency divider 412 is automatically set to Na as illustrated by chart B of FIG. 29 and the speed of the intermediary conveyor 402 is set to Va as shown by chart C of FIG. 29.

As a result, the object brought in by the feeding conveyor 401 is transferred to the intermediary conveyor 402 and moved further on at a substantially identical speed.

When the object W is completely transferred to the intermediary conveyor 402 at time t2, the detection signal from the sensor 405 rises to give a quotient-frequency pulse from the second frequency divider 414 to the down counter 417 by way of the AND-circuit 418 and the divisor for the first frequency divider 412 is decreased each time it receives a quotient-frequency pulse.

Then, the intermediary conveyor 402 gradually increases its speed and, therefore, the object W is accelerated as it approaches the inspection conveyor.

When the reading of the down counter 417 comes agree with Nb at time t3, the flip-flop 416 is reset to hold the reading of the down counter 417 to the value of that instant and the speed of the intermediary conveyor to Vb.

Thus, the speed of the object W that has been accelerated as it approaches the other end of the intermediary conveyor 402 is then held to a constant value Vb, which is identical with the speed of the inspection conveyor 403, so that it is smoothly moved to the inspection conveyor 403 for inspection.

The speed of the intermediary conveyor 402 returns to the initial speed Va when the next object W is transferred from the feeding conveyor 401 to it at time t4.

The operation of the conveyors as described above will be repeated for the succeeding objects so that they are sequentially sent to the inspection conveyor 403 with out receiving any abrupt speed change and hence being subjected to any shock.

Figure 30:
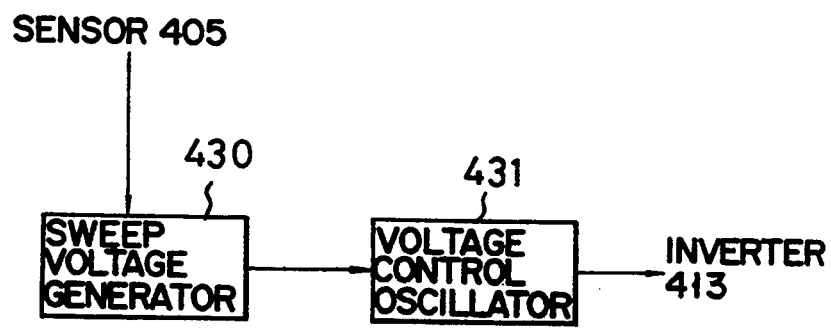
FIG. 30 is a block diagram showing the configuration of a principal area of an apparatus obtained by modifying the embodiment of FIG. 28.

While the speed of the intermediary conveyor is rectilinearly modified by continuously changing the divisor of the first frequency divider in the above embodiment, alternatively it may be differently (e.g., curvilinearly) modified by continuously changing the oscillation frequency of the voltage-control oscillator 431 by means of a sweep voltage generator (VCO) 430 whose sweep time, sweep initiating voltage and sweep terminating voltage may be arbitrary specified as illustrated in FIG. 30.

While the above embodiment was described in terms of acceleration of the speed of the object being conveyed by the intermediary conveyor, it may be needless to say that the speed may be decelerated by simply using an up counter in place of the down counter 417.

While the above embodiment uses an optical sensor 405 for detecting objects being brought in, a sensor that detects changes in the lines of magnetic force emits or a sensor that detects changes in the load applied to the conveyor may be alternatively used.

Since the above described second embodiment of the conveyor system of the invention detects the start of transfer of an object from the feeding conveyor to the intermediary conveyor, causes the speed of the intermediary conveyor to agree with that of the feeding conveyor and then accelerates the speed to get to that of the inspection conveyor as the object reaches its other end, the object is free from any shock and therefore falling down or lopsided contents.

Therefore, even when oblong objects are conveyed, they can be moved in a perpendicularly arranged position without trouble in order to increase the rate of transportation.

Now, a third embodiment of the invention will be described.

FIG. 33 shows the configuration of a weighing/sorting machine comprising an inverter controlled conveyor system, which is the third embodiment of the invention. The components of the machine which are similar to those of the conventional machine as illustrated in FIG. 36D and described above will be indicated by identical reference numerals and will not be described any further.

The weighing/sorting machine comprises three identically designed inverters (frequency converters) 520, 521, 522 for controlling the operation of respective electric motors M1, M2 and M3.

Each of the inverters 520, 521 and 522 receives AC from a commercial power source, rectifies it to obtain DC and incessantly turning on and off a switch to produce ACs having phases differentiated by 90° according to control signals given to it, which are then used to drive any selected two of the three single-phase induction-type brushless motors M1, M2 and M3.

Reference numeral 523 denotes a speed control for specifying the speed of the overall operation of the weighing/sorting machine and issuing speed data S according to the specified value.

Reference numerals 524 and 525 denote so many correction circuits to be used to correct the speed data S by dividing it by the ratio a of the speed of the feeding conveyor 1 to that of the weighing conveyor 3 and the ratio $\beta$ of the speed of the weighing conveyor 3 to that of the sorting conveyor 8 and transmits the obtained results respectively to the inverters 520 and 522. (The speed ratios are kept substantially constant and are specifically determined for the conveyors in advance.)

Thus, when speed data S is set in the speed control 523 for specific objects W, corresponding speed data S/α, S and S/β are given to the respective inverters 520, 521 and 522.

Consequently, due to the ratio of the drive frequencies of the motors M1, M2 and M3, or F1:F2:F3=1/α:1:1/β, the conveyors are driven at an identical speed.

Under this condition, the object W on the feeding conveyor 1 is transferred to the weighing conveyor 3 without being exposed to any external shock and any diver-gence, if any, of the signal representing the weight of the object W transmitted from the weighing instrument 4 that reveals the unstable condition of the object on the weighing pan can be quickly dissipated.

The arrival of an object to the weighing conveyor 3 is detected by the sensor 6 and, after the elapse of the time set for the object from the instant when it is completely transferred to the weighing conveyor 3 to the instant when the weighing operation is completed, it is assigned to a specific group by the sorting circuit 7, which transmits a sorting signal that represents the status of the object.

The object that has been moved from the weighing conveyor 3 to the sorting conveyor 8 without receiving any shock is then led by a guide device 9, which is controlled by the sorting signal, to an appropriate takeout position, from where it is further carried away for the next processing step (not shown).

When the machine is used for objects of a different type at a different conveying rate, the speed of the conveyors is appropriately altered by modifying the speed data S stored in the speed control 523. Since the motors are controlled by the frequency of the electric currents running through them, their torques are not undesirably reduced when a low speed is specified for them and the machine shows a high stability of operation.

While a same and identical speed is assumed for all the three conveyors, the feeding conveyor 1, the weighing conveyor 3 and the sorting conveyor 8, in the above description, it may be alternatively so arranged that only the feeding conveyor 1 and the weighing conveyors have a common and identical speed, because the difference of speed between the feeding conveyor 1 and the weighing conveyor 3 is by far more significant to possible shocks to which the weighing conveyor 3 may be exposed.

While inverters are used for driving the motors in the above embodiment, they may be replaced by any devices that can change the drive frequencies according to input signals. Such devices may include drive power sources to be used for stepping motors.

Figure 34:
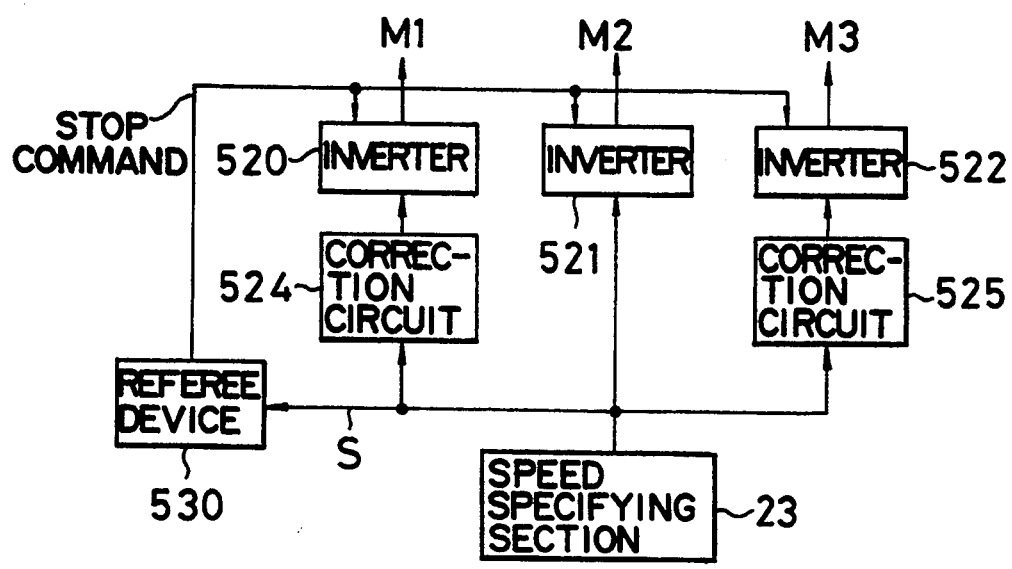
FIG. 34 is a block diagram showing the configuration of a principal area of an apparatus obtained by modifying the embodiment of FIG. 33.

While an inverter can produce AC to drive a motor with a considerably low frequency, an arrangement as shown in FIG. 34, where the inverters 520, 521 and 522 stop operation or are locked to a specific frequency if referee device 530 determines that the speed data shows a deviation from a specified range, can effectively prevent the motors the motors from burning (at low speed) due to an operational failure of the speed control 523 and the object from falling.

Figure 35A:
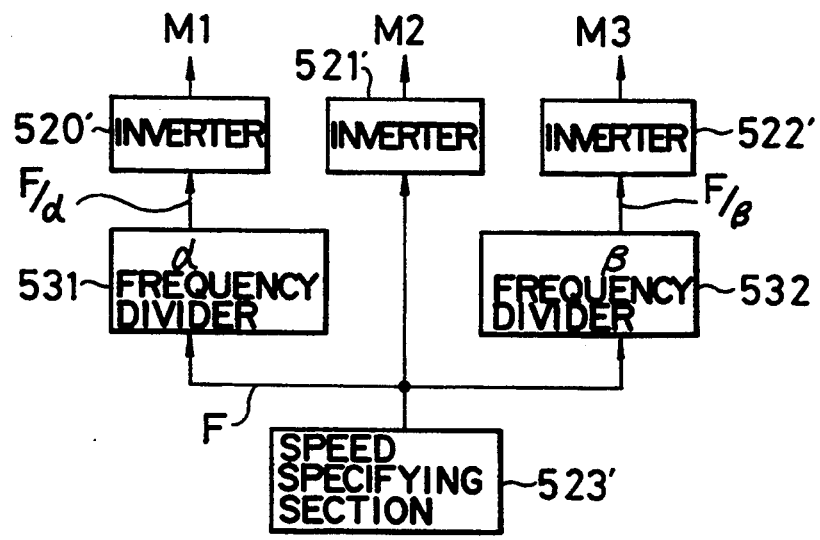
FIGS. 35A and 35B are block diagrams showing the configurations of principal areas of apparatus obtained by modifying the embodiment of FIG. 33.
Figure 35:
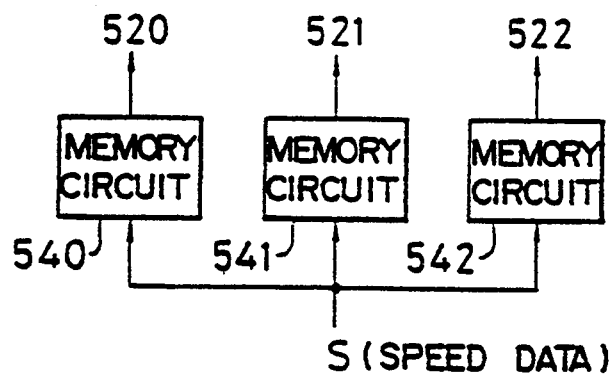

While speed data for specifying the velocity at which objects are moved are entered to the correction circuits 524, 525 so that they are modified by mathematical operations before given to the inverters in the above embodiment, the operation of modifying the specified speed data may be alternatively such that a frequency F that corresponds the specified speed is entered to a frequency divider 531 and $\beta$ frequency divider 532, which serve as correction means, and the quotient frequencies (modified output) are used to control the drive frequencies of the inverters 520', 521' and 522' as illustrated in FIG. 35A.

Still alternatively, the operation may be performed by using memory circuits 540, 541 and 542 as illustrated in FIG. 35B which stores data for the relationship between the object conveying speed and the motor drive frequency and from which the stored frequency data are read out by using the speed data S for addressing in order to specify the drive frequency of the inverters 520, 521 and 522. This technique is particularly useful when the conveying speed of the conveyors is not a linear function of the speed data.

While the third embodiment is described above in terms of a weighing/sorting machine, it may be alternatively applied to any machine that uses a plurality of conveyors and drives them at an identical and constant speed.

The third embodiment of the invention described above is an inverter controlled conveying/measuring apparatus applied to a weighing/sorting machine comprises and comprising a plurality of driving power sources for driving the respective conveyor drive motors with electric currents having a variable frequency and a correction means for modifying the speed specifying signal so that the plurality of conveyors are driven substantially at a same and identical speed.

with such an arrangement, the speed of the plurality of conveyors can be modified quickly and easily by using a speed specifying signal so that it can accommodate any changes in the type of the objects to be conveyed.

Moreover, since the rotary speed of the motors are modified by varying the frequency of the electric currents from the power sources, the torques of the motors are not undesirably reduced when they are driven at low speed so that large and/or heavy objects may be smoothly conveyed.

It may be needless to say that the above embodiments may be modified within the scope of the present invention.

Now, an electromagnetic balance-type weighing apparatus that can be used as a component for weighing objects of any of the above embodiments will be described in greater detail.

It is well known that weighing apparatus of conventional differential transformer type and load cell type used in various manufacture and process lines for weighing (measuring)objects (works) have gradually been replaced by those of electromagnetic balance-type.

The configuration of a known typical electromagnetic balance-type weighing apparatus is shown in FIG. 40 of the accompanying drawings.

In FIG. 40, reference numeral 601 generally denotes a weighing pan/balance beam assembly supported at fulcrum S selected to show a given leverage, the weighing pan being positioned at one end portion 601a of the balance beam for determining the weight of object W placed on it, 602 denotes a circular hole provided at a bent-down section of the other end portion 601b of the balance beam of the assembly 601 and reference numeral 603 denotes a light emitter that emits beams of light toward the hole 602, while reference numerals 604 and 605 respectively denote upper and lower light sensors arranged to receive the beams of light passing through the hole 602.

Reference numeral 606 denotes a differential amplifier for detecting the difference between the beams received by the light sensor 604 and those received by the light sensor 605. Reference numeral 607 denotes a proportional integral derivative (hereinafter referred to as PID) operation unit for performing the operation of scalar multiplications, integrations and differentiations on the differential signal it receives and sending out a control voltage determined on the basis of the received signal and reference numeral 608 denotes a driving amplifier for generating a driving voltage corresponding to the received control voltage in order to produce a large electric current.

Reference numeral 609 denotes an electromagnetic (force) coil designed to pull the other end portion 601b of the balance beam opposite to the weighing pan downward by means of the electromagnetic force generated by the electric current running through it in accordance with the driving voltage, reference numeral 610 denotes a buffer amplifier for transmitting the voltage generated at resistor R by the electric current running through the electromagnetic coil 609 and reference numeral 611 denotes a low-pass filter (hereinafter referred to as LPF) for producing a DC voltage signal corresponding to the weight of the object of weighing obtained by removing those components of the signal transmitted from the buffer amplifier 610 that are responsible for oscillation and noise.

When the weighing pan 601 of an electromagnetic weighing apparatus having a configuration as described above is displaced clockwise by the weight of an object being weighed, a differential signal is generated by the difference of the amount of light received by the light sensor 605 and that received by the sensor 604, the former now being larger than the latter, so that consequently the control voltage transmitted from the PID operation unit 607 is increased to generate a force to move the weighing pan 601 counterclockwise to restore its initial position and hence the balanced condition of the weighing pan 601.

Since the force of pulling down the end of the balance beam opposite to the weighing pan generated by the electromagnetic coil 609 is linearly proportional to the driving current, the voltage present at the opposite ends of the resistor R when the weighing pan 601 is balanced is a linear function of the weight of the object being weighed.

Thus, the weight of the object of weighing can be determined by detecting the output signal of the LPF 611, once the voltage output of the opposite ends of the resistor is calibrated for the load of the weighing apparatus.

However, if the load applied to a conventional electromagnetic balance-type weighing apparatus as described above by an object of weighing changes stepwise and the electromagnetic coil 609 is driven to generate electromagnetic force by a voltage applied to it, the electric current caused to run through the electromagnetic coil 609 as transient response to the inductance of the coil returns to its normal level very slowly following the curve of natural logarithm, a phenomenon that requires a long period of time for weighing an object.

This phenomenon can give rise to a very serious problem of extremely low weighing speed particularly when the weighing pan is realized in the form of a conveyor belt that moves objects of weighing on it at a given pitch and a given rate up to the weighing spot in an attempt to maximize the rate or efficiency of the weighing operation. While this problem may be dissolved to some extent by increasing the pitch of differentiation in the PID operation unit 607, such a modification made to the operation unit 607 can prohibit optimization of the control capability of the apparatus which is the principal objective of the differentiation and, at the same time, eventually cause the control system of the apparatus to oscillate and consequently deteriorate its operation.

Figure 58:
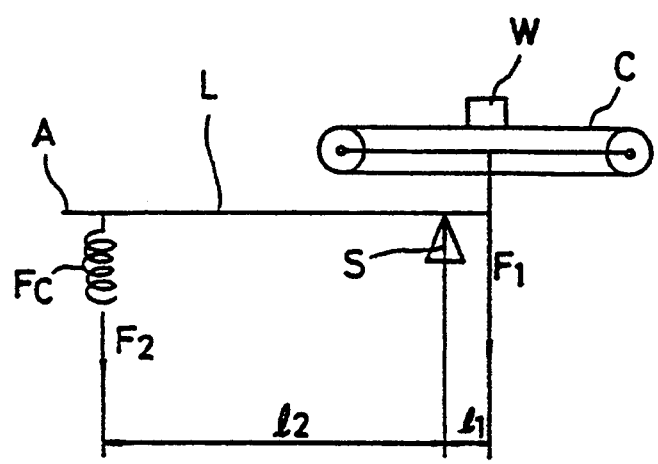
FIG. 58 is a schematic view of a conventional electromagnetic balance-type weighing apparatus, illustrating its basic concept.

As seen from FIG. 58 that schematically illustrates the principle of a known electromagnetic balance-type weighing apparatus as described above, the apparatus receives a force F1 at an end of the balance beam L applied by the object of weighing W to the point of weighing of the weighing pan C (realized in the form of a weighing conveyor belt for instance) located at that end of the beam L, which is supported at the fulcrum S, and a sucking force F2 of the electromagnetic coil FC at the other end of the beam L in such a way that the beam L is balanced by the two forces so that the weight of the object of weighing W on the weighing pan C can be determined from the electric current supplied to the electromagnetic coil FC to maintain the balanced condition.

If the weighing pan C (realized in the form of a weighing conveyor belt) is cleared of any object of weighing W, certain electric current should be supplied to the electromagnetic coil FC at a given rate to counterbalance the dead weight of the weighing pan C and keep the balance beam L horizontal by pulling the other end A of the balance beam L downward around the fulcrum S, because otherwise the other end A of the balance beam L will be turned upward by the dead weight of the weighing pan C. When an object of weighing W is placed on the weighing pan C, the electric current supplied to the electromagnetic coil FC should be augmented to increase its sucking force F2 in order to offset the upward movement of the other end A of the balance beam L and keep its balanced condition. The weight of the object of weighing W is determined from the increase in the rate of electric current supplied to the electromagnetic coil FC.

A known electromagnetic balance-type weighing apparatus as described above is, however, accompanied by the problems as described below.

(a) Since the dead weight of the weighing pan C is counterbalanced by the sucking force F2 of the electromagnetic coil FC, the latter should be constantly fed with electricity even when the weighing pan C does not have any object W on it in order to hold the balance beam L horizontal and therefore the level of power consumption of such an apparatus is not negligible.

When the weighing pan C is realized in the form of a conveyor belt that moves objects of weighing W at a given pitch and a given rate, the dead weight to be offset by the sucking force of the electromagnetic coil FC includes the weight of the conveyor belt and that of the electric motor for driving the conveyor belt and therefore the power requirement of such an apparatus can be considerable. This in turn gives rise to a high rate of heat generation by the electromagnetic coil and the high temperature caused by the generated heat can adversely affect the accuracy of operation of the electromagnetic coil and therefore that of the electromagnetic balance-type weighing apparatus. (b) In order to accommodate any heavy object on the weighing pan C and keep the balanced condition of the beam L by means of the sucking force F2 of the electromagnetic coil FC, the ratio of the distance l1 between the fulcrum S of the balance beam L and the point of weighing of the weighing pan C to the distance l2 between the fulcrum S and the point of receiving the sucking force of the electromagnetic coil FC should be strongly in favor of the latter. Because of the inversely high ratio of l1 to l2 and the remarkable weight imbalance between the weighing pan C side and the other side of the balance beam L as viewed from the fulcrum S, the balance beam L is highly sensitive to and can resonate with external vibrations (such as the vibration of the floor where the weighing apparatus is installed), that can also adversely affect the accuracy of operation of the apparatus.

Besides, the balance beam L can significantly vibrate when an object of weighing W is placed on or removed from the weighing pan C because of an abrupt weight imbalance produced there, a phenomenon that also adversely affect the accuracy of weighing operation of the apparatus.

FIG. 59 of the accompanying drawings schematically illustrates the configuration of a known water-proof weighing apparatus using a differential transformer.

A weighing pan C (in the form of a conveyor belt for instance) is arranged external to a housing B of the apparatus main body and one end portion of the balance beam L which is separated from the fulcrum S by a short distance for receiving an object of weighing on a part of it.

Supports Ca, Ca for supporting the weighing pan C stand upright through respective holes Ba, Ba of the housing B in such a manner that the weighing pan C can freely move upward and downward. A spring SP is rigidly fitted to the other end portion of the balance beam L as viewed from the fulcrum S and the balance of the beam L is secured by the resilient deformation of the spring SP. The spring SP acts also as a sensor spring that provides (angular) displacement of the balance beam L with a magnitude which is proportional to the weight of the object of weighing W on the weighing pan C. With such an arrangement, the weight of the object of weighing W can be determined by detecting the displacement of the balance beam L by means of a differential transformer T whose core TC is arranged at the one end portion of the balance beam L opposite to the weighing pan C.

If the object of weighing W being weighed on a weighing apparatus having a configuration as described above contains liquid in it, some of the liquid content can flow into the main body of the weighing apparatus through the whatever small space between the holes Ba, Ba of the housing B and the respective supports Ca, Ca. A similar problem may arise when the weighing pan C is washed with water.

In order to eliminate such a problem, conventionally a cylindrical protector hood Pa is fitted around each of the supports Ca, Ca and a water-proof cylinder Pb is arranged along the edge of each of the holes Ba, Ba of the housing B, as illustrated in FIG. 59. A drain ridge Pc is also arranged around the outer periphery of the top of each of the water-proof cylinders Pb, Pb whenever necessary.

However, a water-proof weighing apparatus of the type as described above are accompanied by the following problems.

(a) While the clearance between each of the drain ridges Pc, Pc of the water-proof cylinders Pb, Pb and the corresponding water-proof hood Pa should be minimized in order to effectively prevent liquid from flowing into the housing B, it should be large enough to avoid any possible contact between the supports Ca, Ca and the respective water-proof cylinders Pb, Pb, hoods Pc, Pc and the drain ridges Pc, Pc that can be brought about by dust and/or misalignment of the columns and the respective holes and secure free movement of the supports Ca, Ca. A large clearance by turn hinders complete protection of the weighing apparatus against liquid.

(b) Since the inside of the casing is exposed to atmosphere, dews can be formed within the weighing apparatus.

While the space between the housing B and the support supports Ca, Ca may be airtightly covered by elastic members D, D as illustrated in FIG. 60, such an arrangement is also accompanied by the following drawbacks.

(c) The resilient force of the elastic members D, D applied to supports Ca, Ca adversely affects the operation of the weighing apparatus so that the displacement of the balance beam L does not correctly represent the weight of the object W being weighed.

(d) Since the housing B is airtightly sealed, the internal air pressure of the housing B is changed by the temperature of the inside of the housing B to consequently give rise to errors in measurement.

(e) Since the casing B is airtightly sealed, the air contained in the casing B acts as a cushion that can unintentionally vibrate the balance beam L, requiring some time before the beam returns to a stationary condition.

It should be noted that similar problems are observed with any conventional electromagnetic balance-type weighing apparatus, where the differential transformer T is replaced by an electromagnetic coil FC fitted to one end portion of the balance beam L as illustrated in FIG. 58.

In short, any existing electromagnetic balance-type weighing apparatus is devoid of fast-responsiveness and does not meet the requirement of high precision and high reliability.

FIG. 37 shows a schematic diagram of the configuration of a first improved electromagnetic balance-type weighing apparatus, where the components which are similar to those of FIG. 40 are indicated by identical reference numerals.

In FIG. 37, reference numeral 615 denotes a weighing pan/balance beam assembly, of which the weighing pan is realized in the form of a conveyor belt fitted to an end 615a of the balance beam pivotally supported by a fulcrum S at a given point between the opposite ends of the beam and 616 denotes a circular hole formed at a bent-down section 615c of the other end 615b of the balance beam of the weighing pan/balance beam assembly 615. Light sensors 604, 605 receive beams of light coming from a light emitter 603 through the hole 616 and transmit signals corresponding to the beams of light they receive and hence representing the amount of displacement of said balance beam to a differential amplifier 606. The output signal from the differential amplifier 606 is transmitted to a PID operation unit 607, which by turn brings forth a control voltage that corresponds to the load applied to the weighing pan 615.

It should be noted here that the PID operation unit 607 may be replaced by a control unit based on the most advanced theories for system control such as a fuzzy control unit involving a membership function. What is important here is that a control unit put to use should be capable of performing mathematical operations on various control parameters in such a manner that said displacement signal may approach zero as close as possible.

Reference numeral 620 denotes a current transducer circuit that supplies an electric current to an electromagnetic coil 9 at a rate corresponding to the control voltage produced by the PID operation unit 607.

The current transducer circuit 620 is so designed that it detects by means of the voltage applied to a resistor R2 the electric current running through the electromagnetic coil 609, which is driven by the output electric current of a driving amplifier 621 to whose inverted input terminal the control voltage is applied by way of a resistor R1 and the detected voltage is fed back to the inverted input terminal of the driving amplifier 621 by way of the non-inversion input terminal of a buffer amplifier 622, to which it is applied, its output terminal and then a resistor R3 (=R1). The non-inverted input terminal of the driving amplifier 621 is grounded by way a resistor R0, while the inverted input terminal of the buffer amplifier 622 is connected to its output terminal.

Reference numeral 623 denotes an A/D converter to be used for converting gross weight signals transmitted from the buffer amplifier 622 by way of a LPF 611 into digital signals and 624 denotes a weight calculator for determining the weight of the object of weighing by subtracting the weight of the weighing pan 615 from the total load of the weighing pan represented by the gross weight signal.

Reference numeral 625 denotes a sensor for determining the timing of bringing an object of weighing onto the weighing pan 615. The A/D converter 623 proceeds to an operation of converting a gross weight signal into a corresponding digital signal only when time T has elapsed after receiving a timing signal.

The operation of an electromagnetic balance-type weighing apparatus according to the invention and having a configuration as described above will now be described by referring to the timing charts A through G shown in FIG. 38.

As an object of weighing W is put on the weighing pan 615, the load of the weighing pan will show a change as expressed by the trapezoidal line of chart A.

The PID operation unit 607 adds the derivative component (chart B in FIG. 38) to the integral and proportional component (chart C in FIG. 38) and transmits a signal representing the resultant waveform (chart D in FIG. 38) which is generally found between $-V1$ and $-V2$.

The driving amplifier 621 quickly responds to the control voltage Vc as it is fed back from the buffer amplifier 622 so that the output current Ia of the driving amplifier 621 is converged to a value determined by V2/R2 as shown by chart E in FIG. 38.

It will be easily understood that the rate of the convergence is considerably higher than that of the output current of the driving amplifier of a conventional apparatus as shown by chart E of FIG. 38 which is driven to operate by voltage.

At this stage, the voltage applied to a terminal of the resistor R2, or the power voltage Vb of the buffer amplifier 22 will be $-V2$ volt as shown by chart F in FIG. 38.

As the rate of the electric current running through the electromagnetic coil 609 is quickly modified, responding to the control voltage, the weighing pan/balance beam assembly 615 quickly regains its balanced condition as illustrated by chart G of FIG. 38 if it is temporarily displaced by the load applied to it by the object of weighting placed on the weighing pan.

The gross weight signal obtained at time T after an object of weighing is put on the weighing pan is converted into a digital signal and sent to the weight calculator 624, which determines the weight of the object of weighing.

Since the electric current running through the electromagnetic coil 609 changes itself quickly responding to the variation in the control voltage, the time T can be made very short and the efficiency of operation of the weighing apparatus will be maximized by so selecting the rate of moving objects of weighing that the time required for each object of weighing to stay on the weighing pan 615 is very close to T.

While the current transducer circuit 620 of the above embodiment is constituted by a driving amplifier 621 and a buffer amplifier 622, it may be alternatively realized in the form of a current transducer circuit 630 having a configuration as shown in FIG. 39. The current transducer circuit 630 illustrated in FIG. 39 comprises a driving amplifier 631 for receiving a control voltage from the PID operation unit 607 and providing a transducer voltage gain "1" to produce a large electric current and an inversion type driving amplifier 632 connected with a resistor R2 for detecting electric current and the electromagnetic coil 609 to set up a negative feedback loop and a resistor R4 through which it receives the output signal of the driving amplifier 631. Reference numeral 633 denotes a differential amplifier for converting the terminal voltage of the resistor R2 into a weight signal.

Similarly, the two light sensors 604, 605 of the above embodiment for detecting the displacement of the weighing pan as shown in FIG. 37 may be replaced by non-optical means such as a differential transformer.

As described above, since the first embodiment of the electromagnetic balance-type weighing apparatus of the invention is so designed as to use its electromagnetic coil to set up a negative feedback loop and drive it to operate by means of the electric current running therethrough, the current quickly responds to changes in load applied to the weighing pan and consequently the time required for the apparatus from the detection of a change in the load caused by an object of weighing to the determination of the weight of the object is significantly reduced to improve the efficiency of weighing operation.

It should be also noted that, in the above embodiment, the A/D converter 623 as shown in FIG. 37 contributes to the improvement of the reliability of the electro-magnetic balance-type weighing apparatus as it converts the analog weight signal obtained from the LPF 611 into a corresponding digital value, which is then supplied to the weight calculator 624 so that the latter can perform arithmetic operations quickly and accurately.

A voltage/frequency converter (hereinafter referred to as V/F converter) may be suitably used for the A/D converter because it can simplify the overall configuration and reduce the cost of the A/D conversion circuit.

FIG. 44 shows a typical configuration of an A/D conversion circuit using a V/F converter.

In FIG. 44, reference numeral 731 denotes a V/F converter that, upon receiving an analog signal in the form of voltage, generates a pulse signal with a frequency F that corresponds to the voltage V. For instance, it the input voltage varies from zero to the other end of the scale (e.g., 10 volt), the frequency of the output signal may vary from zero to 2 MHz as a linear function of the voltage.

Reference numeral 732 denotes a counter circuit for counting the frequency of the pulse signal coming from the V/F converter 731. More specifically, it lets the pulse signal pass through AND circuit 734 and get to N-bit counter 735 for a given period of time by using a gating signal transmitted from gating signal generating circuit 733 and causes latch circuit 736 to latch the result of the counting and generate an output signal representing the digital value of the count.

Reference numeral 737 denotes a latching pulse generating circuit that generates a latching pulse for each gating pulse which is slightly delayed relative to the rising edge of the gating pulse and 738 denotes a resetting pulse generating circuit that generates a resetting pulse to reset the counter 735 for each latching pulse which is slightly delayed relative to the latching pulse but slightly precedes the rising edge of the next gating pulse.

with such an arrangement, whenever the input analog voltage V is varied, the count value to be latched to the latch circuit 736 for a given period of time is altered accordingly.

An A/D conversion circuit having a configuration as described above may be unable to respond to changes in analog signals quickly and accurately that contain high frequency components if the weight signal (analog signal) of the electromagnetic balance-type weighing apparatus needs highly accurate measurement and analysis for its waveform because a relatively long gating time of 32 milliseconds (64K/2 MHz) may be required if a resolution of 16 bits should be achieved.

This problem may be resolved by reducing the gating time to, for instance, one-eighth of 32 milliseconds, or 4 milliseconds, to increase the rate of sampling and adding eight consecutive counts to realize a resolution of 16 bits. However, the time required to reset the counter 735 should be made negligibly short relative to the period of a pulse signal with the highest possible frequency generated by the V/F converter 731 if such an arrangement should prove practically feasible.

Differently stated, since the number of pulses given to the counter during the time for resetting the counter is not included in each count, the sum of the consecutive counts inevitably and significantly differs from the correct number of pulses and consequently the apparatus will become poorly accurate and reliable.

A conceivable solution to this problem may be the use of a high speed device such as an emitter-coupled logic (hereinafter referred to as ECL), a logic gate that operates at very high speed. But such a high speed device is very costly and emits heat at a high rate, giving rise to additional problems including the drift phenomenon that should be newly addressed. Therefore the use of such a device does not constitute a recommendable solution to the problem.

Figure 41:
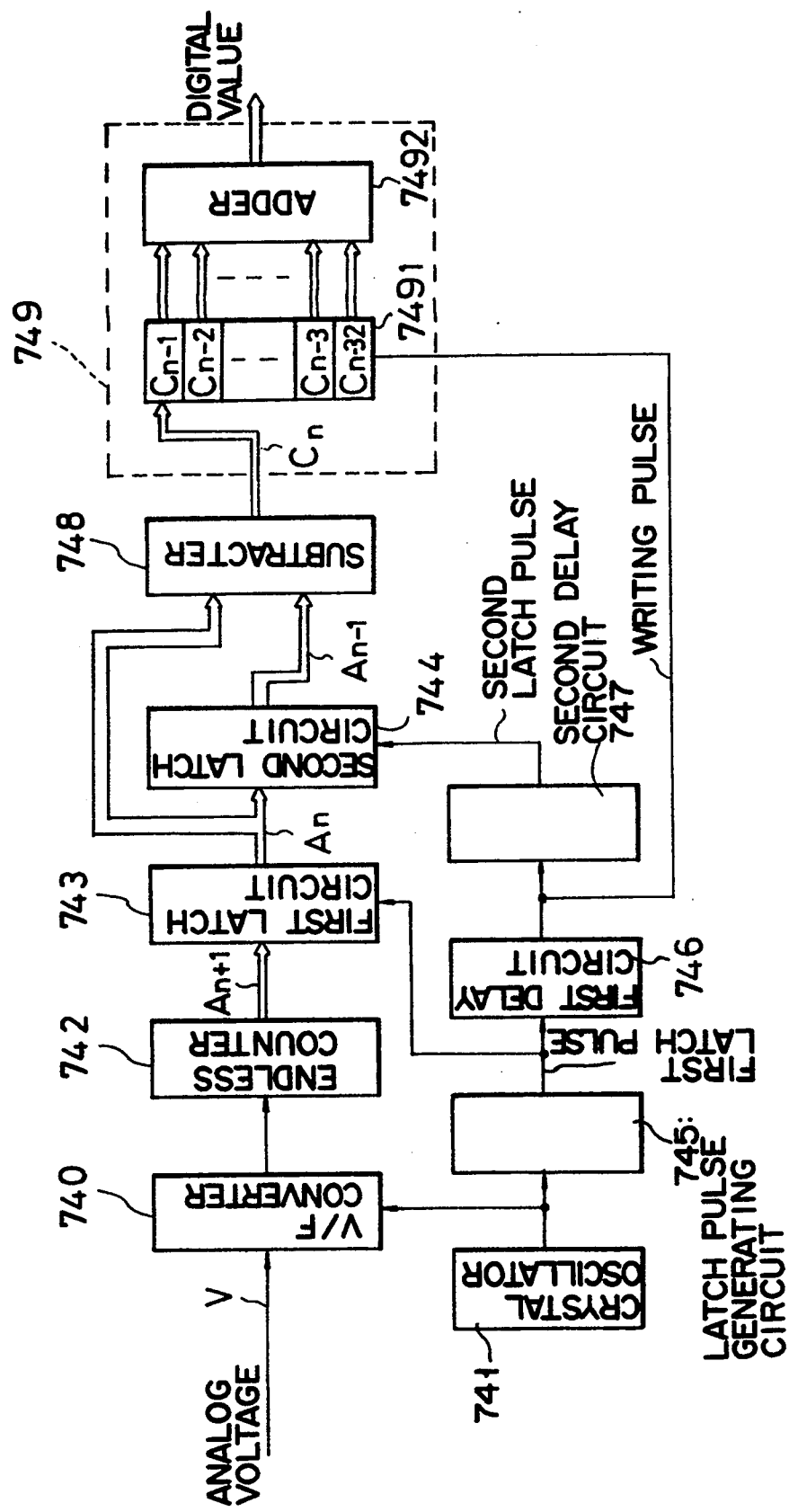
FIG. 41 is a block diagram showing the configuration of the A/D converter used in the apparatus of FIG. 37.

FIG. 41 shows a block diagram of an A/D converter proposed as a possible solution to overcome the above problem.

In FIG. 41, reference numeral 740 denotes a V/F converter that generates a pulse signal having a frequency that varies as a linear function of the analog voltage applied to it. It may be typically a synchronous V/F converter that generates an output pulse signal in synchronism with the clock signal transmitted from a crystal oscillator 741, the frequency of said output pulse signal varying between zero to 2 MHz in response to the variance in the analog voltage between zero and 10 volt as in the case of the V/F converter 731 described earlier.

Reference numeral 742 denotes a counter, e.g., 16-bit endless counter, for continuously counting the pulse signals transmitted from the V/F converter 740.

Reference numeral 743 denotes a first latch circuit for latching the count output from the endless counter 742 each time it receives a first latching pulse, while reference numeral 744 denotes a second latch circuit for latching the output of the first latch circuit 743 each time it receives a second latching pulse.

Reference 745 denotes a latching pulse generating circuit for dividing the frequency of a clock signal coming from the crystal oscillator 741 and generating a first latching signal for every 1 millisecond and reference numeral 746 denotes a first delay circuit for generating a write pulse with a short delay of time d1 relative to the first latching pulse, while reference numeral 747 denotes a second delay circuit for generating a second latching pulse with a slight delay of time d2 relative to the write pulse.

Reference numeral 748 denotes a subtracter for subtracting the output of the second latch circuit 744 from the output of the first latch circuit 743.

The result of the subtraction is equal to the value Cn obtained by subtracting the reading An−1 of the endless counter 742 at time Tn−1 when a first latching pulse is generated from the reading An of the counter at time Tn for generation of the next latching pulse and represents a digital value that corresponds to the level of voltage from Tn−1 to Tn expressed in analog form.

Since the digital value is equal to the difference between two pulse signals latched with an interval of 1 millisecond that can vary between zero and 2 MHz, it shows a resolution of "2,000" or 11 bits at maximum.

Reference numeral 749 denotes an integral circuit that generates an output representing the accumulated sum of the results of a given number of times (32) of subtractions made to consecutive inputs and comprises a shift register 7491 for sequentially storing the results of subtraction and an adder 7492 for adding the data stored in the shift register 7491.

Figure 42:
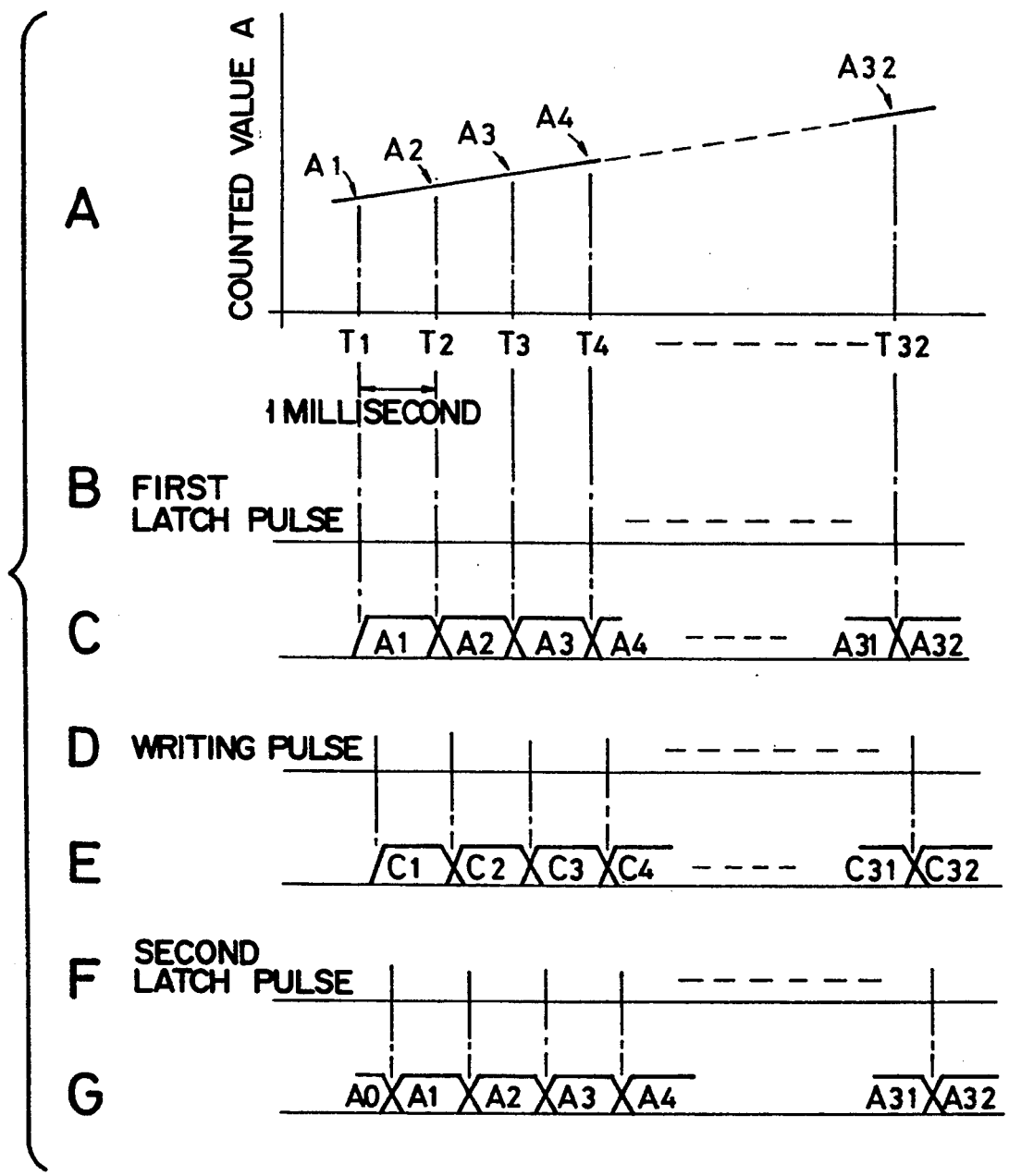
FIG. 42 is a collection of timing charts showing how the A/D converter of FIG. 41 is operated.

Now, the operation of the A/D converter having a configuration as described above will be explained by referring to the timing charts A through G shown in FIG. 42.

when an analog input signal is given to the V/F converter 740, a pulse signal having a frequency that corresponds to the voltage of the input signal is generated and sent to the endless counter 742 to augment the reading of the counter as shown by chart A in FIG. 42.

Then, a corresponding latching pulse is generated at time T1 for the pulse signal as illustrated in chart B of FIG. 42 to latch count value A1 to the first latch circuit 743 as shown in chart C of FIG. 42 and a write pulse (chart D in FIG. 42) which is generated with a slight delay relative to the latching pulse triggers an operation of subtracting the immediately preceding count value (A0) stored in the second latch circuit 744 from the count value A1 to give out the difference C1, which is then stored in the shift register 7491 (chart E of FIG. 42).

As a second latching pulse generated with a short delay relative to the write pulse is entered to the second latch circuit 744 as shown by chart F in FIG. 42, count A1 that has been latched to the first latch circuit 743 is then latched to the second latch circuit 744 as shown by chart G in FIG. 42.

Thereafter, the difference of two consecutive readings is stored in the shift register 7491 for every one millisecond in the same manner.

The output of the adder 7492 when the results of 32 subtractions C2 through C33 are stored in the shift register 7491 is a digital value that corresponds to the level of the voltage expressed in analog form for a period of 32 milliseconds from T1 to T33 and, since the endless counter 742 continuously keeps on counting, no errors are accumulated during the period, making the output of the adder to show a resolution, or an accuracy, of 16 bits.

When the result of the next subtraction C34 is stored in the shift register 7491, the output of the adder 7492 will be a digital value that corresponds to the level of the voltage in analog form between T2 and T34. In the same way, a digital value with an accuracy of 16 bits will be obtained for the corresponding analog voltage for every 1 millisecond.

There may be a case where the reading of the endless counter 742 exceeds its limit and shows a value An smaller than the value An−1 of the reading immediately before it. However, since the adder 748 is so designed that the sub traction is operated by assuming that the seventeenth bit of the latched output value An of the first latch circuit 743 is always "1" and therefore the operation of subtraction is always conducted without mistake.

While the A/D converter in FIG. 5 produces a digital value with a resolution of 16 bits by accumulating the (32) results of consecutive subtractions stored in the shift register 7491, it may be so designed that all results of subtractions are stored in the shift register 7491 and the stored data may be selectively retrieved from it with a required level of resolution each time when a waveform analysis is conducted.

Likewise, while the A/D converter in FIG. 41 adds the results of subtractions with a level of resolution of 11 bits without further processing them, it may be so configured as to obtain a resolution of 16 bits as illustrated in FIG. 43, where each result of subtraction is multiplied by $2^5$ (or five "0"s are added to the end of the result as lower five digits) in shift register 7491a and M (an arbitrary number) consecutive results of subtractions expressed by using 16 bits are added in adder 492a, the sum being averaged by a 1/M divider 493.

Further more, while the A/D converter in FIG. 41 comprises a 16-bit endless counter 742, the counter may be replaced by any counter that can count numbers within a limit defined by the number obtained by dividing the output frequency corresponding to the upper end of the scale of the V/F converter by the latching frequency. Moreover, it may be also apparent that the A/D converter in FIG. 41 may be replaced with a comparable 12-bit or higher-bit counter.

Since an A/D converter as described above is so designed that outputs of the V/F converter are continuously recorded for a given period of time to determine the difference between the counts at the beginning and at the end of the period for digitization, the digitization may be performed to obtain a desired level of accuracy with a relatively narrow pitch of sampling of incoming analog signals and therefore without requiring a high speed counter to afford a high accuracy of measurement and a high speed waveform analysis.

FIG. 45 shows a block diagram of an alternative A/D converter proposed to eliminate the problem of the A/D converter of FIG. 8.

In FIG. 45, reference numeral 750 denotes a V/F converter for producing a pulse signal with a frequency corresponding to the analog voltage applied thereto. It may typically be a synchronous V/F converter that produces an output pulse signal in synchronism with the clock signal transmitted from a crystal oscillator 751. The frequency of the pulse signal transmitted from the V/F converter may vary between zero and 2 MHz in response to the analog voltage applied thereto that can vary from zero to 10 volt as in the case of the V/F converter 731 of FIG. 44.

Reference numeral 752 denotes an input changeover switch that forwards the pulse signal from the V/F converter 750 either to a first counter 753 or to a second counter 754 depending on the level of the changeover signal it receives. The first and second counters 753, 754 are 12-bit binary counters.

Reference numeral 755 denotes a changeover signal generating circuit for generating input changeover signals having a level reversed at a frequency, e.g., once for every millisecond, obtained by dividing the frequency of the clock signal from the crystal oscillator 751 and 757 denotes a write pulse generating circuit for generating a write pulse each time it receives an output changeover signal with a slight delay of time d1 relative to the rising or falling edge of the output changeover signal which is obtained by reversing the corresponding input changeover signal by means of an inverter 756.

Reference numeral 758 denotes an output changeover switch for selectively transmitting the output of either the first counter 753 or the second counter 754 depending on the level of the output changeover signal. The output changeover switch 758 operates reversely relative to the input changeover switch 752 and, therefore, selects the output of the second counter 754 when the first counter 753 is operating and that of the first counter 753 when the second counter 754 is operating.

Reference numeral 759 denotes a resetting circuit for slightly delaying write pulses by time d2 and resetting whichever the counter that has completed its operation.

Reference numeral 760 is an accumulator circuit for producing the total of given number of (32) consecutive inputs, said accumulator circuit comprising a shift register 761 for sequentially storing the counts transmitted from the output changeover switch in synchronism with the corresponding write pulses an adder 762 for adding the data stored in the shift register.

It should be noted that the maximum digital value that can be stored in the shift register 761 is "2,000" which is obtained by counting the number of pulses for 1 millisecond of a 2 MHz pulse signal that represents the maximum frequency for the apparatus. If differently stated, the apparatus has a resolution of 11 bits.

Now the operation of an A/D converter having a configuration as described above will be described by referring to the timing charts in FIG. 46.

When an input analog signal is applied to the V/F converter 750, it transmits a pulse signal having a frequency corresponding to the voltage of the input signal to the input changeover switch 752.

Figure 46:
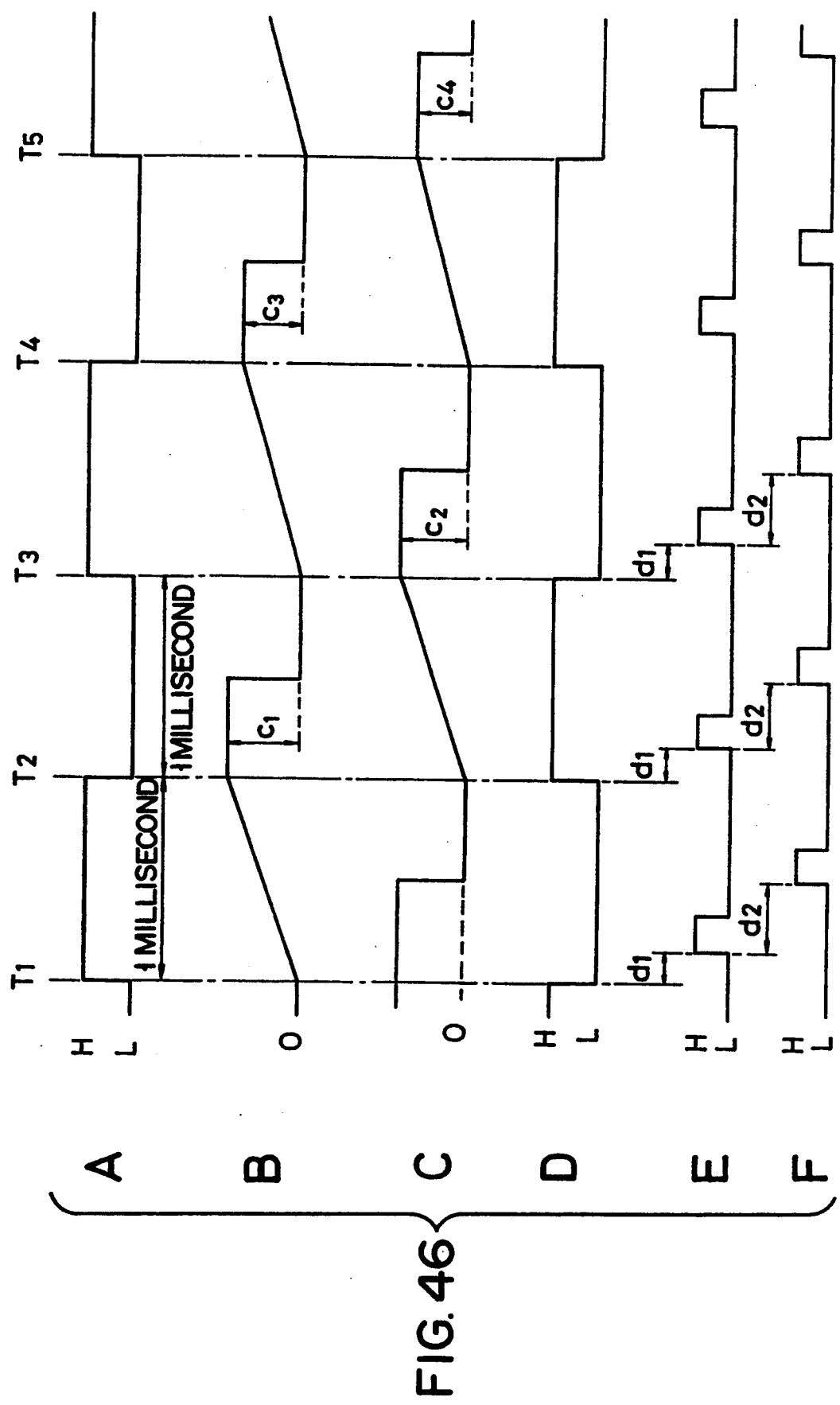
FIG. 46 is a collection of timing charts showing how the A/D converter of FIG. 45 is operated.

Then, the level of the input changeover signal rises to level "H" at time T1 as indicated in chart A of FIG. 46 and, after the input changeover switch 752 is turned to the side of the first counter 753, the number it counts is incremented from zero as indicated by chart B in FIG. 46.

when the level of the input changeover signal falls to level "L", the input changeover switch 752 is turned to the side of the second counter 754 so that it starts counting from zero as illustrated in chart C of FIG. 46. At this stage, the count C1 of the first counter 753 for the period of time from T1 to T2 is retained at the output of the counter.

The output changeover signal goes to level "H" while the second counter 754 is operating as shown in chart D of FIG. 46, and, as the count C1 of the first counter 753 has already been sent to the shift register 761, the count C1 is now stored in the shift register 761 by a write pulse which is delayed by d1 relative to T2 as illustrated in chart E of FIG. 46.

When d2 has passed since the issuance of the write pulse, a reset pulse is sent to the first counter 753 as illustrated in chart F of FIG. 46 to reset the first counter to zero as shown in chart B of FIG. 46.

The input changeover signal falls again to level "L" at time T3 that comes 1 millisecond later than time T2 to activate the first counter 753 for counting and, when d1 has elapsed since T3, the count C2 of the second counter 754 is stored in the shift register 761 and then the second counter 754 is reset to zero with a further delay of d2 and become ready for the next counting operation.

In a similar manner the next counted value is stored in the shift register 761 when 1 millisecond has elapsed since the previous count.

When 32 counts, or counts C1 through C33, have been stored in the shift register 761, the output of the adder 762 will be a digital value corresponding to the level of the voltage of the analog signal for the 32 milliseconds from T1 to T33.

It should be noted that since the output of the V/F converter 50 and the input changeover signal is synchronized and therefore the time required for switching operation is minimal, the counting operations for the period are conducted continuously and no count will be missed during that period. Consequently, the sum of addition of the counts shows a resolution of 16 bits.

When the result of the next subtraction C33 is stored in the shift register 761, the output of the adder 762 shows a digital value that corresponds to the level of the analog voltage for the 32 milliseconds from T2 to T3. Thus, a digital value with a resolution of 16 bits is produced for every 1 millisecond corresponding to the analog signal applied during the period.

While a digital value having a resolution of 16 bits is obtained by adding a given number (32) of consecutive counts stored in the shift register 761 of the A/D converter of FIG. 45, the resolution may be so modified as to meet a required level by storing all the counts for a given period of time if operation such as waveform analysis is involved.

While a number of counts with a resolution of 11 bits are added in the A/D converter in FIG. 45, each of the counts may be alternatively multiplied by $2^5$ in the shift register 61a of FIG. 43 (or five "0" may be added to the count as lower five digits) and M (an arbitrary number) consecutive counts in 16-bit numbers may be added in the adder 762a as results of counting to obtain a same digital value with a resolution of 16 bits by dividing the sum of the addition by M in the divider 763.

Similarly, while two counters are alternatively used in the A/D converter of FIG. 45, three or more than three counters may be sequentially used for counting the outputs of the V/F converter.

Since a A/D converter having a configuration as described above uses a plurality of counters which are sequentially operated for a given period of time for counting the outputs of the corresponding V/F converter so that the result of a counting operation can be produced as a digital value while one of the remaining counters is operating, the operation of A/D conversion can be carried out with a desired level of resolution and a short period of sampling without requiring high speed counters. This feature provides an electromagnetic balance-type weighing apparatus with the advantage of high accuracy measurement and high speed waveform analysis as described earlier.

FIGS. 47 through 57 show the mechanical system of the invention having a second preferred configuration as well as the anti-vibration and water-proof contrivances designed to enhance the accuracy of measurement of the apparatus.

In these illustrations, reference numeral 910 denotes a bottom plate removably combined with a cover 970 to form a housing of the apparatus and provided with three legs 911 projecting downward from the front and the rear corners and the middle point of the right edge of the lower surface of the bottom plate (as viewed from the front in FIG. 47) to securely and stably support the apparatus when placed on a flat floor. The bottom plate 910 has a cavity 912 on its upper surface surrounded by a rim 910a.

The bottom plate 910 is provided with a pair of ventilation pores 913 arranged at the middle along its left and right edges (as viewed from the front in FIG. 47) so that the atmosphere and the cavity 912 may communicate with each other.

Figure 51:
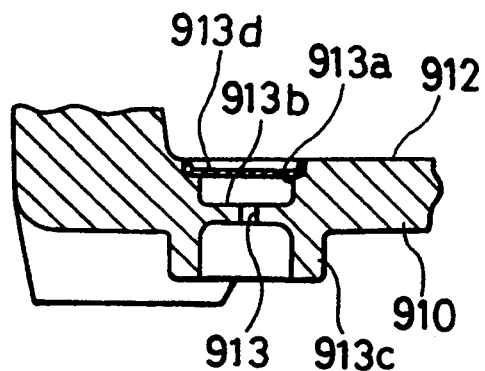
FIG. 51 is an enlarged sectional view of one of the ventilation pores of the mechanical system of FIG. 47.

More specifically, two pairs of countersinks 913b are formed under the cavity 912 of the bottom plate 910, each pair being vertically aligned and the upper one of each pair having an annular step 913a, and a ventilation pore 913 is bored through the center of each pair of the countersinks 913b as illustrated in full detail in FIG. 51. A cylindrical hood 913c is arranged coaxially with each of the ventilation pores 913 and projecting downward from the corresponding lower countersink 913b. The hoods 913a are so designed as to guard the ventilation pores 913 against any liquid that may be bounced to splash the pores from the floor under the apparatus.

A piece of water repellent film 913d that passes air but does not pass liquid is bonded to each of the annular steps 913a of the upper countersinks 913b along its periphery in order to prevent any liquid from entering the inside of the casing but secure ventilation for the inside of the apparatus.

Figure 52:
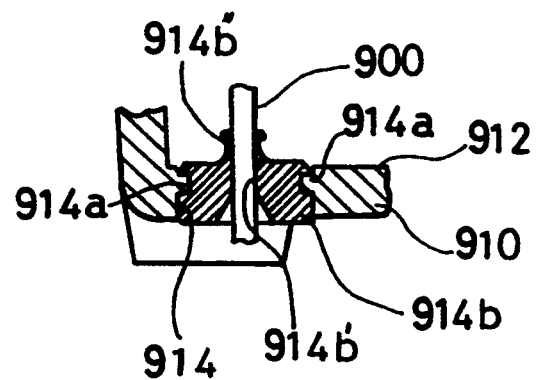
FIG. 52 is an enlarged sectional view the cable hole of the mechanical system of FIG. 47.

The cavity 912 of the bottom plate 910 is also provided with a pair of power cable holes 914 arranged at the middle along the two lateral edges (FIG. 52 and a telecommunication cable hole (not shown).

As shown in FIG. 52, each of the cable holes 914 are provided with an annular projection 914a along its side wall, to which an elastic member 914b made of a material such as rubber is engagedly fitted. Each of the elastic members 914b has an axial through bore 914b', through which a corresponding cable 900 is arranged, any liquid external to the apparatus being prevented from entering it through the cable holes because of an elastic cylinder 914b" of each of the elastic members 914b firmly pressing the cable 900 running therethrough and airtightly sealing the corresponding cable hole 914.

Figure 50:
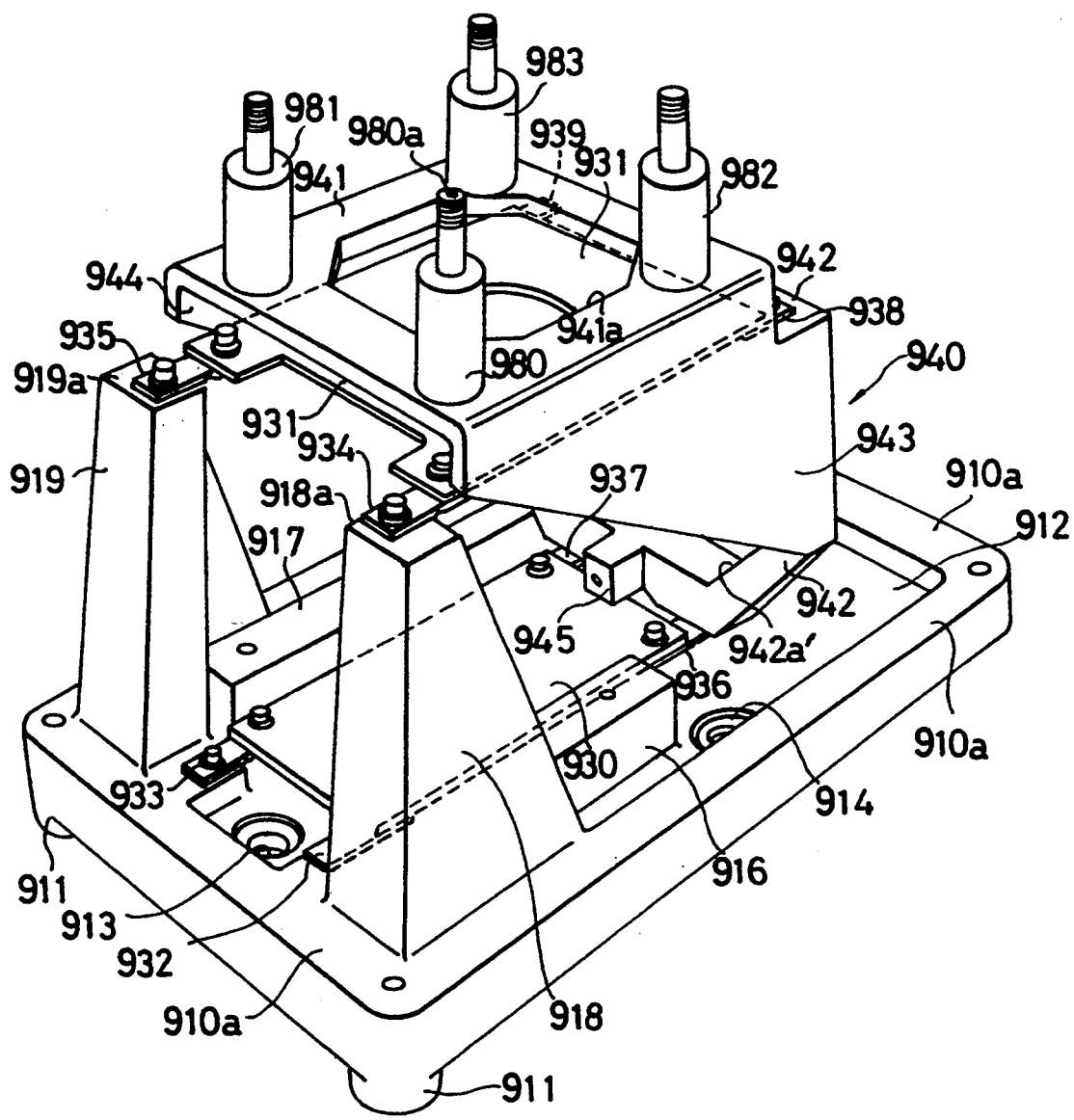
FIG. 50 is a partially cut-out perspective view similar to but different from that of FIG. 49.

The bottom plate 910 is also provided with a left and a right rectangular support blocks 916, 917 (as viewed from the front in FIG. 47) arranged in parallel and standing upward from the cavity 912 for supporting a permanent magnet 922, which will be described later (FIG. 50).

A pair of support pillars 918, 919 are projecting upward from the front and rear left corners of the bottom plate 910.

Figure 47:
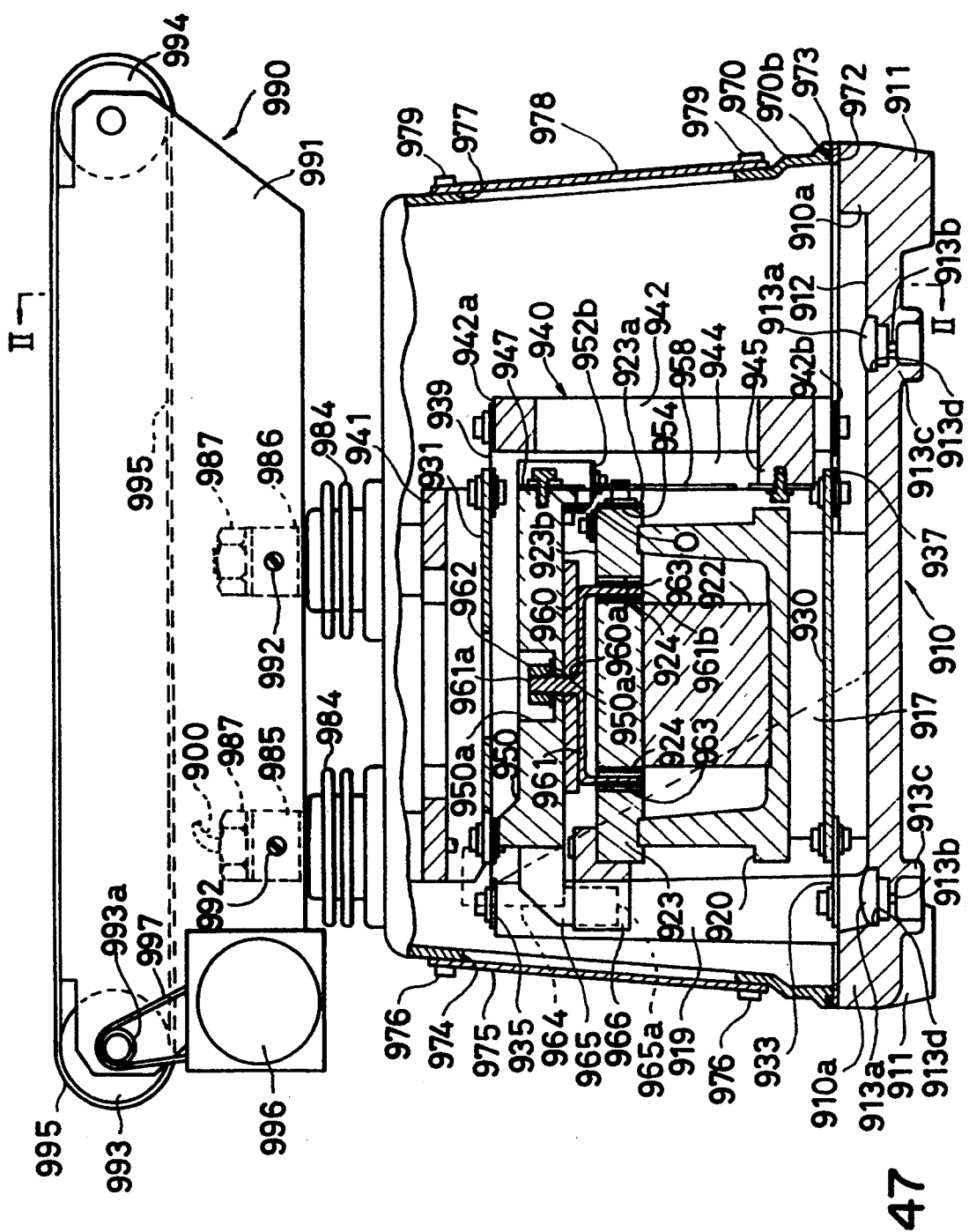
FIG. 47 is a sectional view of the mechanical system of a second electromagnetic balance-type weighing apparatus applicable to any of the embodiments of the invention.
Figure 49:
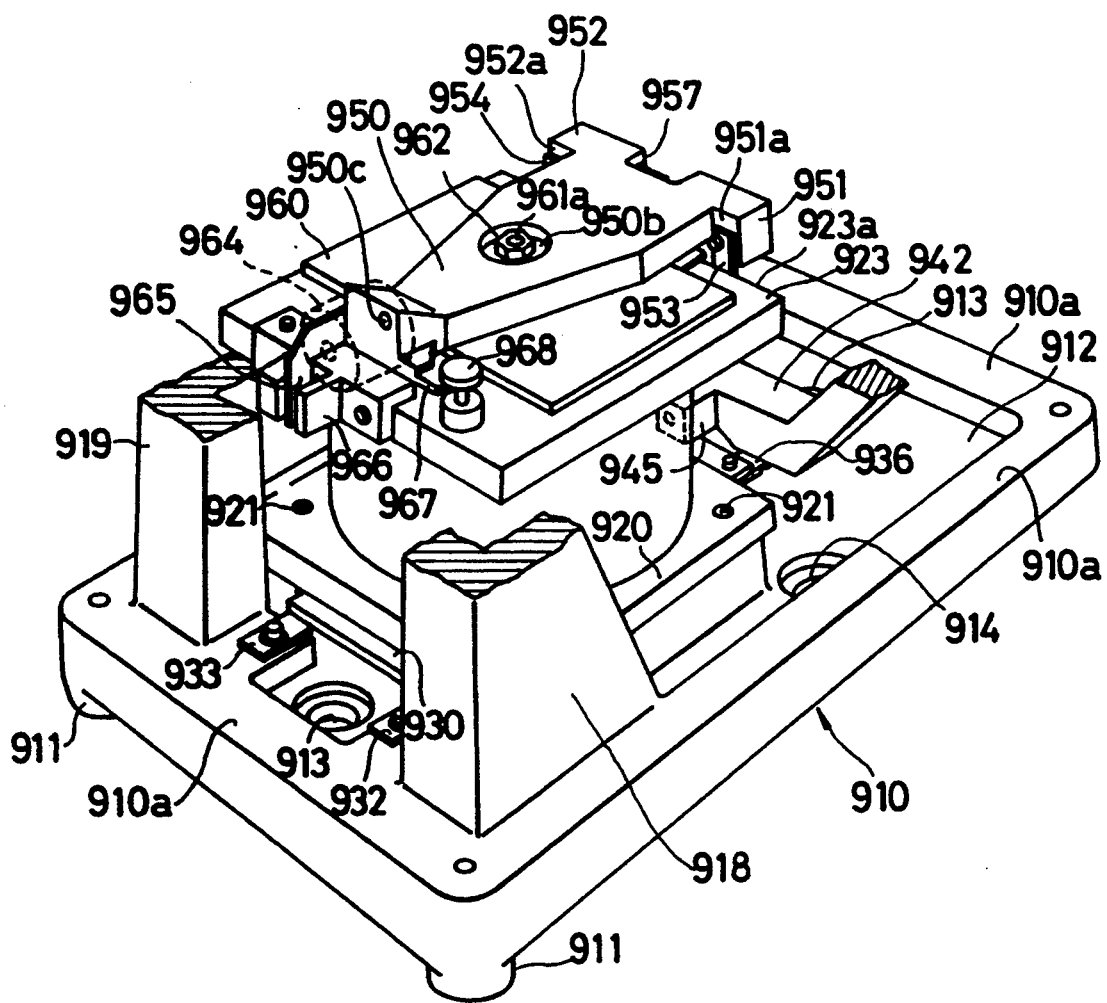
FIG. 49 is a partially cut-out perspective view of the mechanical system of FIG. 47 with some components taken away and not shown.

A yoke 920 is placed on the upper surfaces of the support blocks 916, 917 and rigidly fitted thereto by means of screws 921 arranged at its four corners as illustrated in FIG. 49. The permanent magnet 922 having a cylindrical shape is rigidly fitted onto the center of the yoke 920 and another yoke 923 is rigidly fitted to the upper surface of the permanent magnet 922 as shown in FIG. 47. The yoke 923 has a circular slit 924 arranged thereto.

As shown in FIG. 50, a horizontal plate 930 is fitted to the rim 910a of the bottom plate 910 at its left corners (as viewed from the front in FIG. 47) by way of rocking plates 932, 933 which are found between the support pillars 918, 919. As shown in FIGS. 47, 49 and 50, the horizontal plate 930 is located between the support blocks 916, 917 and below the yoke 920.

As shown in FIGS. 47 and 50, a second horizontal plate 931 is fitted to the tops 918a, 919a of the respective support pillars 918, 919 at its left corners by way of rocking plates 934, 935. The horizontal plates 930 and 931 have a same width.

As illustrated in FIG. 50, the load carrying section 940 of the weighing apparatus comprises a horizontal member 941 having a center opening 941a, a vertical member 942 also having a center opening 942a' (FIG. 48) and triangular lateral members 943, 944 connecting the horizontal and vertical members 941 and 942.

Figure 48:
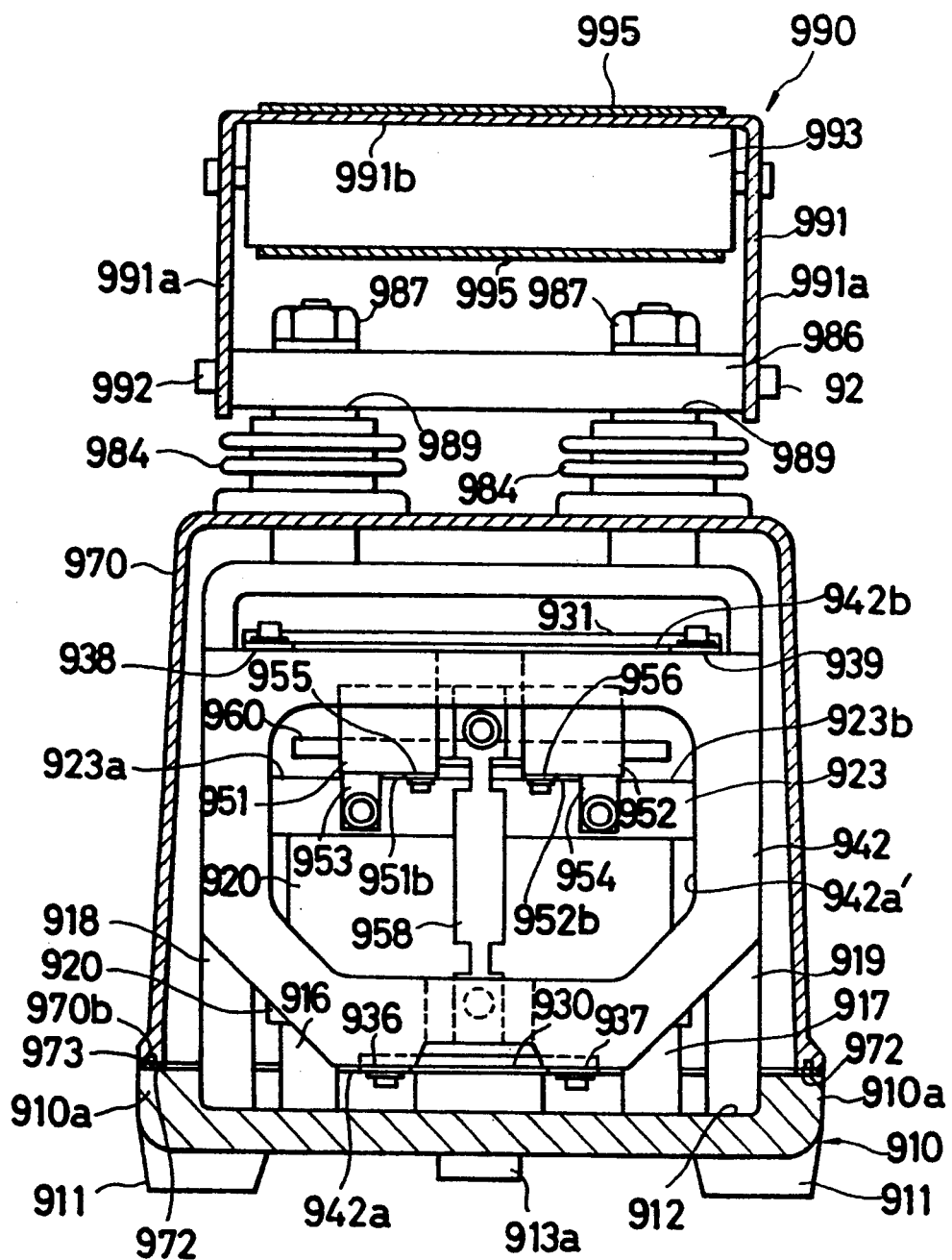
FIG. 48 is a sectional view along II—II line of FIG. 47.

The horizontal plates 930 and 931 are respectively fitted to the bottom and top surfaces 942a and 942b of the vertical member 942 of the load bearing section 940 at their right corners by way of respective rocking plate pairs 936, 937 and 938, 939 (FIGS. 48 and 50).

The rocking plates 932 through 939 are uniformly shaped, each being flexible at a thin middle area. Four of the rocking plates 932 through 939 constitute a front group, while the remaining four constitute a rear group. Each of the front and rear groups are so arranged that, when viewed from the front (FIG. 47), they form a rectangle, which is deformed to become a non rectangular parallelogram whenever a load is applied to the load carrying section 940 so that the upper surface of the load carrying section 940 is lowered.

Balance beam 950 is pivotally fitted to a right top corner of the yoke 923 (as viewed from the front in FIG. 47).

As shown in FIG. 49, the balance beam 950 is realized substantially in the form of a flat plate provided with a pair of flanges 951, 952 arranged at the right side corners and projecting outward and downward.

As also shown in FIG. 49, the flanges 951, 952 are connected at their respective left lateral sides 951a, 952a to the right lateral side 923a (as viewed from the front in FIG. 47) of said yoke 923 by way of a pair of rocking plates 953, 954 and at their respective bottoms 951b, 952b to the top 923b of the yoke 923 along its right edge by way of another pair of rocking plates 955, 956 (FIG. 48). The rocking plates 953 through 956 are uniformly shaped, each being flexible at a thin middle area. Moreover, the vertically arranged rocking plates 953, 954 are intersected at a single and identical point in the thin middle areas by the horizontal rocking plates 955, 956 so that the balance beam 950 may pivotally supported relative to the yoke 923 at a fulcrums which is the point of intersection 0 of the vertical rocking plates 953, 954 and the horizontal rocking plates 955, 956 (FIG. 47).

The lateral side of the notch 957 arranged at the right edge of the balance beam 950 (FIG. 49) and the front lateral side of projection 945 projecting leftward from the center of the bottom of the vertical member 942 of the load carrying section 940 (FIG. 50) are connected by a connector plate 958. The connector plate 958 is realized in a form having upper and lower flexible narrow and thin areas as illustrated in FIGS. 47 and 48.

Thus, as the load on the load carrying section 940 is actually applied to the right of said fulcrum 0 due to the existence of the connector plate 958, the balance beam 950 tends to rotate clockwise around the fulcrum 0 as seen from FIG. 47.

A bobbin 961 having an open bottom is provided under the balance beam 950 to the left of said fulcrum 0 with a flat balancing weight 960 arranged therebetween as shown in FIGS. 47 and 48.

More specifically, the fitting axle 961a of the bobbin 961 standing upright from the center of the bobbin main body runs through the through bore 960a of the weight 960 as well as the through bore 950a of the balance beam 950 and is rigidly fitted to the balance beam 950 by means of a nut 962 arranged in the recess 950b of the balance beam 950 so that bobbin 961 and the weight 960 are securely connected to the bottom of the balance beam 950. The cylindrical portion, or peripheral wall, 961b of the bobbin 961 is located in the annular slit 924 of the yoke 923. A wire is wound around the outer periphery of the cylindrical portion 961b to form a coil 963 that constitutes a magnetic circuit crossing the permanent magnet 922 and the slit 924 of the yoke 923 so that, when it is energized by electricity, it tends to rotate the balance beam 950 counterclockwise around the fulcrum 0 with its electromagnetic force.

The balance beam 950 is provided with a threaded bore 950c at its left end so that a weight 964 for finely controlling the balance of the beam (as shown by a broken line in FIGS. 47 and 48) may be fitted there by means of a screw if necessary. The weight 964 is replaceable for fine control or, alternatively, the apparatus may be so arranged that the balance beam is finely controlled by adjusting the position of the weight 964 by means of a screw.

As illustrated in FIGS. 47 and 49, a L-shaped plate 965 is fitted to the left edge of the balance beam 950. The lower end 965a of the L-shaped beam 965 is detected for its position by a position detector 966 comprising a light emitter and light sensors and rigidly fitted to the left edge of the yoke 923.

As FIG. 49 shows, the balance beam 950 is provided at its left edge with a fin 967 horizontally projecting from the edge. A stopper 968 is rigidly fitted to the upper surface of the yoke 923 to define the upper and lower limits of vertical movement of the fin 967.

As FIGS. 47 and 48 show, a cover 970 is placed on the top of the rim 910a of the bottom plate 910, the casing of the weighing apparatus being constituted by the bottom plate 910 and the cover 970.

The cover 970 and the bottom plate 910 are securely connected with each other by means of screws 971 arranged at the flat sections of the four corners of the cover 970 which are located on the respective four corners of the rim 910a of the bottom plate 910 as illustrated in FIG. 53.

Figure 54:
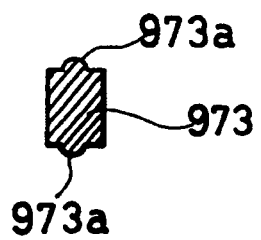
FIG. 54 is an enlarged sectional view of a packing piece to be used for the mechanical system of FIG. 47.

In FIG. 47, reference numeral 972 denotes a ring-shaped packing and 970b denotes a closed groove arranged along the bottom of the cover 972, into which the ring-shaped packing 973 is press fit. The ring-shaped packing 973 has a substantially rectangular cross section having upper and lower projections 973a as illustrated in FIG. 54, which are forced to become flat when the ring-shaped packing 973 is press fit into the groove so that it can effectively prevent liquid from entering the inside of the apparatus.

A window 974 is provided at the left side wall (as viewed from the front in FIG. 47) of the cover 970 to allow access to the fine control weight 964 for adjustment and/or replacement. A shutter 975 for the window is removably fitted to the side wall by means of screws 976 with a packing (not shown) arranged between the shutter 975 and the side wall for protection against water. Similarly, another window 977 is provided at the right side wall (as viewed from the front in FIG. 47) to allow access to the electronic circuit (not shown) arranged in the inside of the apparatus. Also, a shutter 978 for the window 977 is removably fitted to the side wall by means of screws 979 with a packing (not shown) arranged between the shutter 978 and the side wall for protection against water.

As illustrated in FIG. 50, four support pillars 980 through 983 are rigidly fitted to and standing from the horizontal member 941 of the load carrying section 940.

Figure 55:
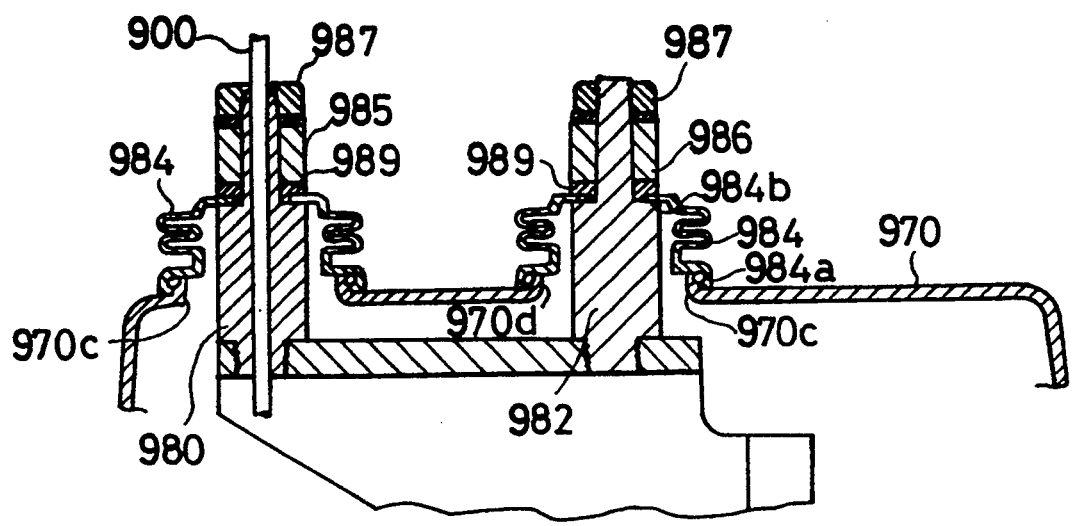
FIG. 55 is a sectional view of a principal area of the load sensing section of the mechanical system of FIG. 47.

It is seen in FIG. 55 that the support pillars 980 through 983 are standing upright through holes 970c of the top wall of the cover 970. A vertically extendible bellows 984 is arranged between the peripheral edge of each of the holes 970c and the corresponding one of the support pillars 980 through 983 so that the support pillars 980 through 983 are vertically slidable without hindrance but the watertight condition of the casing is preserved.

More specifically described by referring to FIG. 55, each of the holes 970c of the cover 970 has a flange 970d standing upward, to whose outer upper periphery an O-ring is engagedly fitted, and the lower end 984a of the corresponding bellows 984 adheres to the flange 970d of the cover 970 due to its centripetal resilient force, while the upper end 984b of the bellows 984 is pressed downward by a washer 989, which will be described later, so that the watertight condition of the casing is perfectly secured.

The two paired support pillars 980, 981 and 982, 983 are provided with respective common beams 985 and 986, which are longitudinally arranged and securely held to the respective proper positions by means of anchor bolts 987 and washers 989, the latter being arranged between the respective bolts 987 and the beams 985, 986 (FIGS. 47, 48 and 52).

A conveyor assembly 990 that operates as a weighing pan is securely held by the opposite ends of the beams 985, 986, as the front and rear panels 991a of the frame 991 of the conveyor assembly 990 are rigidly fitted to the beams 985, 986 by means of screws 992. Rollers 993 and 994 are rotatably supported by the front and rear panels 991a and a conveyor belt 995 is arranged between the rollers 993 and 994. The conveyor belt 995 is so arranged that it is kept in contact with the top panel 991b of the frame 991 at the upper end of it so that the conveyor belt 995 may not sink under the load of the object of weighing W applied to it (FIGS. 47 and 48).

The roller 993 is driven to rotate by a motor 996 securely fitted to the frame 991. In FIG. 47, 993a denotes a pulley securely fitted to the roller 993 and 997 denotes a belt connecting the pulley 993a and a pulley (not shown) arranged on the motor 996.

As illustrated in FIG. 55, the support pillar 980 is realized as a hollow pipe, through which a power cable 900 (FIG. 47) runs to be led outside by way of a through bore 980a of the top of the support pillar 980 to reach the motor 996.

Figures 56, 57:
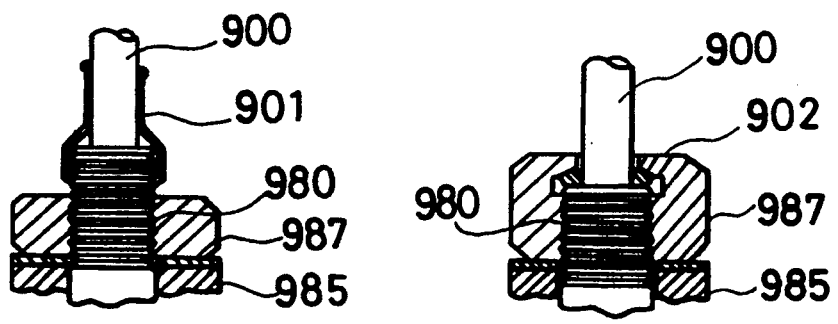
FIGS. 56 and 57 are sectional views of one of the support pillars of the mechanical system of FIG. 57, showing how the cable and the surrounding area are kept in a watertight condition.

The watertight condition of the casing is secured and any possibility of liquid entering there by way of the through bore 980a for the support pillar 980 can be eliminated by arranging either an elastic tube around the cable 900 and the support pillar 980 as illustrated in FIG. 56 or an O-ring 202 press fit into the space between the cable 200 and the anchor bolt 187.

With an arrangement as described above, at the right of the fulcrum 0, the balance beam 950 is subjected to a rotary force trying to drive it clockwise by the load applied to the connector plate 958 by the entire conveyor assembly 990, the motor 996 and the load carrying section 940, whereas, at the left of the fulcrum 0, it is subjected to another rotary force trying to drive it counter-clockwise by the load applied by the balancing weight 960 and the weight for fine control 964 and the sucking force of the energized coil 963 as it may be seen from FIG. 47.

The vertical position of the lower end 965a of the L-shaped plate 965 rigidly fitted to the left edge of the balance beam 950 is detected by the position detector 966 and utilized to regulate the sucking force of the coil 963 by adjusting the rate of the electric current supplied to the coil so that consequently the lower end 965a of the L-shaped 965 is returned to its normal position.

Therefore, the rate of the electric current supplied to the coil 963 should be so adjusted that the lower end 965a of the L-shaped plate 965 is found exactly at its normal position when the conveyor belt 995 does not carry any objects of weighing.

It may be understood that, because of the weight 960 (and the weight for fine control 964 if necessary) are fitted to the balance beam 950, the rate of the electric current supplied to the coil 963 when the conveyor belt 995 does not carry any objects can be minimized.

When an object of weighing is placed on the conveyor belt 990 by a feeder (not shown), the balance beam 950 tends to receive a clockwise rotary force by the weight of the object of weighing and the L-shaped plate 965 at the left edge of the balance beam 950 shows an upward movement deviating itself from the normal position, a movement which is suppressed by the increased sucking force of the coil 963 generated by a corresponding increase in the rate of the electric current supplied to the coil 963 to hold the front end 965a of the L-shaped plate 965 to the normal position. The weight of the object of weighing is then determined by the rate or the increase in the rate of electric current.

As described earlier, the space between the pillars 980 through 983 supporting the weighing pan and the cover 970 is sealed by the bellows 984 and the space surrounding the cable 200 in the through bore 980a of the pillar 980 is also sealed by an appropriate measure as illustrated in FIG. 56 or FIG. 57. Moreover, the cable hole 914 of the bottom plate 910 is protected against liquid as illustrated in FIG. 52. Therefore, the weighing apparatus within the casing is completely free from the risk of being wet if the conveyor belt 990 is washed with water for cleaning.

Besides, since the ventilation pores 913 through the bottom plate 910 are covered by hoods 913c and provided with pieces of water repellent film 913d, the apparatus is protected against any liquid that may be bounced to splash the bores from the floor under the apparatus.

It may be needless to say that, while the mechanical system as described above is particularly good for a weighing apparatus that requires water-proof features, it may also be applied to a weighing apparatus that does not require to be protected against water.

It may be clear that, since the mechanical system as described above comprises a balancing weight 960 arranged between the balance beam 950 and the bobbin 961 of the electromagnetic coil, the apparatus is free from any significant imbalance that may be caused within the weighing apparatus by the dead weight of the weighing pan so that the rate of the electric current supplied to the electromagnetic coil and hence the heat to be inevitably generated by the electric current can be minimized. Non-existence of significant imbalance within the weighing apparatus means that the balance beam 950 is scarcely affected by external vibrations such as those of the floor supporting the apparatus and therefore fast and accurate weighing operations are guaranteed.

Moreover, the mechanical system as described above is completely protected against any intrusion of liquid because all the space between the casing and the support pillars projecting outward through the holes is completely sealed by means of elastic members. Besides, since the inside and the outside of the casing are in communication with each other by way of ventilation pores and therefore the elastic members are not undesirably expanded nor contracted by temperature changes within the casing, readings of the weighing apparatus are not affected by temperature changes.

It may be needless to say that the balance beam 150 may be so adjusted that it is balanced under either loaded or unloaded condition either by altering the shape, weight or fitting position of either the balancing weight 960 or the weight for fine control 964 or, alternatively, by means of the balance beam 950 itself or an accessory.

As described above in detail, the present invention provides a fast-responsive, highly accurate and therefore highly reliable electromagnetic balance-type weighing apparatus.

As has been described in detail, an inverter controlled conveying/measuring apparatus according to the invention can meet the requirements of reduced dimensions, durability, high torque and enhanced stability because of its control system using inverters for controlling AC power sources. Such an apparatus can be effectively used to establish a highly efficient, accurate and reliable system for conveying objects.

INDUSTRIAL APPLICABILITY

An inverter controlled conveying/measuring apparatus according to the present invention may have a variety of applications in various industrial fields to establish a fully automated weighing system such as a high-speed automatic weighing and sorting system for works to be installed in a manufacturing line.

We claim:

1. A weighing/sorting apparatus using conveyors, comprising:
    conveyor means for conveying an object to be weighed with a desired speed, said conveyor means comprising at least a feeding conveyor for feeding the object and a weighing conveyor for receiving the object from said feeding conveyor;
    first and second single phase brushless motors each having a first coil and a second coil, for driving said feeding conveyor and said weighing conveyor, respectively;
    inverter means for providing predetermined frequency signals to said first and second single phase brushless motors in accordance with a desired speed, so as to equalize the speed of said feeding conveyor and the speed of said weighing conveyor, said inverter means comprising:

(a) a rectifier circuit for rectifying an AC voltage into a DC voltage;

(b) a pulse modulated signal generating circuit for generating alternately first and second pulse modulated signals for a given period of time to modify AC currents respectively flowing through said first and second coils of said first and second single phase type brushless motors so as to trace sinusoidal waves with phases differentiated by 90° from each other according to first and second pulse width data corresponding to the first and second pulse modulated signals and generating alternately third and fourth pulse modulated signals for the same period of time with timings respectively shifted by a half of said given period of time for generating timings of the first and second pulse modulated signals;

(c) a first drive circuit for supplying an AC current having a given frequency obtained by switching the DC voltage to said first coils of said first and second single phase brushless motors in accordance with said first and second pulse modulated signals; and (d) a second drive circuit for supplying an AC current having a same frequency as that of said AC current and a phase differentiated by 90° from that of said AC current obtained by switching the DC voltage to said second coils of said first and second single phase brushless motors in accordance with said third and fourth modulated signals;

weighing means provided in a conveying path of said weighing conveyor, and for measuring a weight of the object; and a sorting means for producing a sorting signal for the object in accordance with a weighing output from said weighing means;

wherein each of said first and second drive circuits comprises flywheel effect means for forming a bidirectional closed loop circuit for absorbing a current induced by a counter-electromotive force generated in one of said first and second coils of said first and second single phase brushless motors during an idle period of said first and second pulse modulated signals by permitting the current induced by the counter electromotive force to continuously flow in two directions with reference to said one of said firsthand second coils of first and second single phase brushless motors, said flywheel effect means having switch means for forming said bidirectional closed loop circuit which permits the induced current to flow in two directions with reference to said one of said first and second coils of said first and second single phase brushless motors without including a path of the DC voltage, to thereby turn on said switch means at the idle period, so that said flywheel effect means causes one of said first and second single phase brushless motors to smoothly rotate without any momentary interruption.

2. An apparatus according to claim 1, wherein:

said conveyor means further comprises a sorting conveyor for receiving the object from said weighing conveyor; and said apparatus further comprises a third single phase brushless motor for driving said sorting conveyor, said sorting conveyor being provided with a guide means for guiding the object to a predetermined position in accordance with the sorting signal produced by said sorting means; and said inverter means equalizes the speed of said sorting conveyor and the speeds of said feeding conveyor and weighing conveyor to thereby provide predetermined frequency signals to said first, second and third single phase brushless motors in accordance with the desired speed.

3. An apparatus according to claim 1, wherein:

said conveyor means further comprises an intermediary conveyor arranged between said feeding conveyor and said weighing conveyor and for receiving the object from said feeding conveyor to transfer the object to said weighing conveyor;

said apparatus further comprises a third single phase brushless motor for driving said intermediary conveyor; and said inverter means includes means for modifying the speeds of said feeding conveyor and said intermediary conveyor by providing predetermined frequency signals to said first and third single phase brushless motors when the object is transferred from said feeding conveyor to said intermediary conveyor.

4. An apparatus according to claim 1, wherein said inverter means comprises:

a current detector for detecting a magnitude of said AC current flowing through at least said coil of said first and second single phase brushless motors; and means for limiting a magnitude of said AC current applied to said at least one coil depending on the magnitude of the AC current detected by said current detector.

5. An apparatus according to claim 1, wherein said rectifier circuit comprises means for supplying two DC voltages having positive and negative potentials.

6. An apparatus according to claim 1, wherein said inverter means further comprises means for driving said first and second coils of said first and second single phase brushless motors by a constant current.

7. An apparatus according to claim 1, wherein said inverter means comprises at least one of means for issuing a thermal alarm signal whenever a level of an AC current flowing through the first or second coil of said first and second single phase brushless motors exceeds a limited value for a given period of time, and means for issuing an overcurrent alarm signal whenever the level of said AC current exceeds a rated value.

* * * * *